US012449946B2

(12) United States Patent
Holder et al.

(10) Patent No.: US 12,449,946 B2
(45) Date of Patent: Oct. 21, 2025

(54) METHODS FOR DISPLAYING USER INTERFACE ELEMENTS RELATIVE TO MEDIA CONTENT

(71) Applicant: Apple Inc., Cupertino, CA (US)

(72) Inventors: Wesley M. Holder, Union City, CA (US); Earl M. Olson, Santa Clara, CA (US); Matan Stauber, San Francisco, CA (US); Stephen O. Lemay, Palo Alto, CA (US); Maneli Noorkami, Menlo Park, CA (US); Negar Nejati, Palo Alto, CA (US); Afshin Taghavi Nasrabadi, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/152,656

(22) Filed: Jan. 10, 2023

(65) Prior Publication Data
US 2023/0221833 A1 Jul. 13, 2023

Related U.S. Application Data

(60) Provisional application No. 63/266,625, filed on Jan. 10, 2022.

(51) Int. Cl.
*G06F 3/04815* (2022.01)
*G06F 3/04847* (2022.01)
(52) U.S. Cl.
CPC ...... *G06F 3/04815* (2013.01); *G06F 3/04847* (2013.01)

(58) Field of Classification Search
CPC ............ G06F 3/04815; G06F 3/04847; G06F 2203/0381; G06F 3/013; G06F 3/017;
(Continued)

(56) References Cited

U.S. PATENT DOCUMENTS 6,323,846 B1   11/2001  Westerman et al.
6,570,557 B1    5/2003  Westerman et al.
(Continued)

FOREIGN PATENT DOCUMENTS

JP    H11289555 A    10/1999
WO    2013/169849 A2 11/2013
WO    2014/105276 A1  7/2014

OTHER PUBLICATIONS

Final Office Action received for U.S. Appl. No. 18/327,844, mailed on Nov. 29, 2024, 25 pages.
(Continued)

*Primary Examiner* — Kenny Nguyen
(74) *Attorney, Agent, or Firm* — Kubota & Basol LLP

(57) ABSTRACT

In some embodiments, a computer system displays a caption for a media item at different depths depending on the depth of the portion of the media item over which the caption is displayed. In some embodiments, a computer system displays a user interface element that includes information associated with the media item at different locations relative to the media item depending on attention of the user. In some embodiments, a computer system displays a user interface element that includes information associated with the media item with different visual appearances depending on visual characteristics of the portion of the media item over which the user interface element is displayed.

33 Claims, 41 Drawing Sheets

(58) Field of Classification Search
CPC .. G02B 27/017; G02B 27/0093; H04N 23/21; H04N 23/90; H04N 13/128; H04N 13/156; H04N 13/398; H04N 13/183; H04N 13/204; H04N 13/271; H04N 13/344; H04N 13/383; G11B 27/34

See application file for complete search history.

(56) References Cited

U.S. PATENT DOCUMENTS

| | | | |
|---|---|---|---|
| 6,677,932 B1 | 1/2004 | Westerman | |
| 7,614,008 B2 | 11/2009 | Ording | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,844,914 B2 | 11/2010 | Andre et al. | |
| 7,957,762 B2 | 6/2011 | Herz et al. | |
| 8,006,002 B2 | 8/2011 | Kalayjian et al. | |
| 8,239,784 B2 | 8/2012 | Hotelling et al. | |
| 8,279,180 B2 | 10/2012 | Hotelling et al. | |
| 8,381,135 B2 | 2/2013 | Hotelling et al. | |
| 8,479,122 B2 | 7/2013 | Hotelling et al. | |
| 8,767,045 B2 * | 7/2014 | Kitazato | H04N 13/178 |
| | | | 348/43 |
| 9,237,334 B2 * | 1/2016 | Cheng | H04N 13/30 |
| 9,241,149 B2 * | 1/2016 | Redmann | H04N 13/183 |
| 9,348,458 B2 | 5/2016 | Hotelling et al. | |
| 9,436,357 B2 * | 9/2016 | Pallakoff | G06F 3/0483 |
| 9,588,651 B1 * | 3/2017 | Buchanan | G06F 3/04815 |
| 9,933,937 B2 | 4/2018 | Lemay et al. | |
| 10,484,641 B2 * | 11/2019 | Zhou | H04N 21/47 |
| 10,645,332 B2 * | 5/2020 | Zhang | G06V 10/25 |
| 2002/0015024 A1 | 2/2002 | Westerman et al. | |
| 2004/0230912 A1 | 11/2004 | Clow et al. | |
| 2005/0190059 A1 | 9/2005 | Wehrenberg | |
| 2006/0017692 A1 | 1/2006 | Wehrenberg et al. | |
| 2006/0033724 A1 | 2/2006 | Chaudhri et al. | |
| 2006/0034590 A1 | 2/2006 | Teramoto | |
| 2006/0197753 A1 | 9/2006 | Hotelling | |
| 2010/0188572 A1 * | 7/2010 | Card, II | H04N 5/445 |
| | | | 348/E7.001 |
| 2010/0328432 A1 | 12/2010 | Tanaka | |
| 2013/0010062 A1 * | 1/2013 | Redmann | H04N 5/278 |
| | | | 348/E13.064 |
| 2013/0307945 A1 * | 11/2013 | Cheng | H04N 13/30 |
| | | | 348/54 |
| 2013/0326341 A1 * | 12/2013 | Nonaka | G06T 11/60 |
| | | | 715/246 |
| 2014/0362111 A1 * | 12/2014 | Kim | G06T 11/60 |
| | | | 345/633 |
| 2016/0224122 A1 | 8/2016 | Dietz et al. | |
| 2016/0373714 A1 * | 12/2016 | Lee | H04N 13/183 |
| 2017/0302903 A1 * | 10/2017 | Ng | G06T 15/205 |
| 2018/0220195 A1 | 8/2018 | Panchaksharaiah et al. | |
| 2019/0279407 A1 * | 9/2019 | McHugh | G06F 3/011 |
| 2020/0099989 A1 | 3/2020 | Niemirska et al. | |
| 2022/0253136 A1 | 8/2022 | Holder et al. | |
| 2023/0007335 A1 * | 1/2023 | Gupta | H04N 21/4402 |
| 2023/0092874 A1 | 3/2023 | Krivoruchko et al. | |
| 2023/0093979 A1 | 3/2023 | Stauber et al. | |
| 2023/0394755 A1 * | 12/2023 | Negoita | G10L 15/26 |
| 2023/0396854 A1 | 12/2023 | Sanders et al. | |
| 2024/0070948 A1 * | 2/2024 | Bradley | G06T 19/003 |
| 2024/0152256 A1 * | 5/2024 | Dascola | G06F 3/0482 |
| 2024/0205509 A1 * | 6/2024 | Kim | G06N 3/08 |
| 2025/0005855 A1 | 1/2025 | Holder et al. | |

OTHER PUBLICATIONS

International Search Report received for PCT Patent Application No. PCT/US2023/060429, mailed on Jun. 28, 2023, 7 pages.

Non-Final Office Action received for U.S. Appl. No. 18/327,844, mailed on May 17, 2024, 20 pages.

Yue, et al., "Optimal Region Selection for Stereoscopic Video Subtitle Insertion", IEEE Transactions on Circuits and Systems for Video Technology, vol. 28, No. 11, Nov. 2018, 13 pages.

International Search Report received for PCT Patent Application No. PCT/US2024/032455, mailed on Sep. 25, 2024, 3 pages.

* cited by examiner

800

802a — While displaying, via one or more display generation components, a representation of a media item that has content at different depths, display, overlaid on a first portion of the representation of the media item, a respective user interface element that includes a caption for the media item that is being played by the computer system, wherein displaying the respective user interface element overlaid on the first portion of the representation of the media item includes:

802b — In accordance with a determination that the first portion of the representation of the media item is being presented at a first depth in the representation of the media item, the respective user interface element is displayed at a first distance from the viewpoint of a user of the computer system

802c — In accordance with a determination that the first portion of the representation of the media item is being presented at a second depth in the representation of the media item, different from the first depth, the respective user interface element is displayed at a second distance, different from the first distance, from the viewpoint of the user

FIG. 8A

METHODS FOR DISPLAYING USER INTERFACE ELEMENTS RELATIVE TO MEDIA CONTENT

CROSS-REFERENCE TO RELATED APPLICATIONS

This application claims the benefit of U.S. Provisional Application No. 63/266,625, filed Jan. 10, 2022, the content of which is incorporated herein by reference in its entirety for all purposes.

TECHNICAL FIELD

This relates generally to computer systems that provide computer-generated experiences, including, but no limit to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing computer-generated experiences to users that make interaction with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for interacting with content in a three-dimensional environment. Such methods and interfaces may complement or replace conventional methods for interacting with content in a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges.

In some embodiments, a computer system displays a caption for a media item at different depths depending on the depth of the portion of the media item over which the caption is displayed. In some embodiments, a computer system displays a user interface element that includes information associated with the media item at different locations relative to the media item depending on attention of the user. In some embodiments, a computer system displays a user interface element that includes information associated with the media item with different visual appearances depending on visual characteristics of the portion of the media item over which the user interface element is displayed.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for read-ability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 8A-8I is a flowchart illustrating an exemplary method of displaying video captions for media items that have content at different depths in accordance with some embodiments.

DESCRIPTION OF EMBODIMENTS

The present disclosure relates to user interfaces for providing an extended reality (XR) experience to a user, in accordance with some embodiments.

The systems, methods, and GUIs described herein provide improved ways for an electronic device to facilitate interaction with and manipulate objects in a three-dimensional environment.

In some embodiments, a computer system displays a representation of a media item that has content at different depths. In some embodiments, the computer system displays, overlaid on a portion of the representation of the media item, a user interface element that includes a caption for the media item. If the portion of the representation of the media item is being presented at a first depth, the user interface element is displayed at a first distance from the viewpoint of the user. If the portion of the representation of the media item is being presented at a second depth, the user interface element is displayed at a second distance from the viewpoint of the user.

In some embodiments, a computer system displays a representation of a media item. In some embodiments, the computer system displays a user interface element that includes information associated with the media item at a first location relative to the representation of the media item that corresponds to a first portion of the representation of the media item. In response to detecting that attention of the user has changed from being directed to the first portion to being directed to a second portion of the representation of the media item, the computer system optionally displays the user interface element at a second location relative to the representation of the media item that corresponds to the second portion of the media item.

In some embodiments, a computer system displays a representation of a media item. In some embodiments, the computer system displays a user interface element that includes information associated with the media item overlaying a portion of the representation of the media item, and the user interface element has a first visual appearance based on one or more visual characteristics of the portion of the representation of the media item. In some embodiments, as the playback position of the media item changes, and one or more visual characteristics of a portion of the representation of the media item over which the user interface element is displayed change, the computer system displays the user interface element with a second visual appearance, different from the first visual appearance.

Figure 11A:
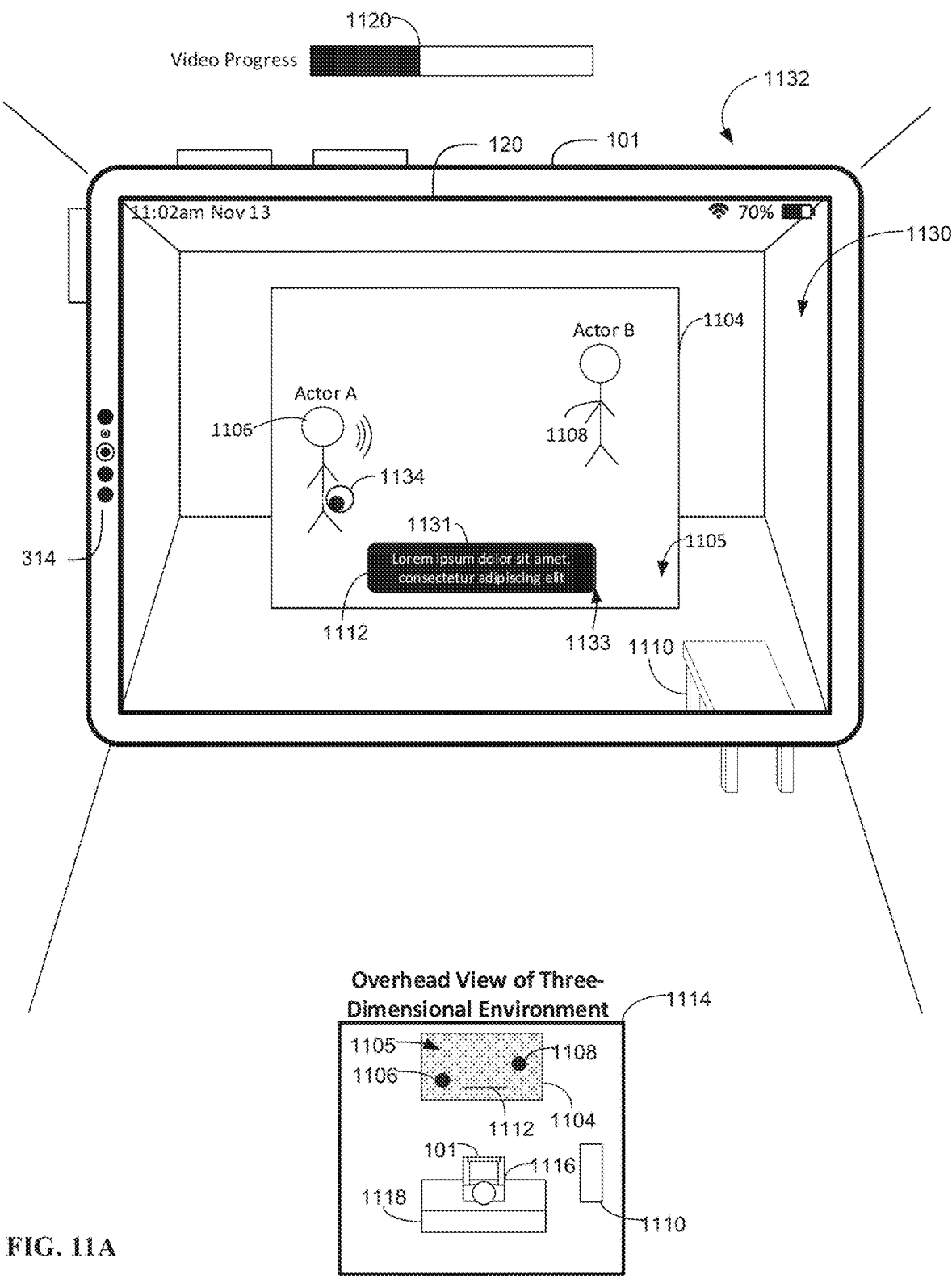
FIGS. 11A-11C illustrate examples of how an electronic device displays video captions with different visual appearances in accordance with some embodiments of the disclosure.
Figure 11B:
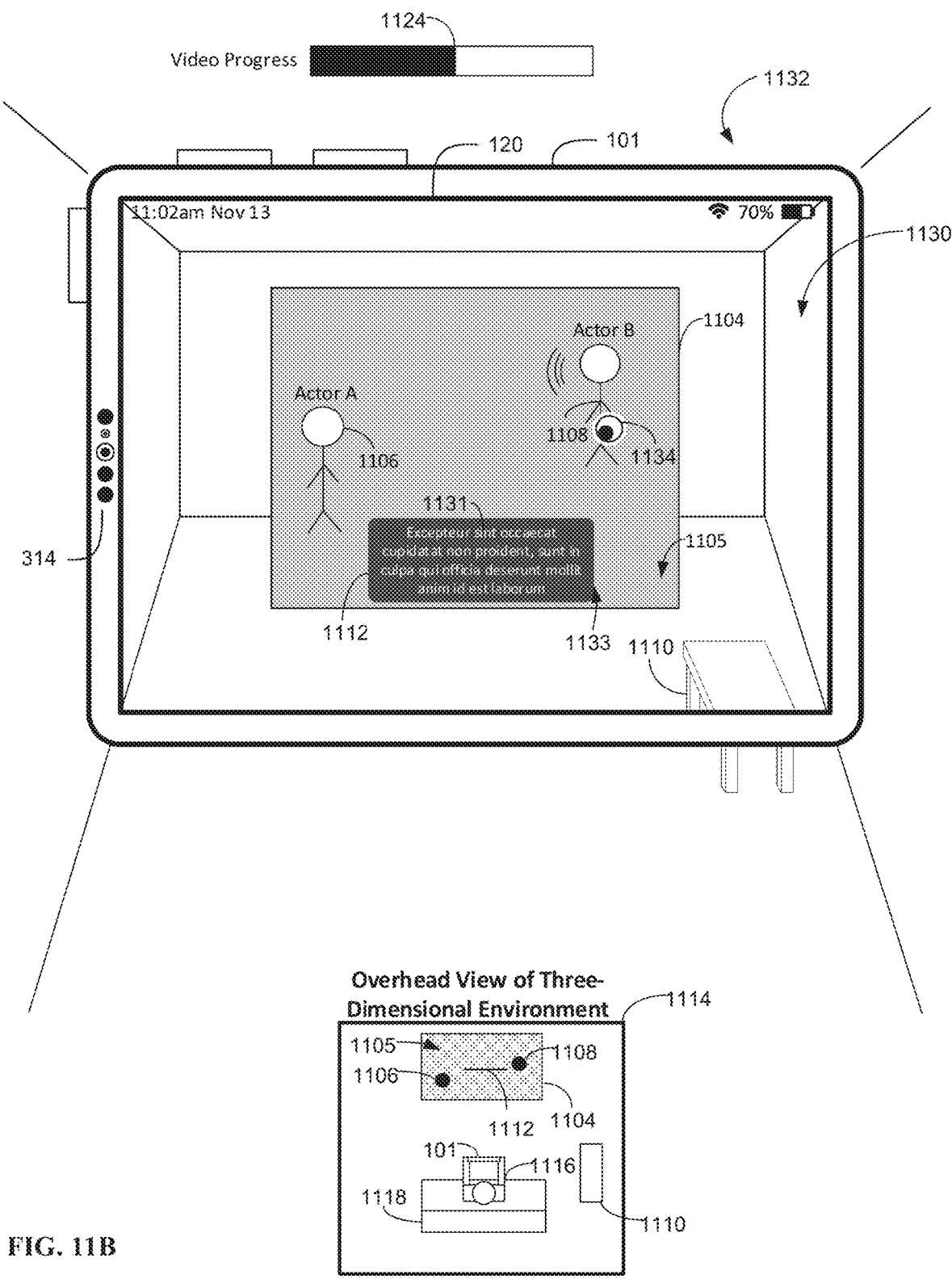
Figure 11C:
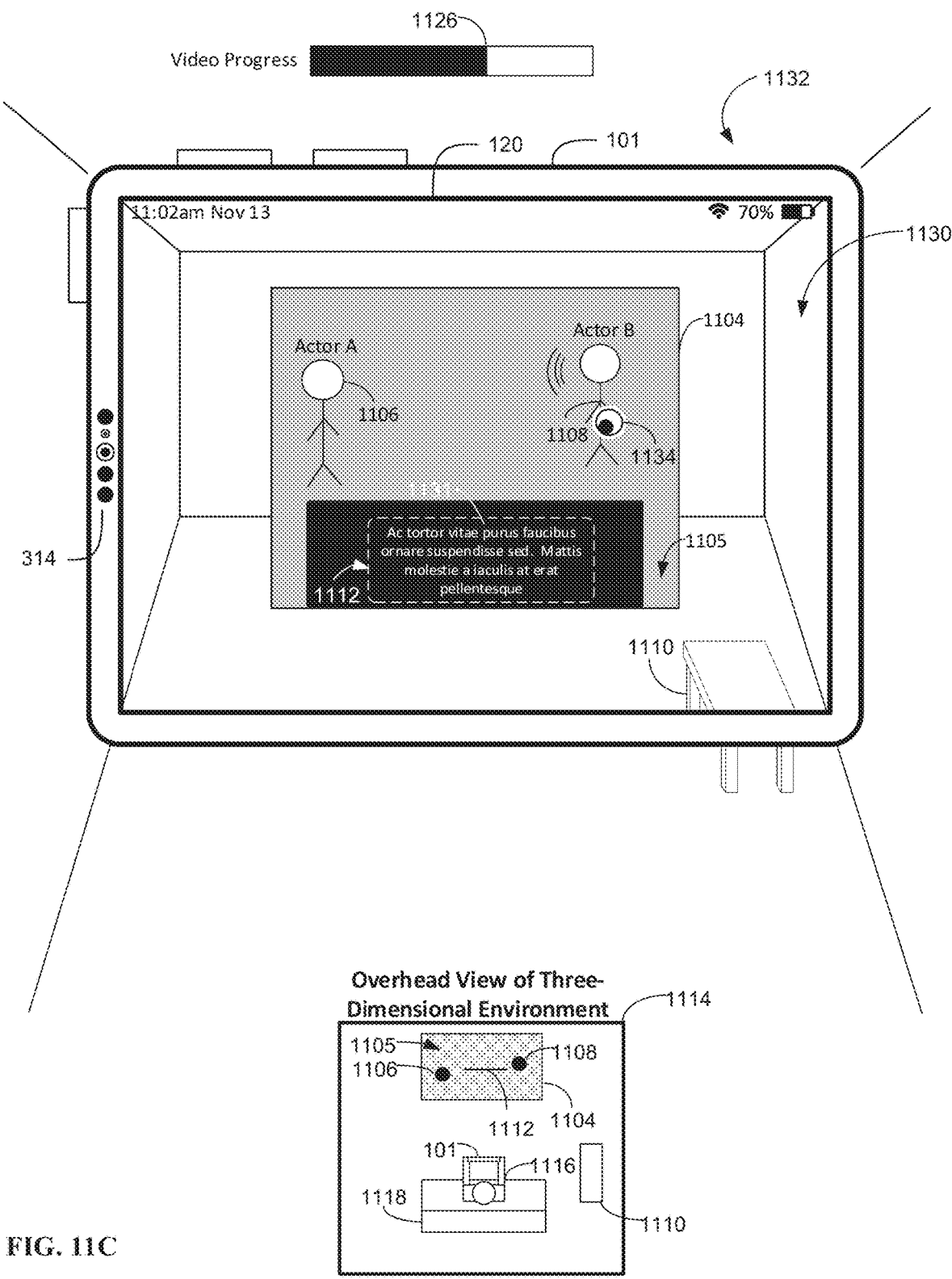
Figure 12A:
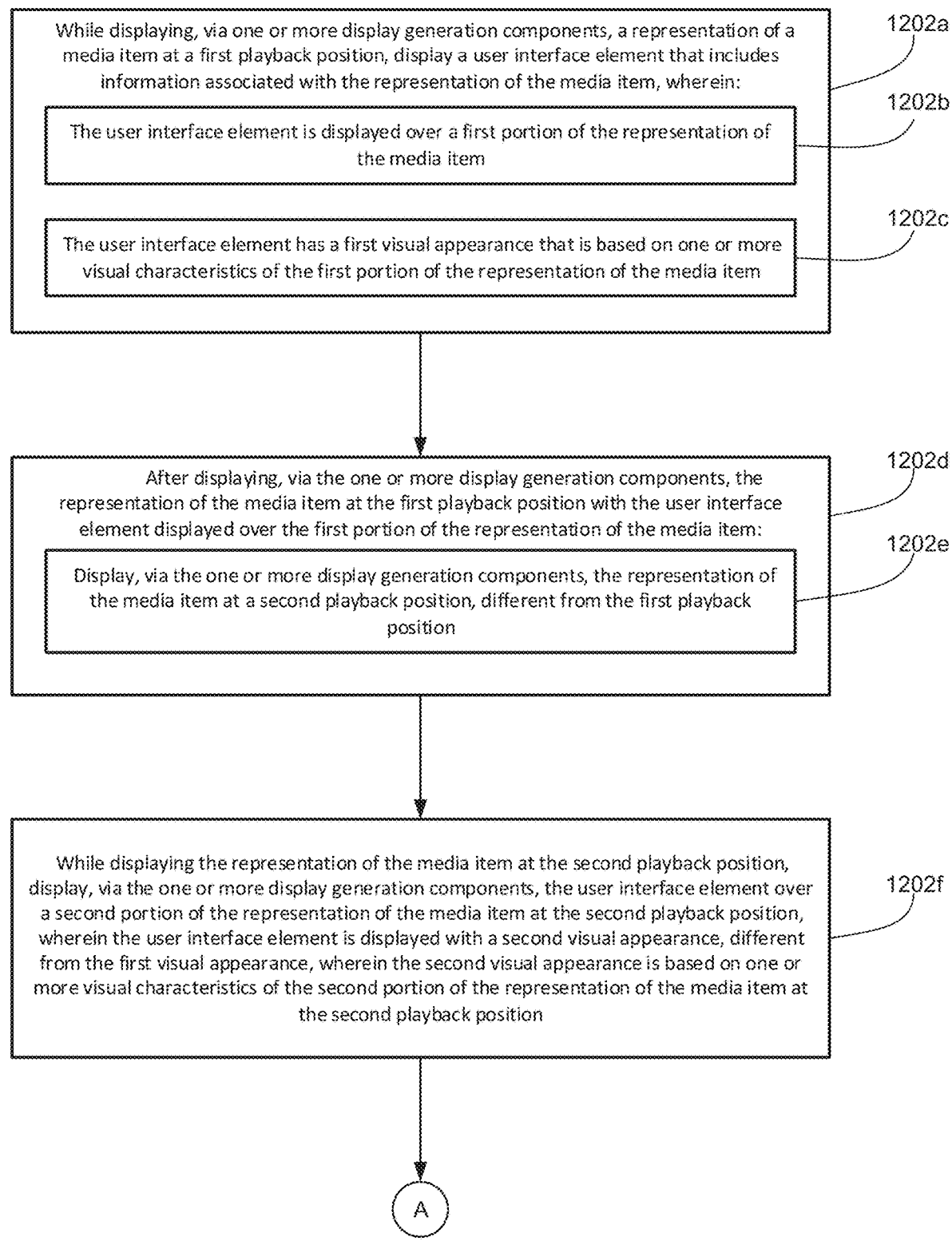
FIGS. 12A-12F is a flowchart illustrating a method of displaying video captions with different visual appearances in accordance with some embodiments.
Figure 12B:
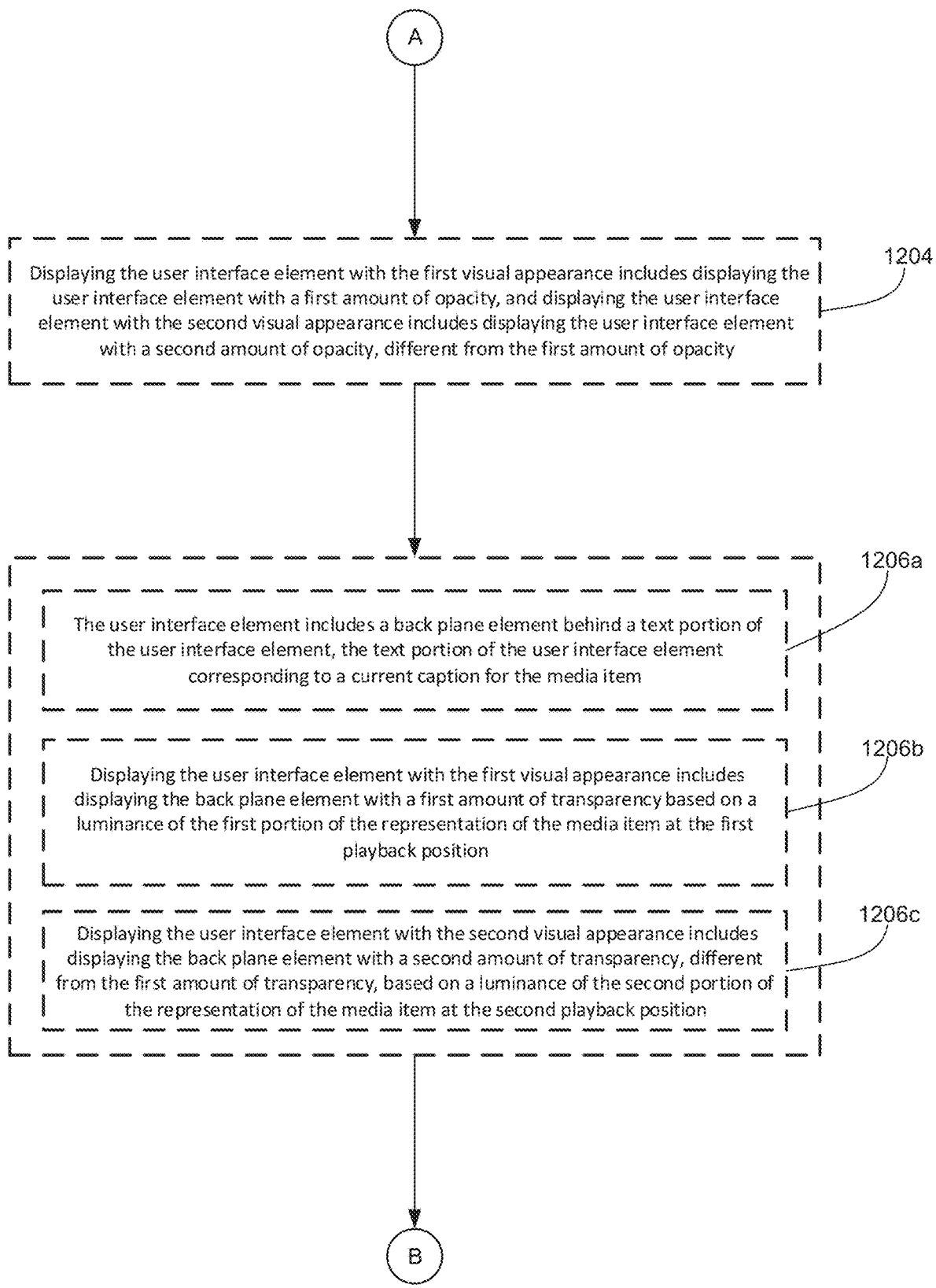
Figure 12C:
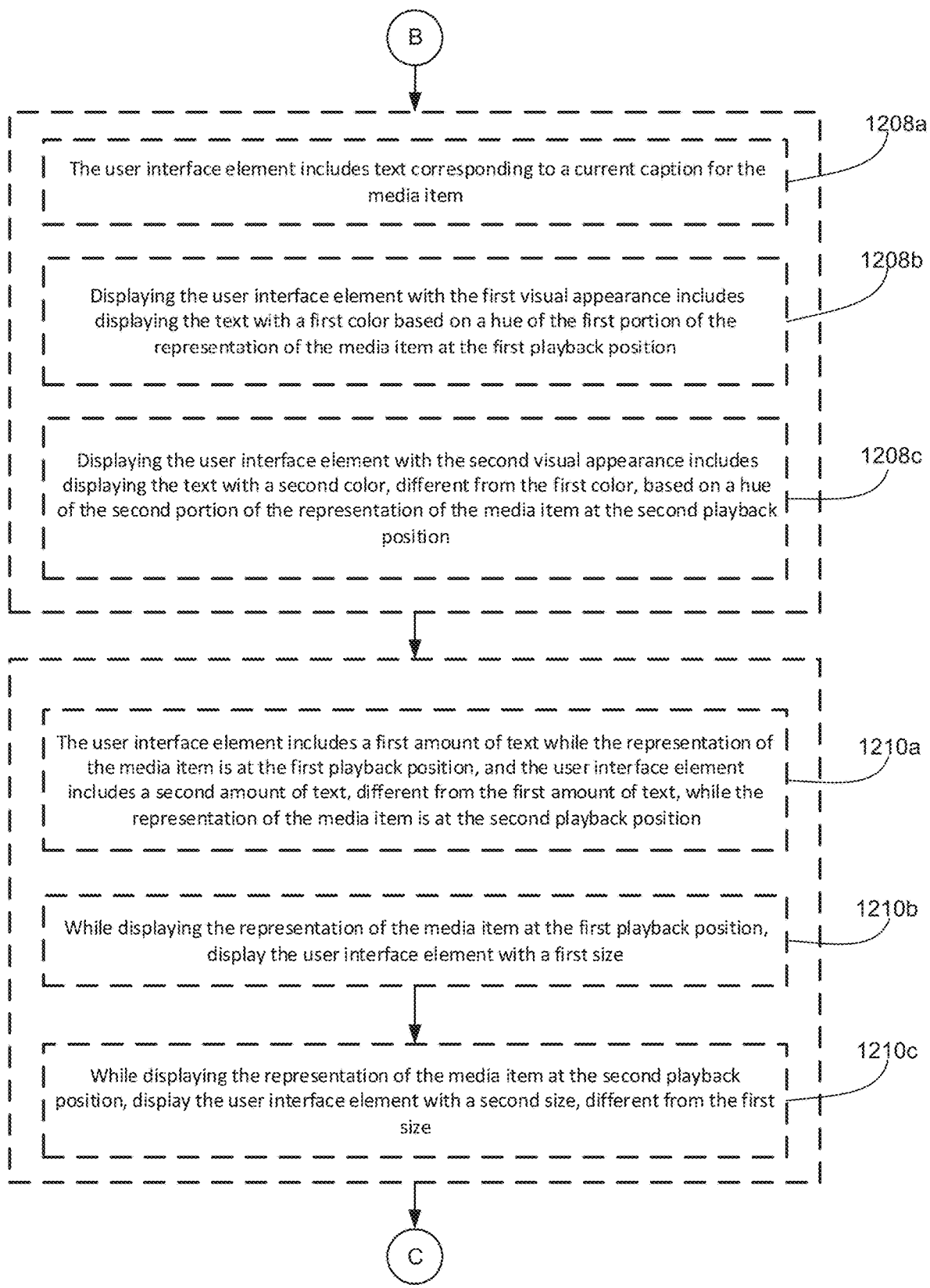
Figure 12D:
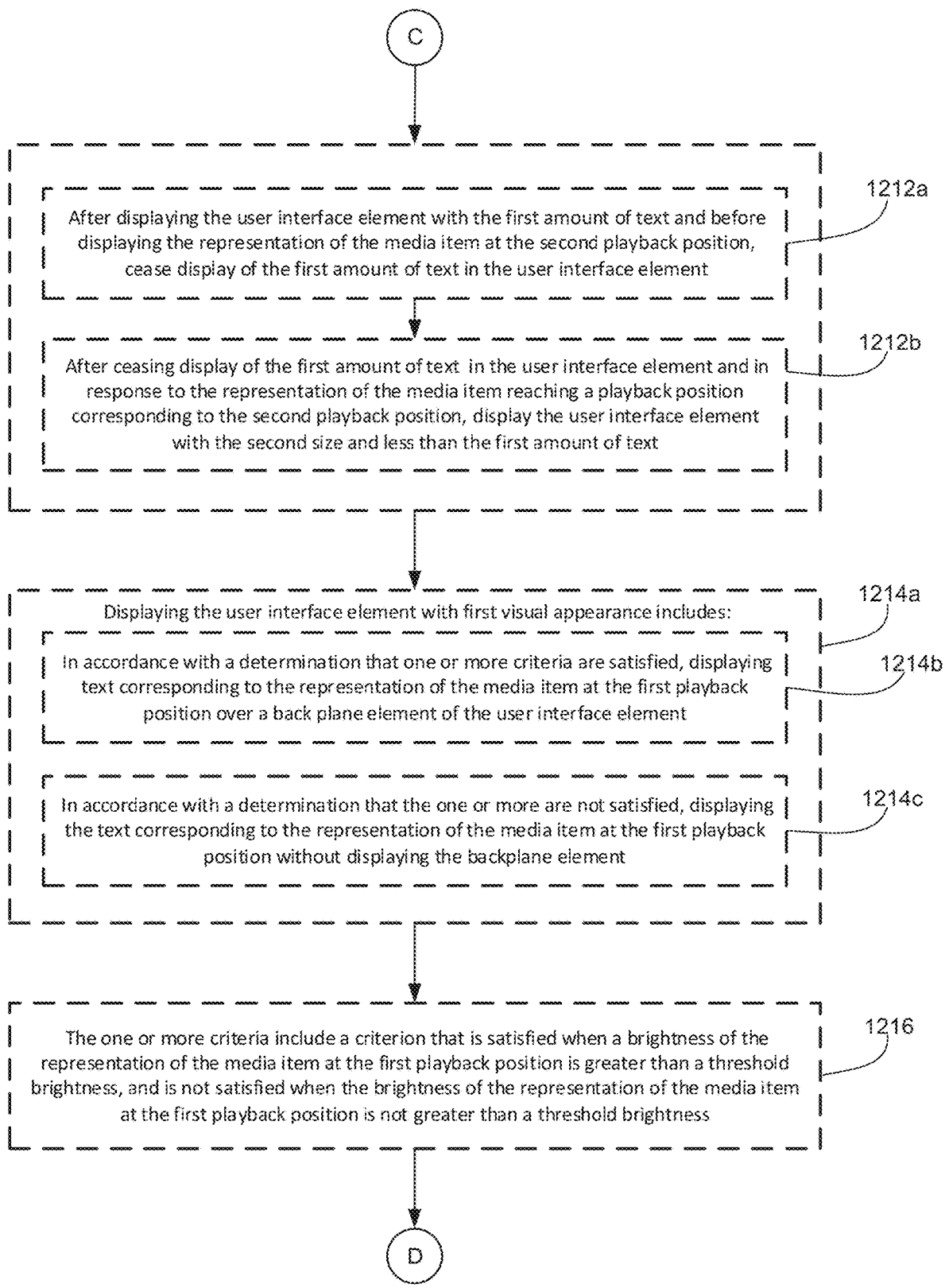
Figure 12E:
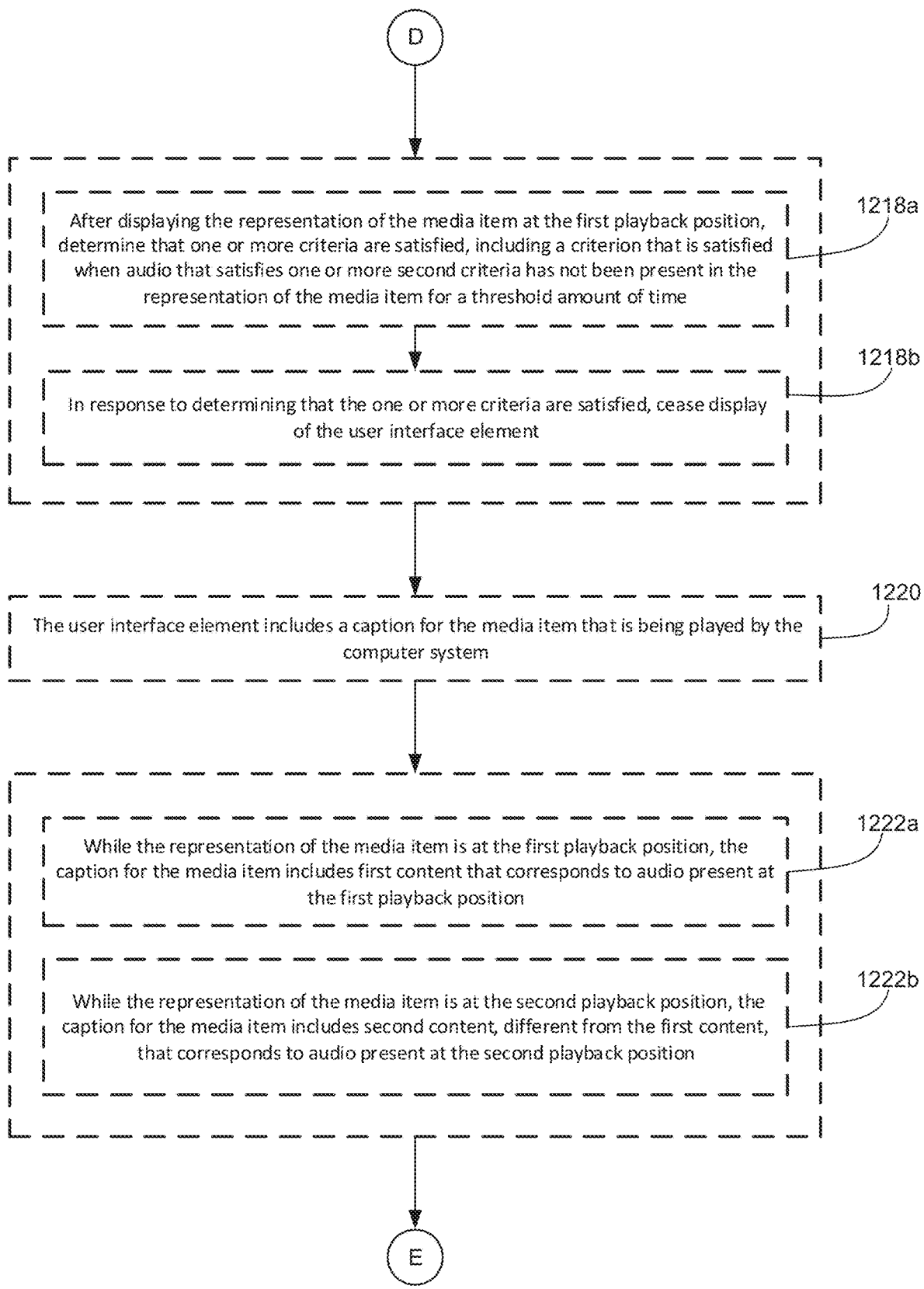
Figure 12F:
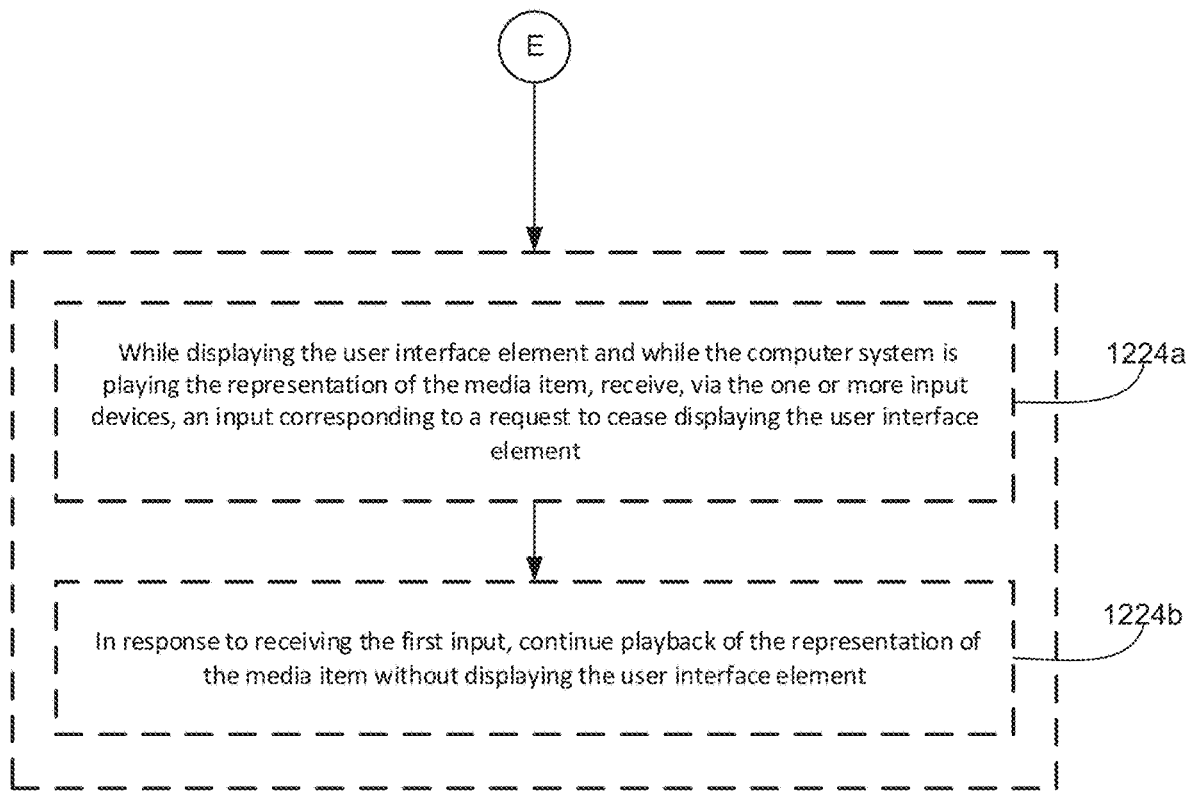

FIGS. 1-6 provide a description of example computer systems for providing XR experiences to users (such as described below with respect to methods 800, 1000 and/or 1200). FIGS. 7A-7E illustrate examples of how an electronic device displays video captions for media items that have content at different depths in accordance with some embodiments of the disclosure. FIGS. 8A-8I is a flowchart illustrating an exemplary method of displaying video captions for media items that have content at different depths in accordance with some embodiments. The user interfaces in FIGS. 7A-7E are used to illustrate the processes in FIGS. 8A-8I. FIGS. 9A-9E illustrate examples of how an electronic device displays video captions for a media item based on an attention of a user of the electronic device in accordance with some embodiments of the disclosure. FIGS. 10A-10G is a flowchart illustrating a method of displaying video captions for a media item based on an attention of a user of an electronic device in accordance with some embodiments. The user interfaces in FIGS. 9A-9E are used to illustrate the processes in FIGS. 10A-10G. FIGS. 11A-11C illustrate examples of how an electronic device displays video captions with different visual appearances in accordance with some embodiments of the disclosure. FIGS. 12A-12F is a flowchart illustrating a method of displaying video captions with different visual appearances in accordance with some embodiments. The user interfaces in FIGS. 11A-11C are used to illustrate the processes in FIGS. 12A-12F.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Figure 1:
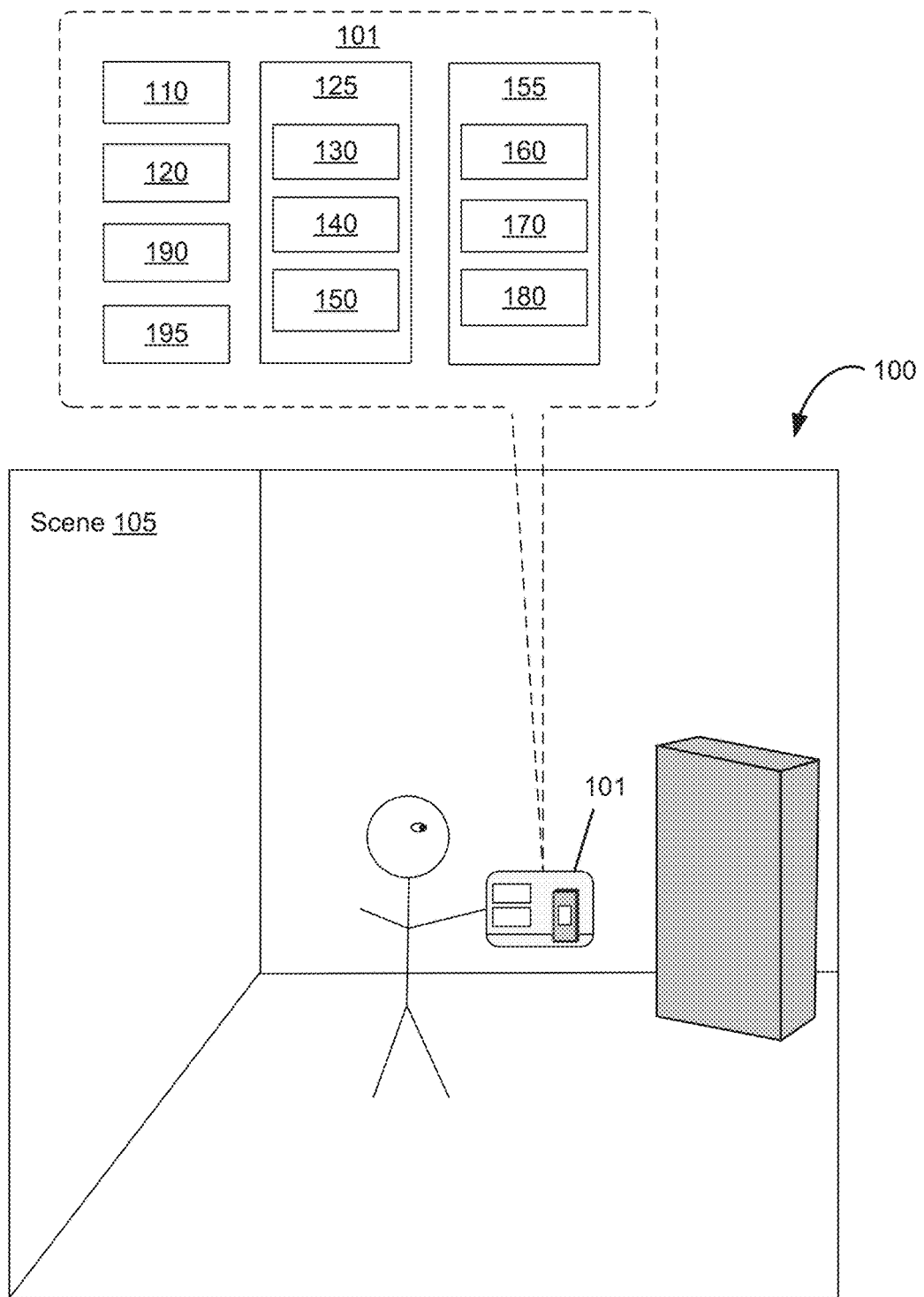
FIG. 1 is a block diagram illustrating an operating environment of a computer system for providing XR experiences in accordance with some embodiments.

In some embodiments, as shown in FIG. 1, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
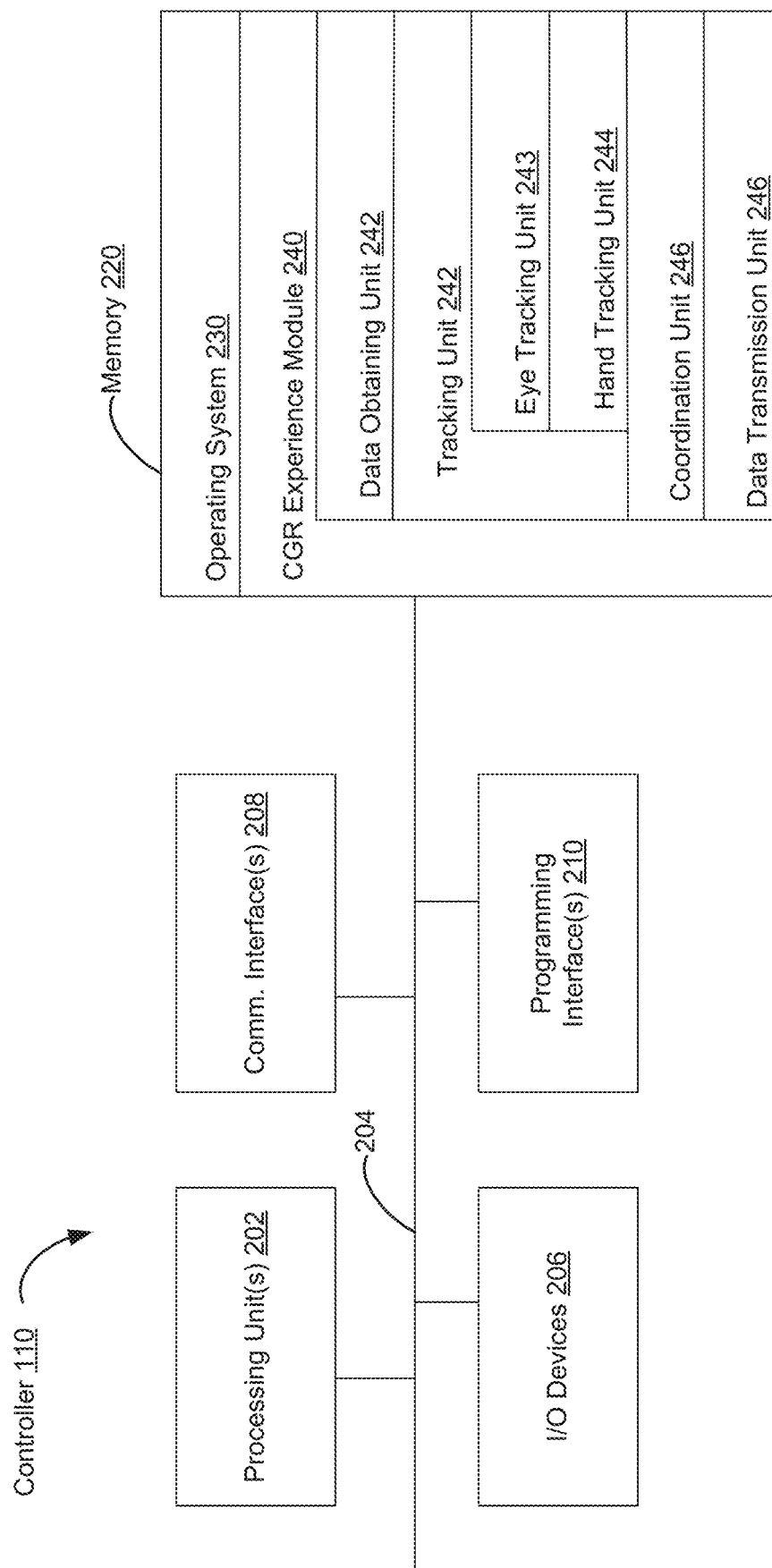
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
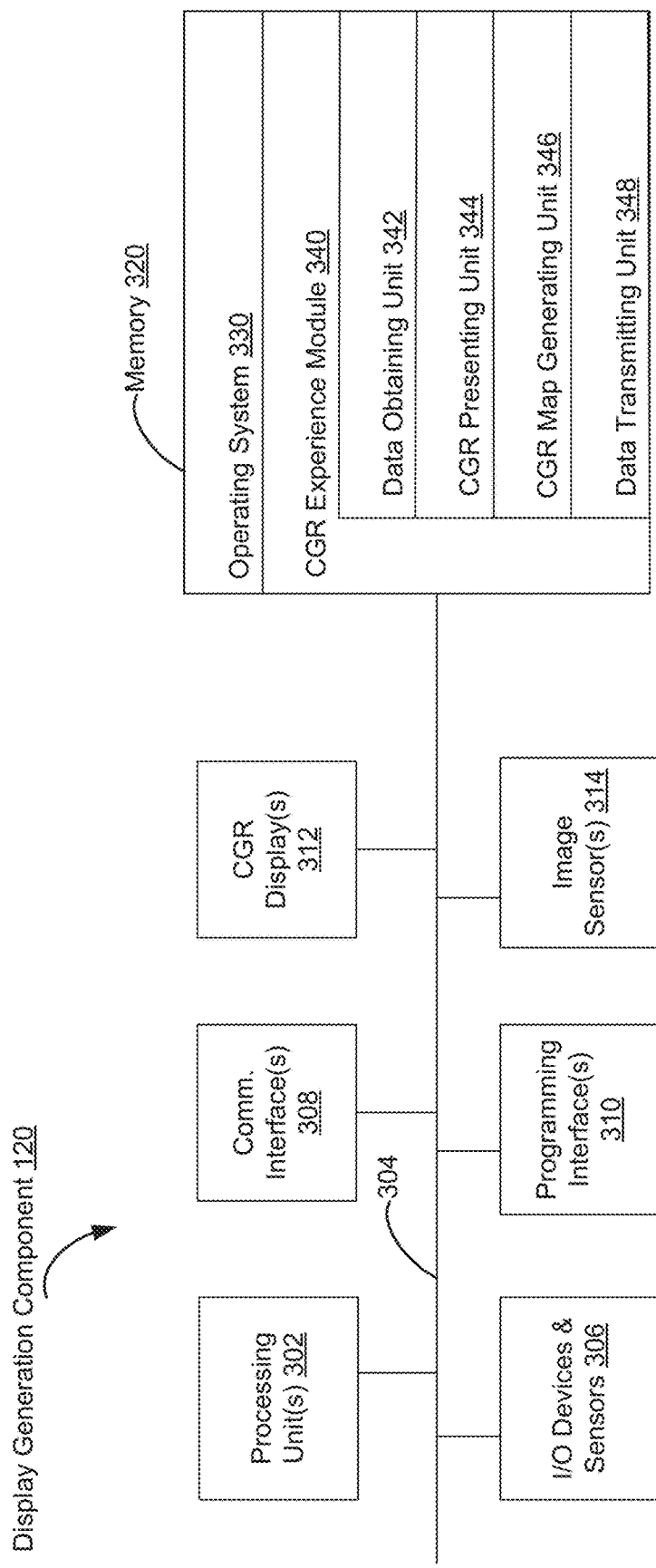
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
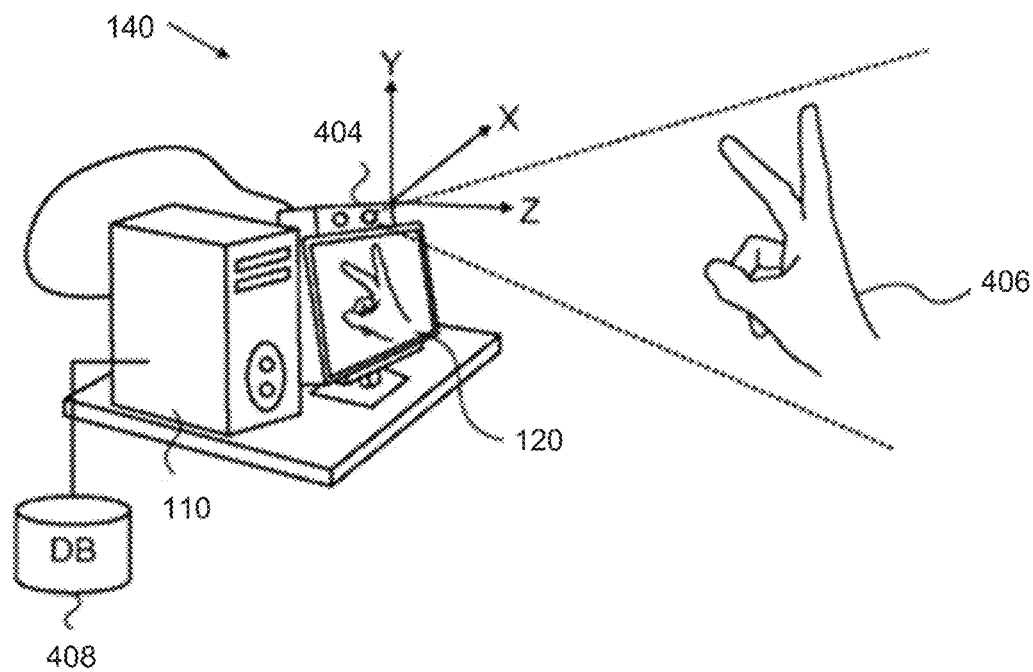
FIG. 4 is a block diagram illustrating a hand tracking unit of a computer system that is configured to capture gesture inputs of the user in accordance with some embodiments.
Figure 4:
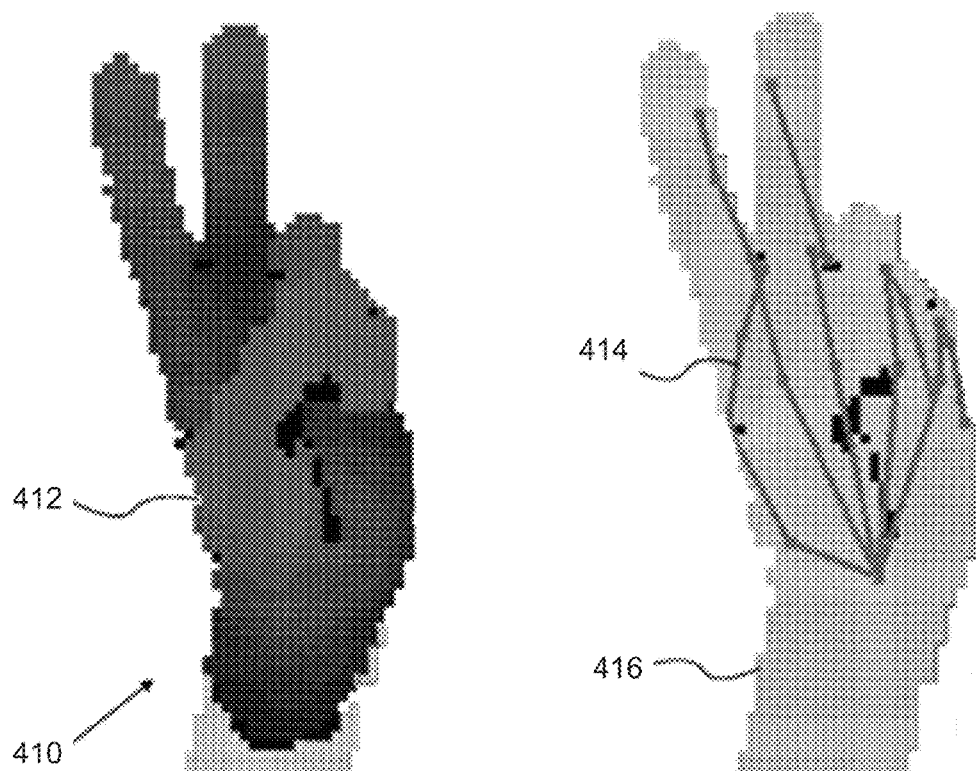

FIG. 4 is a schematic, pictorial illustration of an example embodiment of the hand tracking device 140. In some embodiments, hand tracking device 140 (FIG. 1) is controlled by hand tracking unit 244 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands)

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
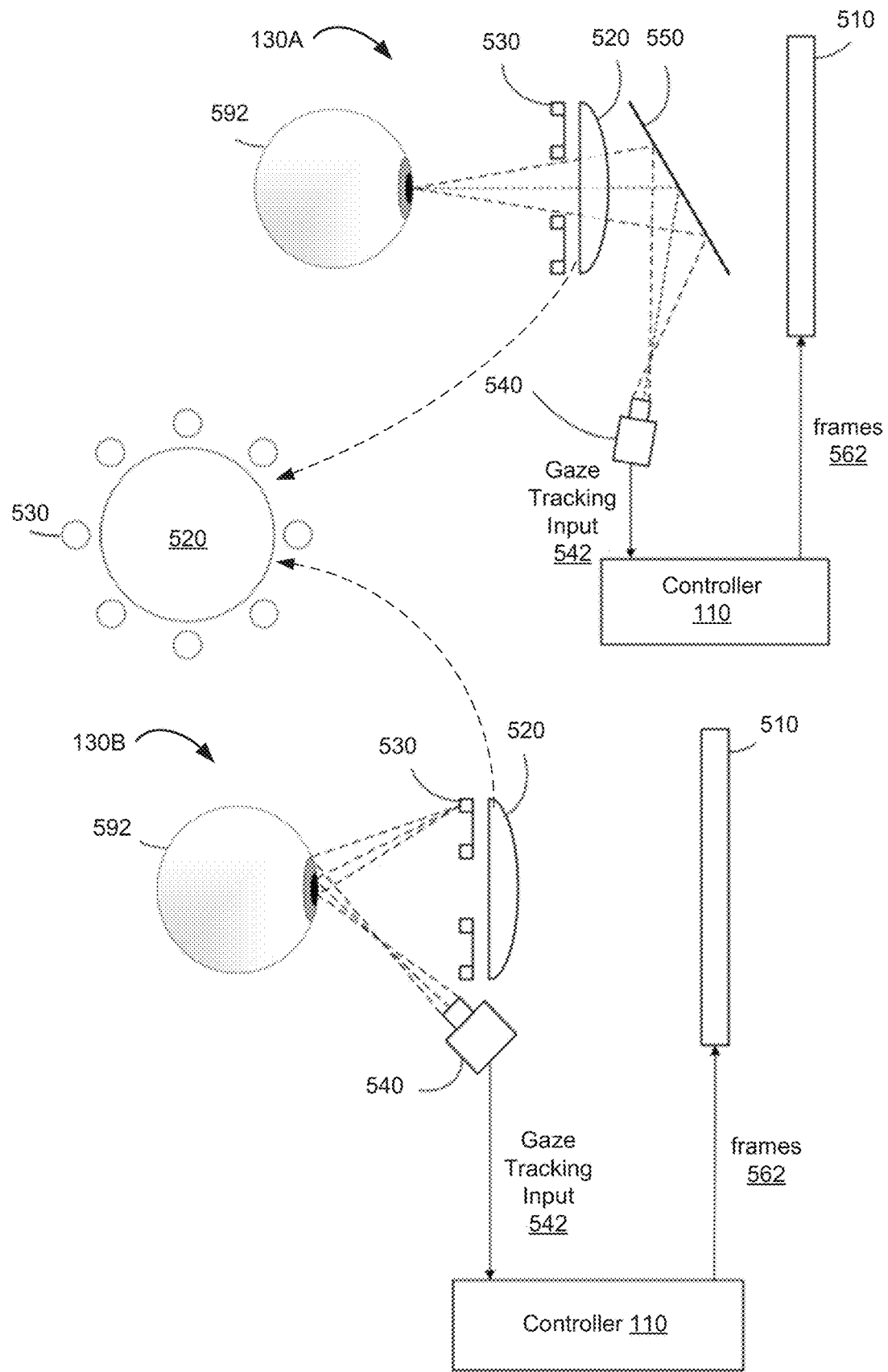
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
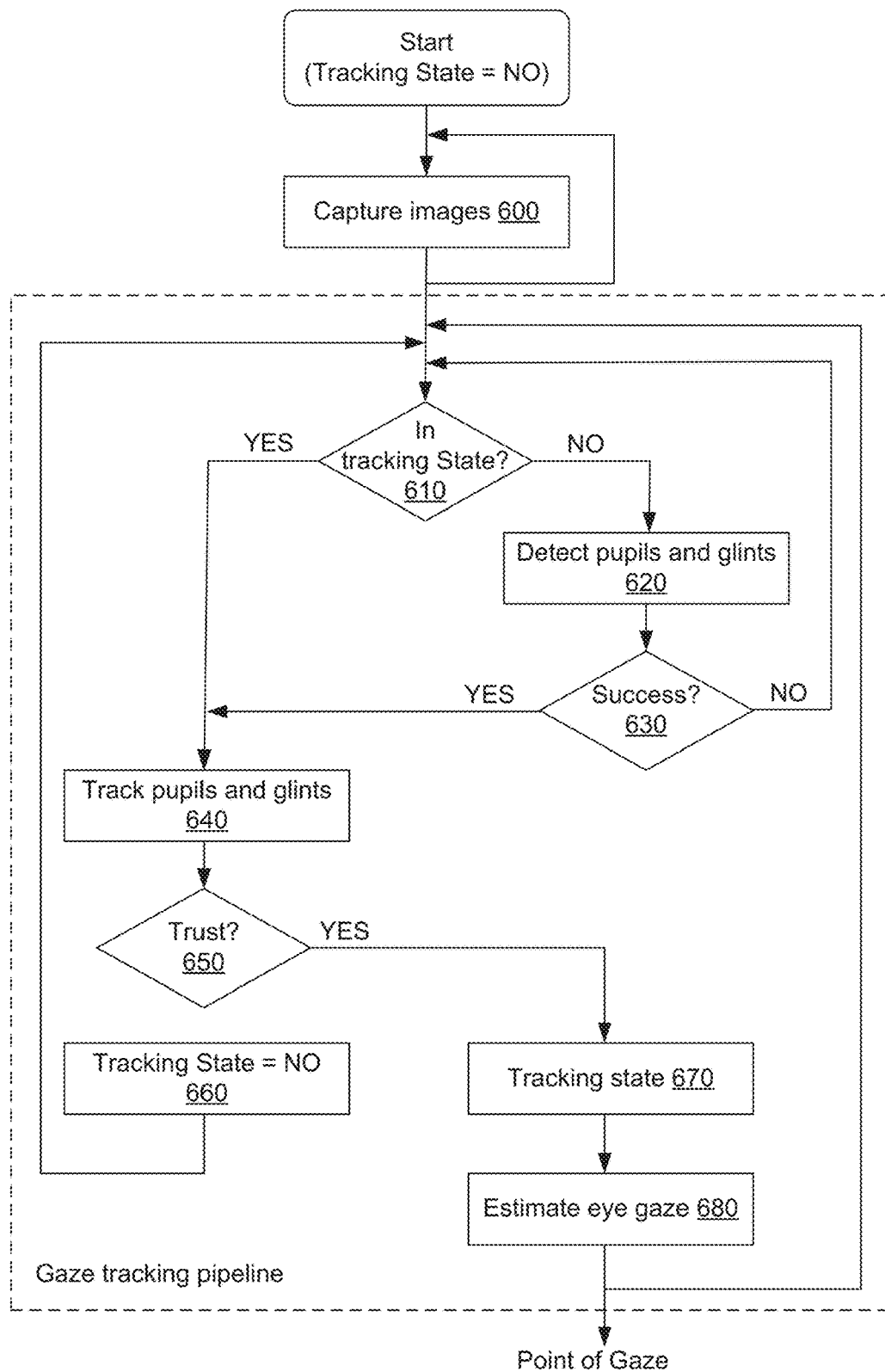
FIG. 6 is a flowchart illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of an computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

Similarly, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

FIGS. 7A-7E illustrate examples of how an electronic device displays video captions for media items that have content at different depths in accordance with some embodiments of the disclosure.

Figure 7A:
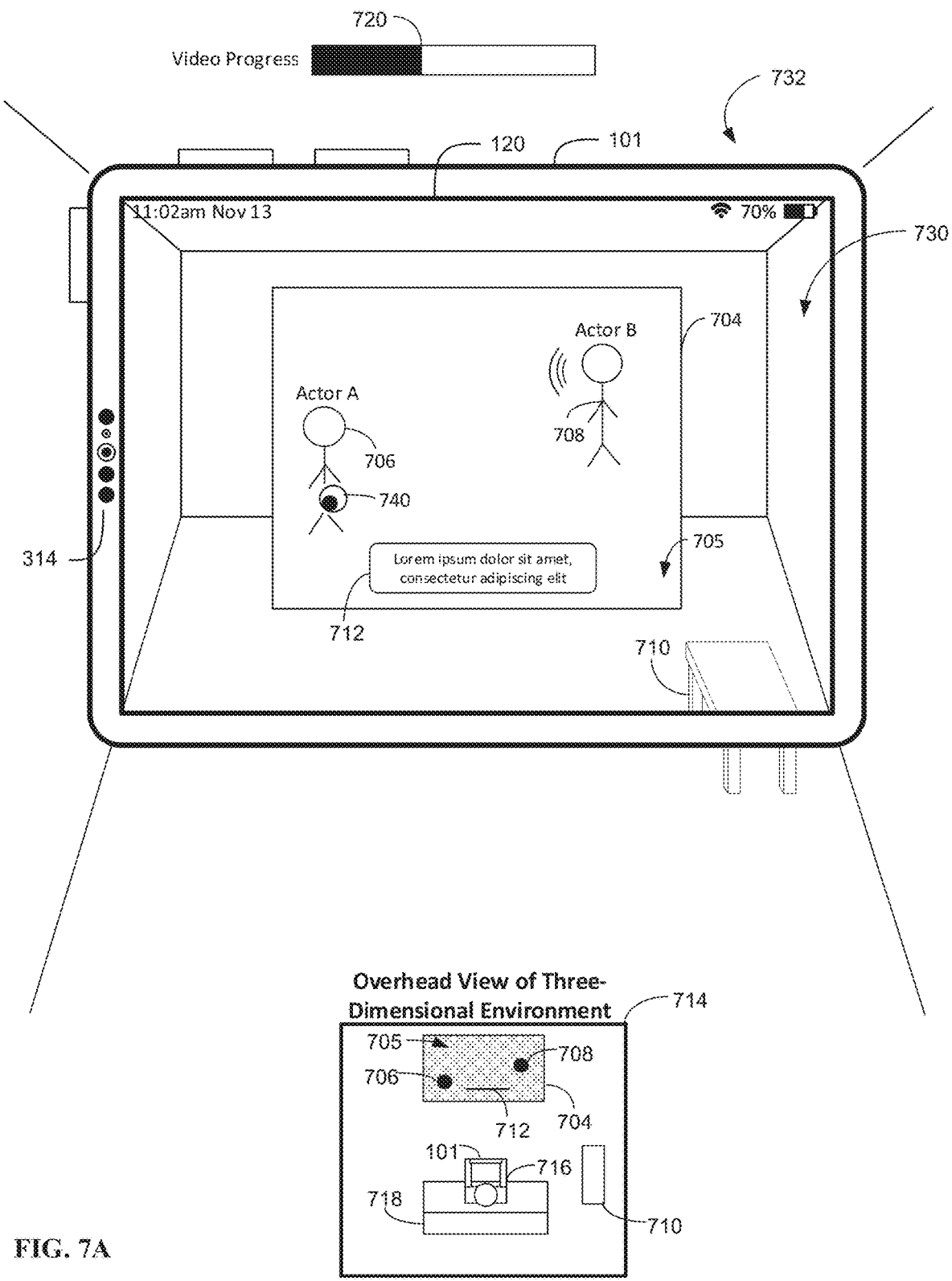
FIGS. 7A-7E illustrate examples of how an electronic device displays video captions for media items that have content at different depths in accordance with some embodiments of the disclosure.

FIG. 7A illustrates a three-dimensional environment 730 that is being displayed by an electronic device 101 and an overhead view 714 of the three-dimensional environment 730. As described above with reference to FIGS. 1-6, the electronic device 101 optionally includes a display generation component 120 (e.g., a touch screen) and a plurality of image sensors (e.g., image sensors 314 of FIG. 3). The image sensors optionally include one or more of a visible light camera, an infrared camera, a depth sensor, or any other sensor that the electronic device 101 would be able to use to capture one or more images of a user or a part of the user while the user interacts with the electronic device 101. In some embodiments, the user interfaces shown below could also be implemented on a head-mounted display that includes a display generation component that displays the user interface to the user and sensors to detect the physical environment, movements of the user's hands (e.g., external sensors facing outwards from the user), and/or gaze of the user (e.g., internal sensors facing inwards towards the face of the user).

In some embodiments, the three-dimensional environment 730 includes one or more representations of physical objects in the physical environment 732 of the electronic device 101 and/or one or more virtual objects (e.g., objects that are not located in the physical environment 732 but are generated and displayed by the electronic device 101). For example, in FIG. 7A, the three-dimensional environment 730 includes a representation 710 of a table that is in the physical environment 732 of the electronic device 101. In some embodiments, the representation 710 of the table is a photorealistic, simplified, or cartoon representation of the table in the physical environment 732 and is displayed in the three-dimensional environment 730 in response to the image sensors 314 of the electronic device 101 capturing one or more images of the table in the physical environment 732. Alternatively, in some embodiments, the representation 710 of the table and/or other portions of the physical environment 732 are passively visible via the electronic device 101 and/or display generation component 120 via a transparent or translucent display (e.g., display generation component 120) of the electronic device 101.

Additionally, as shown in FIG. 7A, the three-dimensional environment 730 also includes a media user interface object 704 (e.g., a virtual object). In some embodiments, the media user interface object 704 is a user interface of a media application that is currently running on the electronic device 101 (e.g., a user interface of an application that plays audio and/or video items). In some embodiments, the media user interface object 704 presents a representation of a two-dimensional or three-dimensional media item (e.g., movie, TV show, live sports game, or the like). When the media user interface object 704 is presenting a representation of a two-dimensional media item, the media user interface object 704 optionally has a length and/or width (e.g., X and/or Y boundaries) within which the representation of the two-dimensional media item is presented (e.g., two-dimensional media items are presented in a plane at the media user interface object 704). Conversely, if the media user interface object 704 is presenting a representation of a three-dimensional media item, the media user interface object 704 optionally has a length, width, and/or depth (e.g., X, Y and/or Z boundaries) within which the representation of the three-dimensional media item is presented. For example, as shown in the overhead view 714 in FIG. 7A, the electronic device 101 is currently presenting a representation of a media item 705—which is three-dimensional—within the length, width, and depth of the media user interface object 704 (e.g., the X, Y, and Z boundaries of the media user interface object 704).

In some embodiments, the representation of the media item 705 includes content that is at different depths in the representation of the media item 705. For example, as shown in the overhead view 714 in FIG. 7A, the representation of the media item 705 is currently presenting content corresponding to a first playback position 720, which includes an Actor A 706 (e.g., a first portion of the representation of the media item 705) at a first location and a first depth in the representation of the media item 705 and Actor B 708 (e.g., a second portion of the representation of the media item 705) at a second location (e.g., different from the first location) and a second depth (e.g., different from the first depth) in the representation of the media item 705. In some embodiments, the depth and/or the location of one or more portions of the representation of the media item 705 is determined by the content creator of the media item 705. In some embodiment, the depth of a portion of the representation of the media item 705 corresponds to the depth and/or distance of that portion of the representation of the media item 705 from the viewpoint of the user.

Additionally, as shown in FIG. 7A, the electronic device 101 is displaying a video captions user interface element 712. As will be described in more detail in FIGS. 11A-11C and method 1200, in some embodiments, the video captions user interface element 712 includes a back plane element and text (e.g., a caption or subtitle) that corresponds to the spoken and/or non-spoken audio present at the first playback position 720. For example, in FIG. 7A, Actor B 708 is currently speaking at the first playback position 720, and as a result, the words spoken by Actor B 708 are displayed in text at the video captions user interface element 712. In some embodiments, if audio (e.g., speech) is not present at the first playback position 720, the electronic device 101 optionally does not display the video captions user interface element 712 while the representation of the media item 705 is at the first playback position 720.

In some embodiments, the electronic device 101 displays the user interface element 712 at an X-location (e.g., horizontal location relative to the viewpoint of the user 716), Y-location (e.g., vertical location relative to the viewpoint of the user 716), and/or Z-location (e.g., distance relative to the viewpoint of the user 716) based on the X, Y, and/or Z location of the portion of the representation of the media item 705 to which the attention of the user 716 is directed (e.g., the user of the electronic device 101). As described in more detail in method 1000, the attention of the user 716 is optionally determined based on a gaze 740 of the user 716 and/or based on a head position of the user 716. For example, in FIG. 7A, the electronic device 101 has optionally detected/determined that the attention of the user 716 is directed to Actor A 706 in response to detecting, via the one or more sensors 314, that a gaze 740 of the user 716 is directed to Actor A 706 and/or in response to detecting, via the one or more sensors 314, that a head of the user 716 is oriented towards Actor A 706.

In response to the electronic device 101 detecting/determining that the attention of the user 716 is directed to Actor A 706, the electronic device 101 optionally displays the user interface element 712 at the location indicated in FIG. 7A because the X, Y, and Z location of the user interface element 712 in FIG. 7A corresponds to the X, Y, and Z location of Actor A 706 (e.g., the user interface element 712 is displayed at an X-location that is offset from (to the right of) Actor A 706, at a Y-location that is offset (below) Actor A 706, and at a Z-location that is 0.0, 0.1, 0.2, 0.3, 0.7, 1, or 2 millimeters or 0.5, 1, 3, 5, 10, 30 or 50 cm in front of Actor A 706). It should be noted that while the above embodiment describes an example where the user interface element 712 is displayed below and to the right of Actor A 706 in response to detecting that the attention of the user 716 is directed to Actor A 706, it should be understood that the user interface element 712 could also have been displayed offset in any direction from Actor A 706 or overlaid on Actor A 706 in response to detecting that the attention of the user 716 is directed to Actor A 706.

As also shown in the overhead view 714 in FIG. 7A, the electronic device 101 is displaying the video captions user interface element 712 at a first distance from the viewpoint of the user 716 (which is currently located in the center of the three-dimensional environment 730 and oriented towards the top/back portions of the three-dimensional environment 730). In some embodiments, the distance at which the electronic device 101 displays the video captions user interface element 712 from the viewpoint of the user 716 (e.g., the Z-location of the video captions user interface element 712) is based on the depth of the portion of the representation of the media item 705 to which the attention of the user 716 is currently directed. For example, in FIG. 7A, the video captions user interface element 712 is optionally being displayed at the first distance from the viewpoint of the user 716 (the distance indicated in the overhead view 714 in FIG. 7A) because the electronic device 101 started displaying the video captions user interface element 712 at a same or similar depth as Actor A 706 in the representation of the media item 705 (e.g., 0.0, 0.1, 0.2, 0.3, 0.7, 1, or 2 millimeters or 0.5, 1, 3, 5, 10, 30 or 50 cm in front of Actor A 706) in response to the electronic device 101 detecting that the attention of the user 716 is currently directed to Actor A 706. In some embodiments, the electronic device 101 displays video captions user interface element 712 at a particular depth and/or distance from the viewpoint of the user using stereoscopic depth effects.

In some embodiments, the distance at which the electronic device 101 displays the video captions user interface element 712 from the viewpoint of the user 716 is not based on the depth of the portion of the representation of the media item 705 to which the attention of the user is directed, but rather based on the depth of the portion of the representation of the media item 705 that is closest to the viewpoint of the user 716. For example, as shown in the overhead view 714 in FIG. 7A, at the first playback position 720, Actor A 706 is at a depth in the representation of the media item 705 that is closer to the viewpoint of the user 716 than Actor B 708. Thus, the video captions user interface element 712 is optionally displayed at the distance from the viewpoint of the user 716 indicated in the overhead view 714 in FIG. 7A because the electronic device 101 started displaying the video captions user interface element 712 at a same or similar depth as Actor A 706 in the representation of the media item 705 (e.g., 0.0, 0.1, 0.2, 0.3, 0.7, 1, or 2 millimeters or 0.5, 1, 3, 5, 10, 30 or 50 cm in front of Actor A 706) in response to the electronic device 101 determining that Actor A 706 is the portion of the representation of the media item 705 that is closest to the viewpoint of the user 716.

Figure 7B:
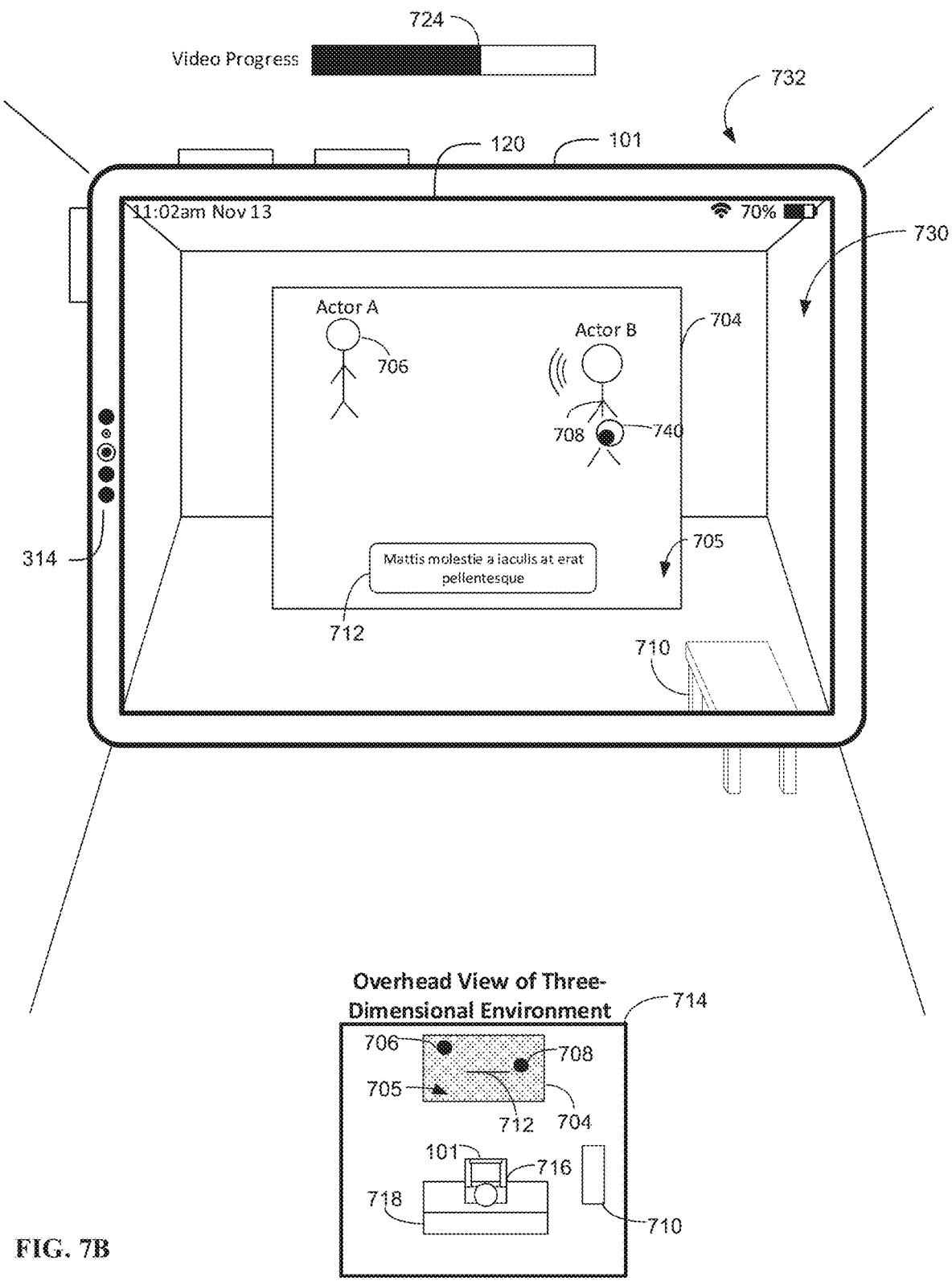

In some embodiments, as the electronic device 101 plays the representation of the media item 705, the representation of the media item 705 progresses through content corresponding to different playback positions. For example, in FIG. 7B, the playback position within the representation of the media item 705 has advanced from the first playback position 720 (as illustrated in the progress bar in FIG. 7A) to a second playback position 724 in the representation of the media item 705 (as illustrated in the progress bar in FIG. 7B). In response to the playback position in the representation of the media item 705 changing from the first playback position 720 to the second playback position 724, the electronic device 101 has updated the representation of the media item 705 to include content corresponding to the second playback position 724, as shown in FIG. 7B. In particular, while the representation of the media item 705 corresponds to the second playback position 724, the representation of the media item 705 includes Actor A 706 at a third depth in the representation of the media item 705 (e.g., at a depth in the representation of the media item 705 that is further from the viewpoint of the user 716 than in FIG. 7A) and Actor B 708 at the same depth in the representation of the media item 705 as illustrated in FIG. 7A (e.g., the depth of Actor B 708 did not change between the first playback position 720 and the second playback position 724).

Additionally, as shown in FIG. 7B, because Actor A 706 is now being displayed at the third depth in the representation of the media item 705, Actor A 706 is no longer the portion of the representation of the media item 705 that is closest to the viewpoint of the user 716, and Actor B 708 is now the portion of the representation of the media item 705 that is closest to the viewpoint of the user 716. In some embodiments, the distance at which the electronic device 101 displays the video captions user interface element 712 from the viewpoint of the user 716 changes as the distance between the viewpoint of the user 716 and the portion of the representation of the media item 705 that is closest to the viewpoint of the user 716 changes. For example, in FIG. 7B, the electronic device 101 is optionally no longer displaying the video captions user interface element 712 at the first distance from the viewpoint of the user 716 described and illustrated in FIG. 7A because Actor A 706 is no longer the portion of the representation of the media item 705 that is closest to the viewpoint of the user 716 (as shown in the overhead view 714 in FIG. 7A). Instead, as shown in the overhead view 714 in FIG. 7B, the electronic device 101 is now displaying the video captions user interface element 712 at a second distance from the viewpoint of the user 716 (e.g., at a further distance from the viewpoint of the user 716 as compared to FIG. 7A) because the electronic device 101 is now displaying the video captions user interface element 712 at a same or similar depth as Actor B 708 in the representation of the media item 705 (e.g., 0.0, 0.1, 0.2, 0.3, 0.7, 1, or 2 millimeters or 0.5, 1, 3, 5, 10, 30 or 50 cm in front of Actor B 708) in response to the electronic device 101 determining that Actor B 708 is now the portion of the representation of the media item 705 that is closest to the viewpoint of the user 716.

In some embodiments, the electronic device 101 did not update/change the distance of the video captions user interface element 712 from the viewpoint of the user 716 in response to determining that the portion of the representation of the media item 705 that is closest to the viewpoint of the user 716 changed (as described above), but rather in response to the electronic device 101 detecting a change in the attention of the user 716. For example, in FIG. 7B, the distance at which the electronic device 101 is displaying the video captions user interface element 712 from the viewpoint of the user 716 optionally changed from the first distance indicated in the overhead view 714 in FIG. 7A to the second distance indicated in the overhead view 714 in FIG. 7B (e.g., a distance that is further from the viewpoint of the user 716 as compared to FIG. 7A) because the electronic device 101 started displaying the video captions user interface element 712 at a same or similar depth as Actor B 708 in the media user interface object 704 (e.g., 0.0, 0.1, 0.2, 0.3, 0.7, 1, or 2 millimeters or 0.5, 1, 3, 5, 10, 30 or 50 cm in front of Actor B 708) in response to the electronic device 101 detecting that the gaze 740 of the user 716 changed from being directed to Actor A 706 (as shown in FIG. 7A) to being directed to Actor B 708 (as shown in FIG. 7B).

While FIG. 7B shows that the electronic device 101 is displaying the video captions user interface element 712 further from the viewpoint of the user 716 than in FIG. 7A (e.g., because Actor A 706 and Actor B 708 were at different depths in the media user interface object 704 when the attention of the user 716 changed from Actor A 706 to Actor B 708), it should be understood that if Actor B 708 were being presented at the same depth of Actor A 706 when the attention of the user 716 changed from Actor A 706 to Actor B 708, the distance at which the electronic device 101 is displaying the video captions user interface element 712 from the viewpoint of the user 716 would optionally not have changed. Further, while FIG. 7B shows the video captions user interface element 712 overlaid on the same relative portion of the representation of the media item 705 as in FIG. 7A (e.g., the bottom-center portion of the representation of the media item 705), it should be understood that the electronic device 101 could alternatively display the video captions user interface element 712 overlaid on Actor B 708 (or offset from Actor B) in response to the electronic device 101 detecting that the attention of the user 716 changed from Actor A 706 in FIG. 7A to Actor B 708 in FIG. 7B in similar ways as described in FIGS. 9A-9E.

In some embodiments, the electronic device 101 displays the video captions user interface element 712 at a same/consistent angular size (e.g., the amount of space that the video captions user interface element 712 occupies in the field of view of the user 716 does not change) as the video captions user interface element 712 is displayed closer to or further from the viewpoint of the user 716. For example, even though the video captions user interface element 712 in FIG. 7B is displayed further from the viewpoint of the user 716 than in FIG. 7A (as indicated in the overhead view 714 in FIGS. 7A and 7B), the angular size of the video captions user interface element 712 did not change between FIGS. 7A and 7B (e.g., because device 101 changes the size of video captions user interface element 712 appropriately in the three-dimensional environment to result in the angular size of video captions user interface element 712 not changing).

Alternatively, in some embodiments, as the video captions user interface element 712 is displayed closer to or further from the viewpoint of the user 716, the angular size of the video captions user interface element 712 changes (e.g., the angular size of the video captions user interface element 712 optionally increases as the video captions user interface element 712 is displayed closer to the viewpoint of the user 716 and optionally decreases as the video captions user interface element 712 is displayed further from the viewpoint of the user 716) because the size of the video captions user interface element 712 in the three-dimensional environment does not change, as also described in more detail in method 800. For example, in FIG. 7B, as an alternative to the electronic device 101 displaying the video captions user interface element 712 at a consistent angular size irrespective of the distance at which the electronic device 101 is displaying the video captions user interface element 712 from the viewpoint of the user 716, the electronic device 101 could optionally display the video captions user interface element 712 with a smaller angular size as compared to FIG. 7A because the video captions user interface element 712 in FIG. 7B is displayed further from the viewpoint of the user 716 than in FIG. 7A.

Additionally, as shown in FIG. 7B, the text (e.g., caption) included in the video captions user interface element 712 changed between FIGS. 7A and 7B. The text in the video captions user interface element 712 optionally changed between FIGS. 7A and 7B because the spoken and/or non-spoken audio in the representation of the media item 705 changed between the first playback position 720 and the second playback position 724. For example, the text included in the video captions user interface element 712 optionally changed between FIGS. 7A and 7B because the words spoken by Actor B 708 at the second playback position 724 in the media item 705 are different than the words spoken by Actor B 708 at the first playback position 720 illustrated in FIG. 7A.

Figure 7C:
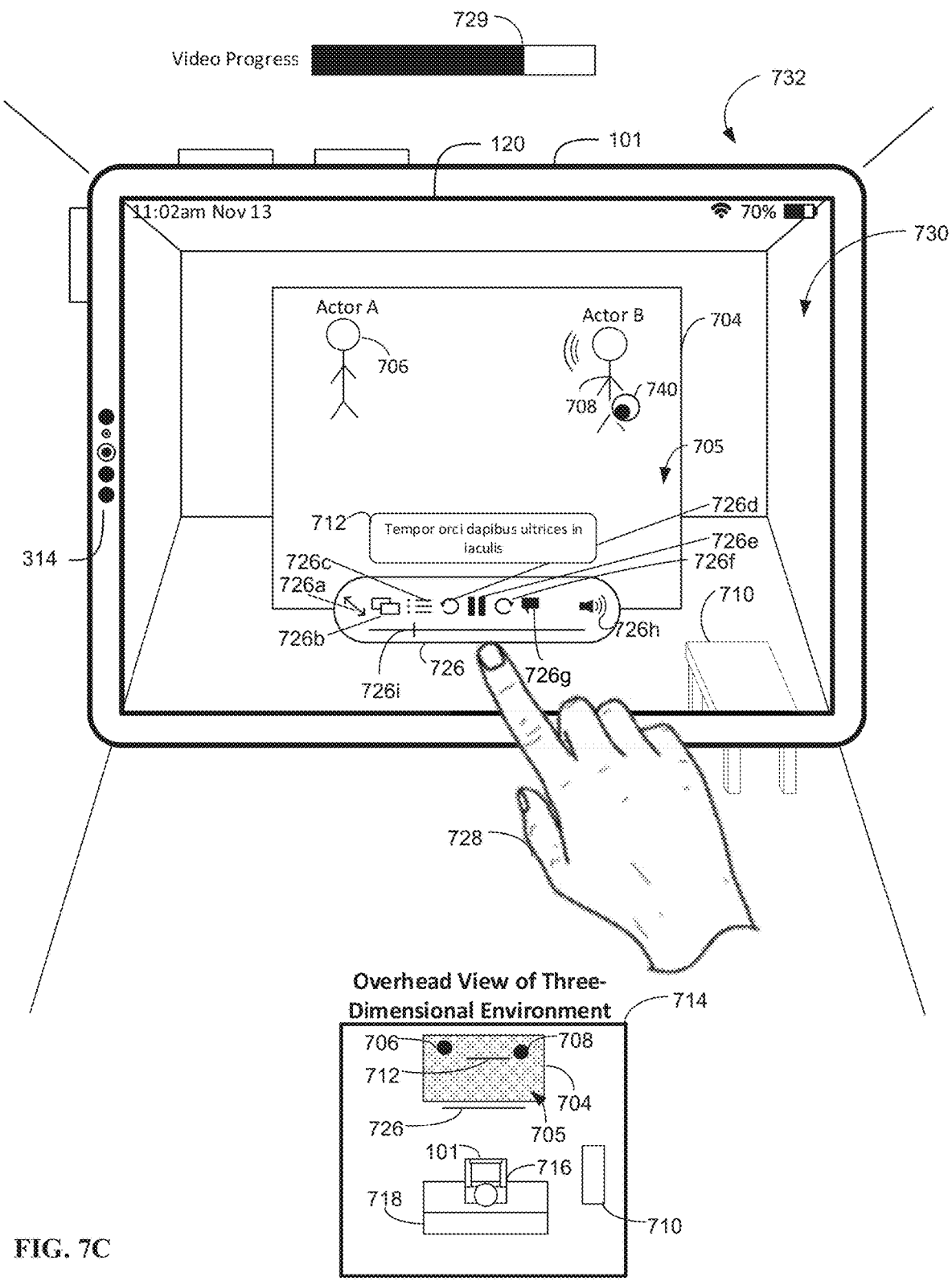

In some embodiments, the electronic device 101 displays playback controls for the representation of the media item 705, such as the playback controls user interface 726 illustrated in FIG. 7C. In some embodiments, the electronic device 101 started displaying the playback controls user interface 726 in response to detecting that a hand 728 of the user 716 is in a ready state configuration (optionally while the attention of the user is directed to the representation of the media item 705). As described previously, in some embodiments, the hand 728 of the user 716 is optionally in the ready state configuration/pose when the electronic device 101 detects that the hand 728 of the user 716 in a predetermined hand shape, such as a pre-tap hand shape as illustrated in FIG. 7C (and/or a pre-pinch hand shape).

In some embodiments, the playback controls user interface 726 includes one or more selectable options for modifying playback of the representation of the media item 705. For example, as shown in FIG. 7C, the playback controls user interface 726 includes selectable options 726*a*-726*i*. In some embodiments, the selectable option 726*a*, when selected, causes the electronic device 101 to present the representation of media item 705 in an immersive presentation mode (as will be described in FIGS. 9B-9E). In some embodiments, the selectable option 726*b*, when selected, causes the electronic device 101 to display the representation of media item 705 in a picture-in-picture presentation mode. In some embodiments, the selectable option 726*c*, when selected, causes the electronic device 101 to replace the content being presented in the media user interface object 704 with a content playback queue that includes one or more representations of content items that are selectable to cause a corresponding content item to playback. In some embodiments, the selectable option 726*d*, when selected, causes the electronic device 101 to rewind the representation of media item 705 by a predetermined amount (e.g., by 10, 15, 20, 30, 40, or 60 seconds). In some embodiments, the selectable option 726*e*, when selected, causes the electronic device 101 to pause playback of the representation of the media item 705 (e.g., if the representation of the media item 705 is currently playing at the media user interface object 704) or play the representation of the media item 705 (e.g., if the representation of the media item 705 is currently paused at media user interface object 704). In some embodiments, the selectable option 726*f*, when selected, causes the electronic device 101 to fast forward the representation of the media item 705 by a predetermined amount (e.g., by 10, 15, 20, 30, 40, or 60 seconds). In some embodiments, the selectable option 726*g*, when selected, causes the electronic device 101 to display a menu associated with representation of the media item 705 that includes selectable options for toggling on/off the display of captions for the representation of the media item 705. In some embodiments, the selectable option 726*h*, when selected, causes the electronic device 101 to modify the playback volume of representation of the media item 705. Lastly, as illustrated in FIG. 7C, in some embodiments, the playback controls user interface 726 also includes a scrubber bar 726*i* that includes an indication of the current playback position of the representation of the media item 705.

In some embodiments, while the electronic device 101 is displaying the playback controls user interface 726, the electronic device 101 displays the video captions user interface element 712 at a different (e.g., X, Y, and/or Z) location as compared to when the electronic device 101 is not displaying the playback controls user interface 726. For example, as illustrated in FIG. 7C, the electronic device 101 is displaying the video captions user interface element 712 at a higher Y-location (e.g., vertical location relative to viewpoint of the user) while the electronic device 101 is displaying the playback controls user interface 726 as compared to FIG. 7B when the electronic device 101 was not displaying the playback controls user interface 726.

In some embodiments, the electronic device 101 displays the playback controls user interface 726 at a same or similar height as the height at which the video captions user interface element 712 was being displayed before the electronic device 101 detected the request to display the playback controls user interface 726. In some embodiments, the electronic device 101 also displays the playback controls user interface 726 at a closer distance from the viewpoint of the user 716 than the video captions user interface element 712. Thus, if the electronic device 101 did not start displaying the video captions user interface element 712 at a higher Y-location in response to the electronic device 101 detecting the request to display the playback controls user interface 726, the video captions user interface element 712 may be obscured from the viewpoint of the user 716. It should be understood that while the video captions user interface element 712 in FIG. 7C is displayed at a higher Y-location in response to the electronic device 101 detecting a request to display the playback controls user interface 726, the electronic device 101 could optionally display the video captions user interface element 712 at a lower Y-location, at a different X-location, or a combination thereof that would result in the video captions user interface element 712 not being obscured by the playback controls user interface 726 from the viewpoint of the user 716.

In some embodiments, when the electronic device 101 is displaying the playback controls user interface 726, the electronic device 101 ceases display of the video captions user interface element 712 instead of updating the X, Y, and/or Z location of the video captions user interface element 712 as described above. For example, in FIG. 7C, in response to the electronic device 101 detecting the request to display the playback controls user interface 726, the electronic device 101 optionally does not redisplay the video captions user interface element 712 at a higher Y-location, but rather ceases display of the video captions user interface element 712 until the playback controls user interface 726 is no longer being displayed in the three-dimensional environment 730 (e.g., in response to detecting that the hand 728 of the user 716 is no longer in the ready state).

Additionally, the video captions user interface element 712 in FIG. 7C is being displayed further from the viewpoint of the user 716 than in FIG. 7B because Actor B 708 is being presented at a depth in the representation of the media that is further from the viewpoint of the user 716 in FIG. 7B than in FIG. 7C (as illustrated in the overhead view 714 in FIGS. 7B and 7C). The depth of Actor B 708 in the representation of the media item optionally changed between FIGS. 7B and 7C due to the playback position in the representation of the media item 705 changing from the second playback position 724 (as illustrated in FIG. 7B) to a third playback position 729 (as illustrated in the video progress bar in FIG. 7C).

Figure 7D:
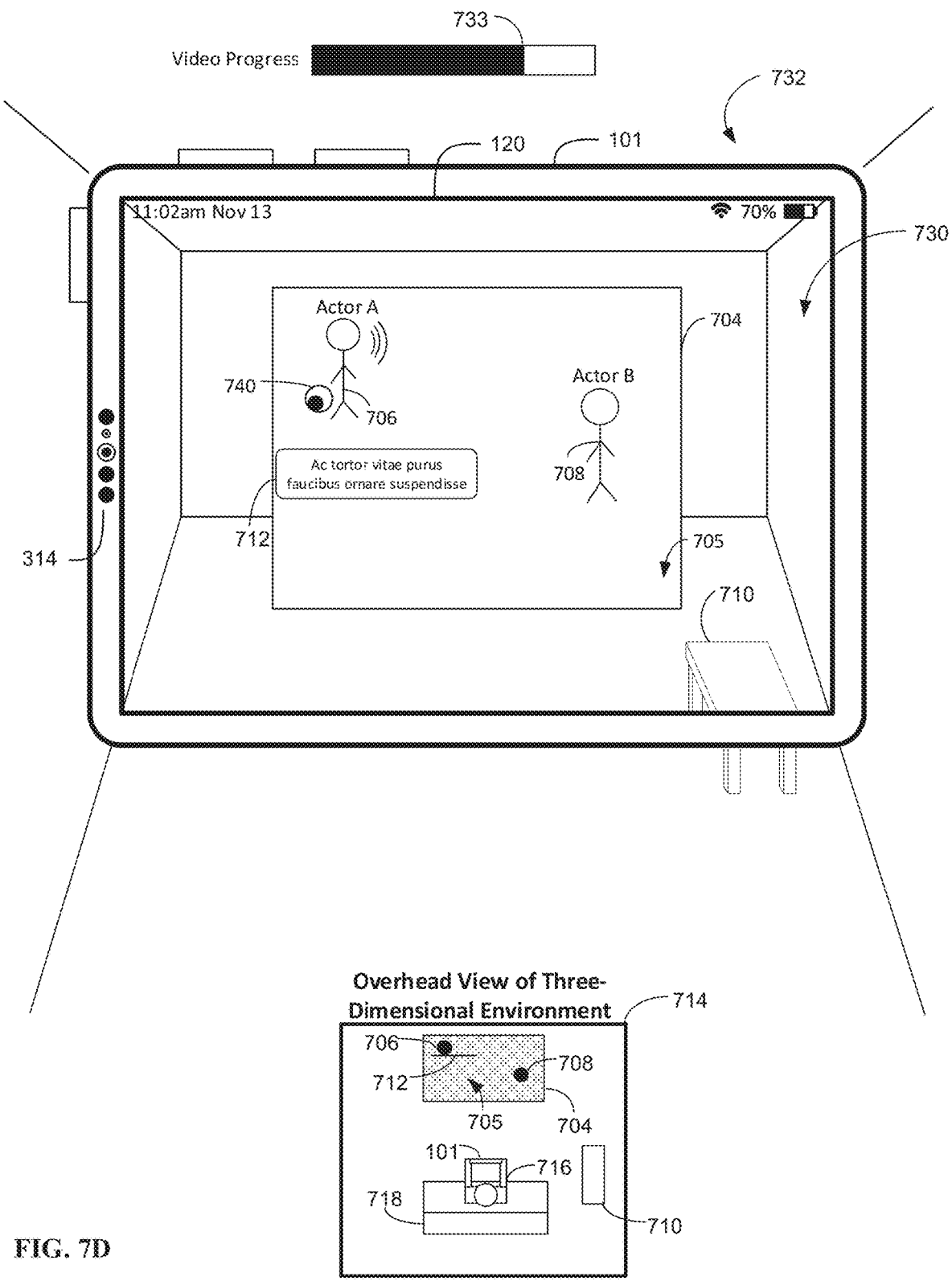

In FIG. 7D, the electronic device 101 is now displaying the representation of the media item 705 at a fourth playback position 733 in response to the playback position in the representation of the media item 705 changing from the third playback position 729 (as illustrated in FIG. 7C) to a fourth playback position 733 (as illustrated in the video progress bar in FIG. 7D). While the electronic device 101 is presenting the representation of the media item 705 at the fourth playback position 733, the representation of the media item 705 includes Actor B 708 at a fourth depth in the representation of the media item 705 (e.g., at a depth in the representation of the media item 705 that is closer to the viewpoint of the user 716 than when the representation of the media item 705 was at the third playback position 729) and Actor A 706 at the same depth in the representation of the media item 705 as illustrated in FIG. 7C (e.g., the depth of Actor A 706 did not change between the third playback position 729 and the fourth playback position 733).

Additionally, in FIG. 7D, the electronic device 101 has determined that the audio of the representation of the media item 705 corresponds to Actor A 706 at the fourth playback position 733 (e.g., because Actor A 706 is currently speaking at the fourth playback position 733). In some embodiments, the electronic device 101 displays the video captions user interface element 712 at an X, Y, and/or Z location based on the X, Y, and/or Z location of the portion of the representation of the media item 705 that corresponds to the current audio of the media item 705. For example, as shown in FIG. 7D, in response to the electronic device 101 determining that the audio of the representation of the media item 705 corresponds to Actor A 706, the electronic device 101 has stopped displaying the video captions user interface element 712 at the location indicated in FIG. 7C and has started displaying the video captions user interface element 712 at the location indicated in FIG. 7D (e.g., offset from Actor A 706 and at a same or similar depth as Actor A 706 (e.g., 0.0, 0.1, 0.2, 0.3, 0.7, 1, or 2 millimeters or 0.5, 1, 3, 5, 10, 30 or 50 cm in front of Actor A 706)). In some embodiments, the location and/or the distance at which the electronic device 101 displays the video captions user interface element 712 did not change between FIGS. 7C and 7D in response to the electronic device 101 determining that the audio of the representation of the media item 705 corresponds to Actor A 706, but rather in response to the electronic device 101 detecting that the gaze 740 of the user 716 changed from being directed to Actor B 708 to Actor A 706 (e.g., the location of the video captions user interface element 712 changed between FIGS. 7C and 7D for analogous reasons described above).

Figure 7E:
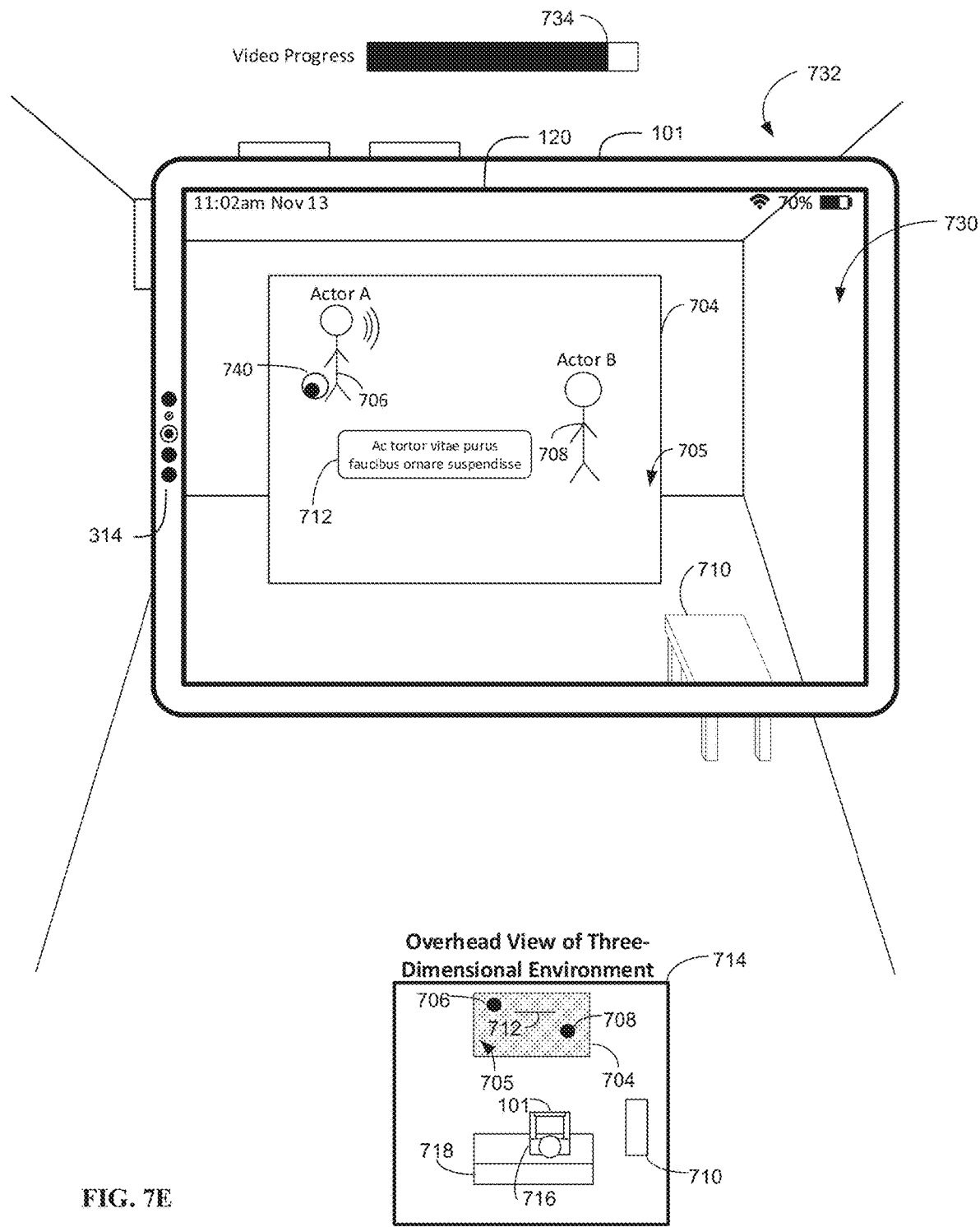
Figure 8B:
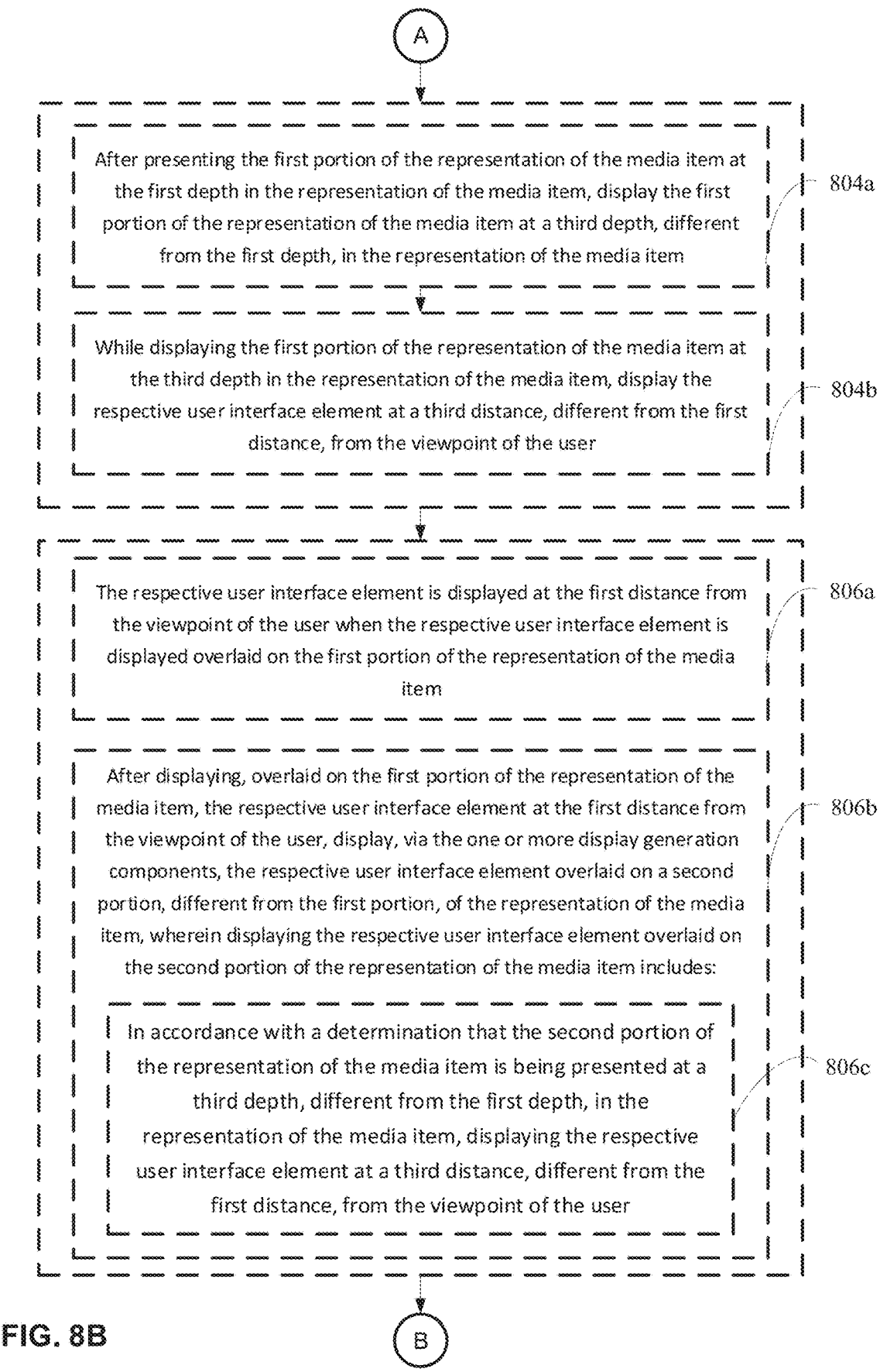
Figure 8C:
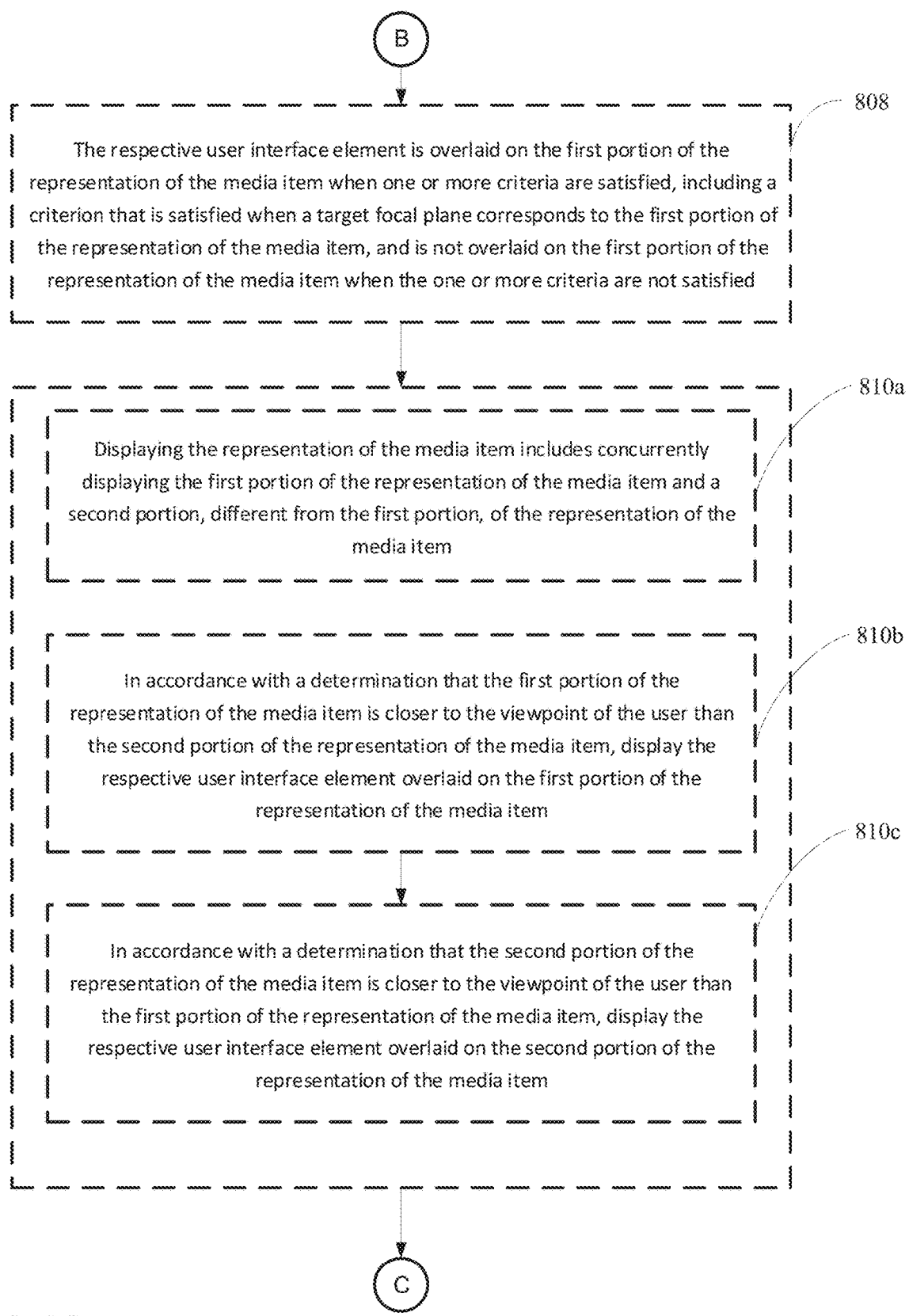
Figure 8D:
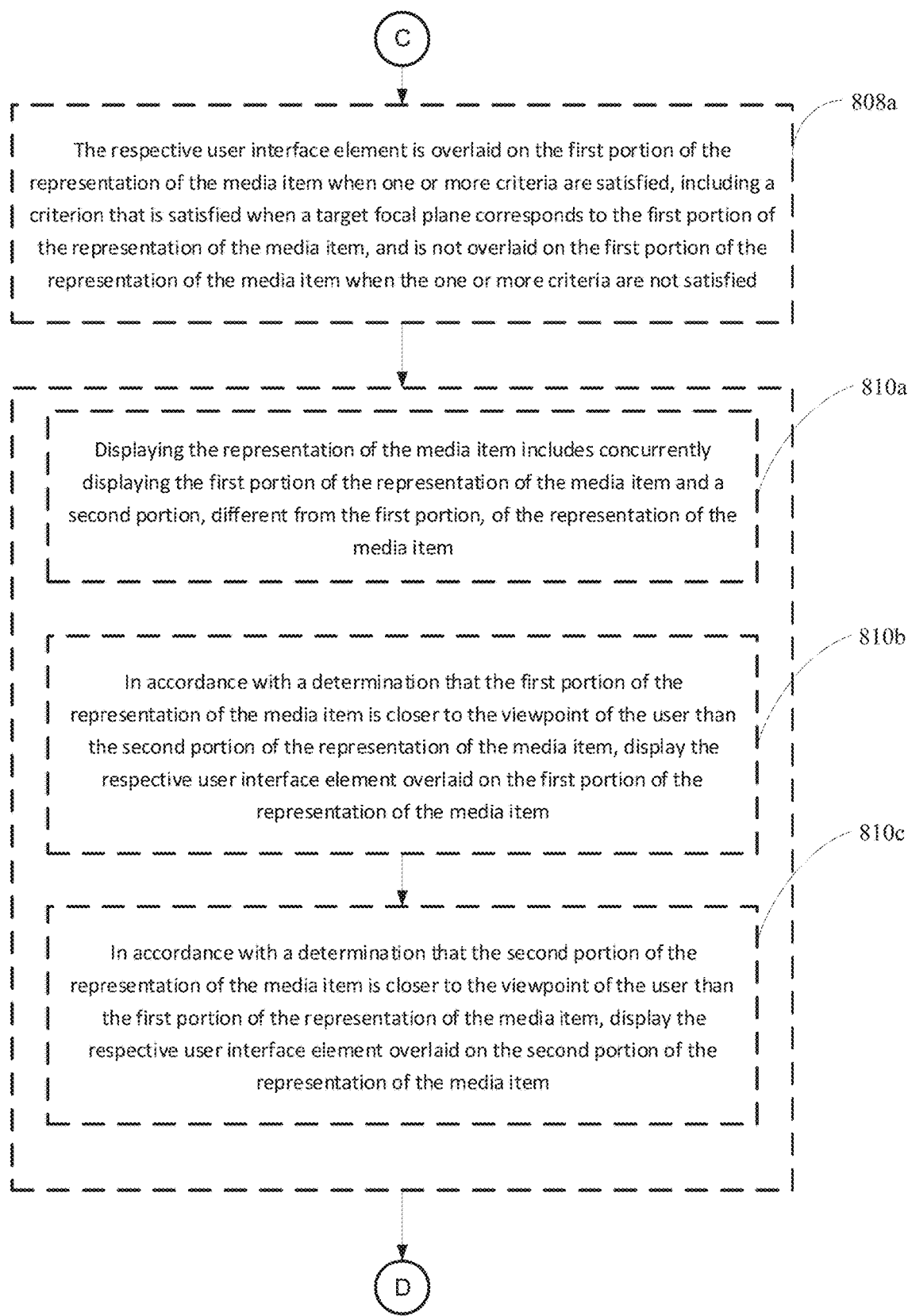
Figure 8E:
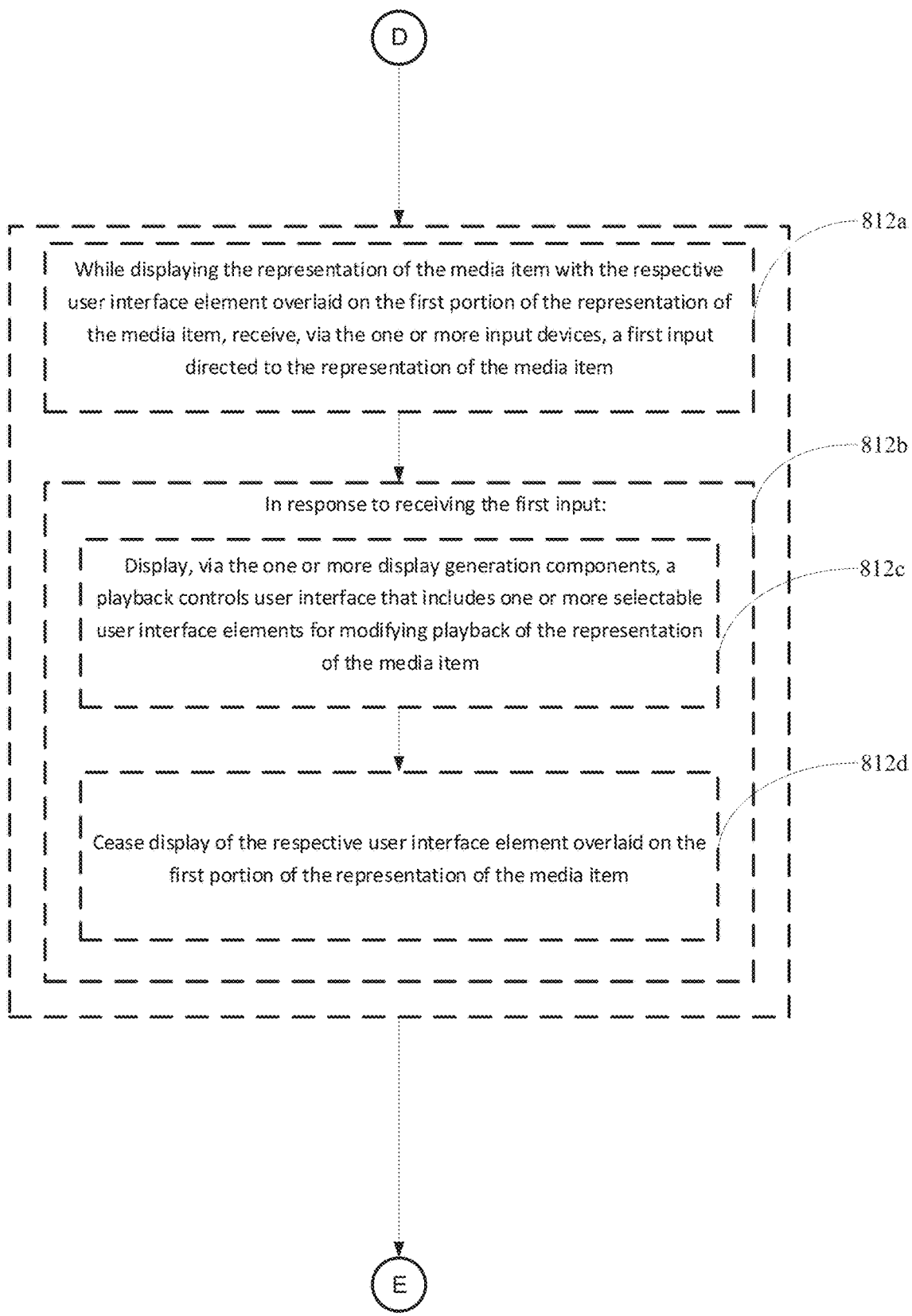
Figure 8F:
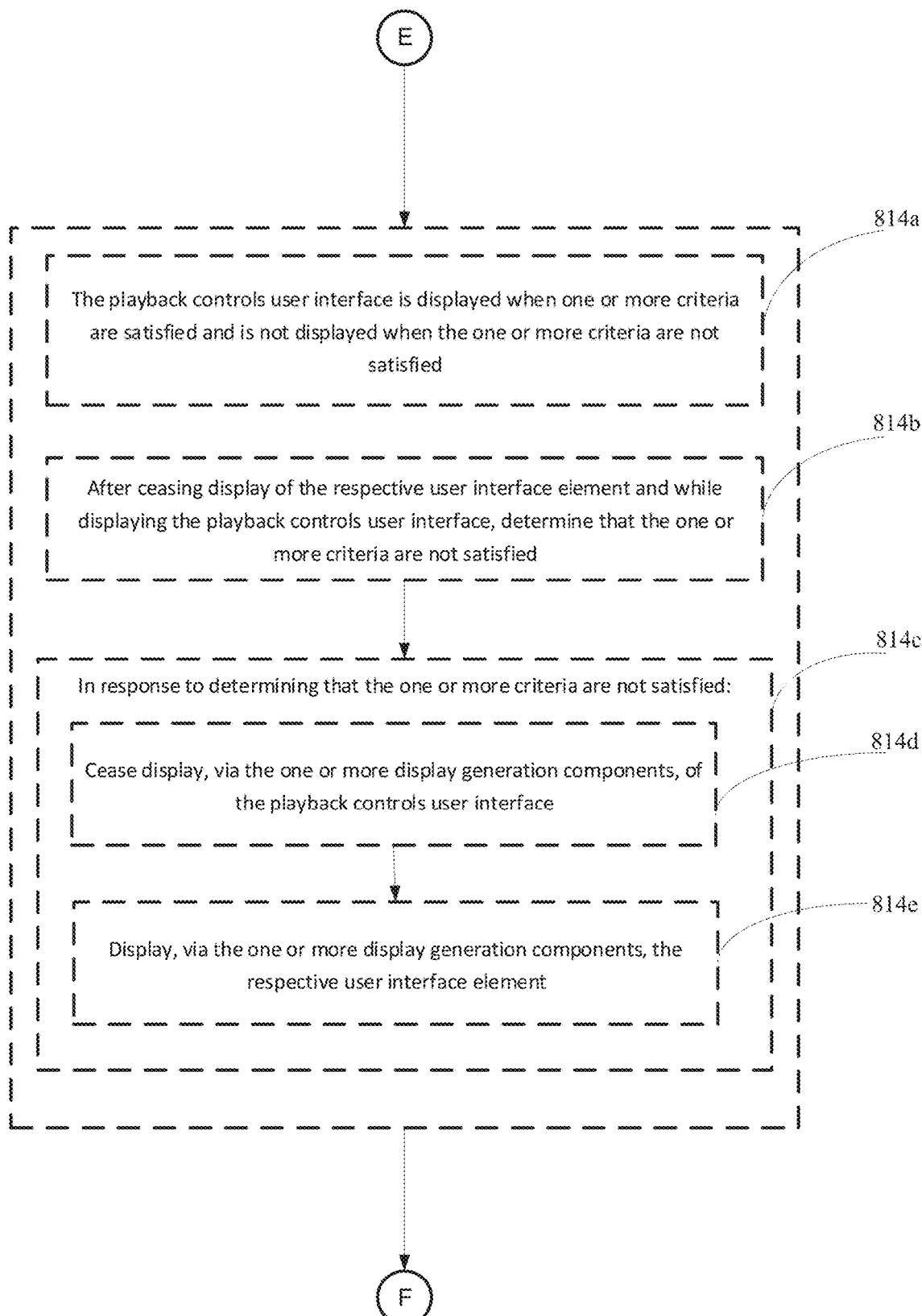
Figure 8G:
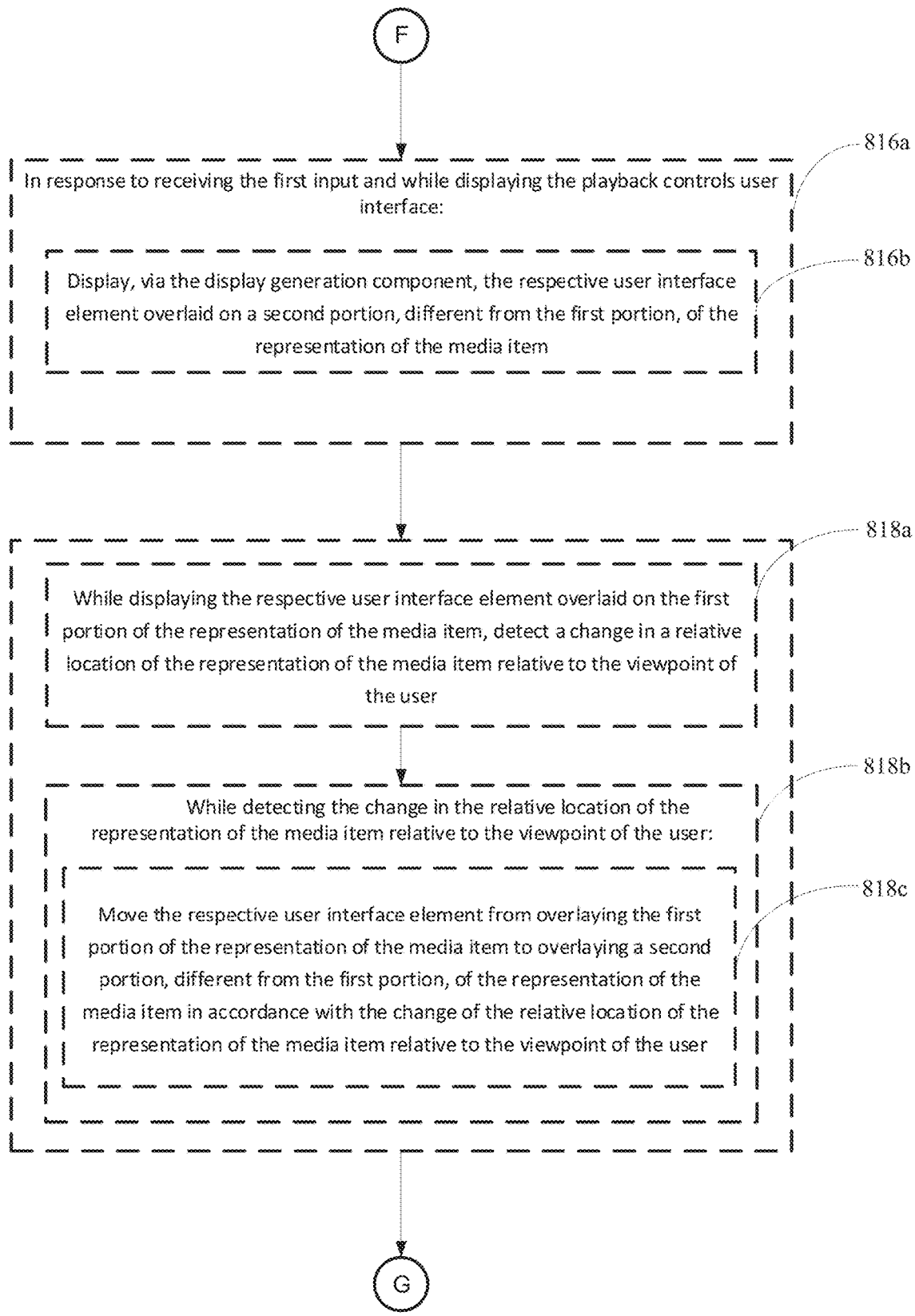
Figure 8H:
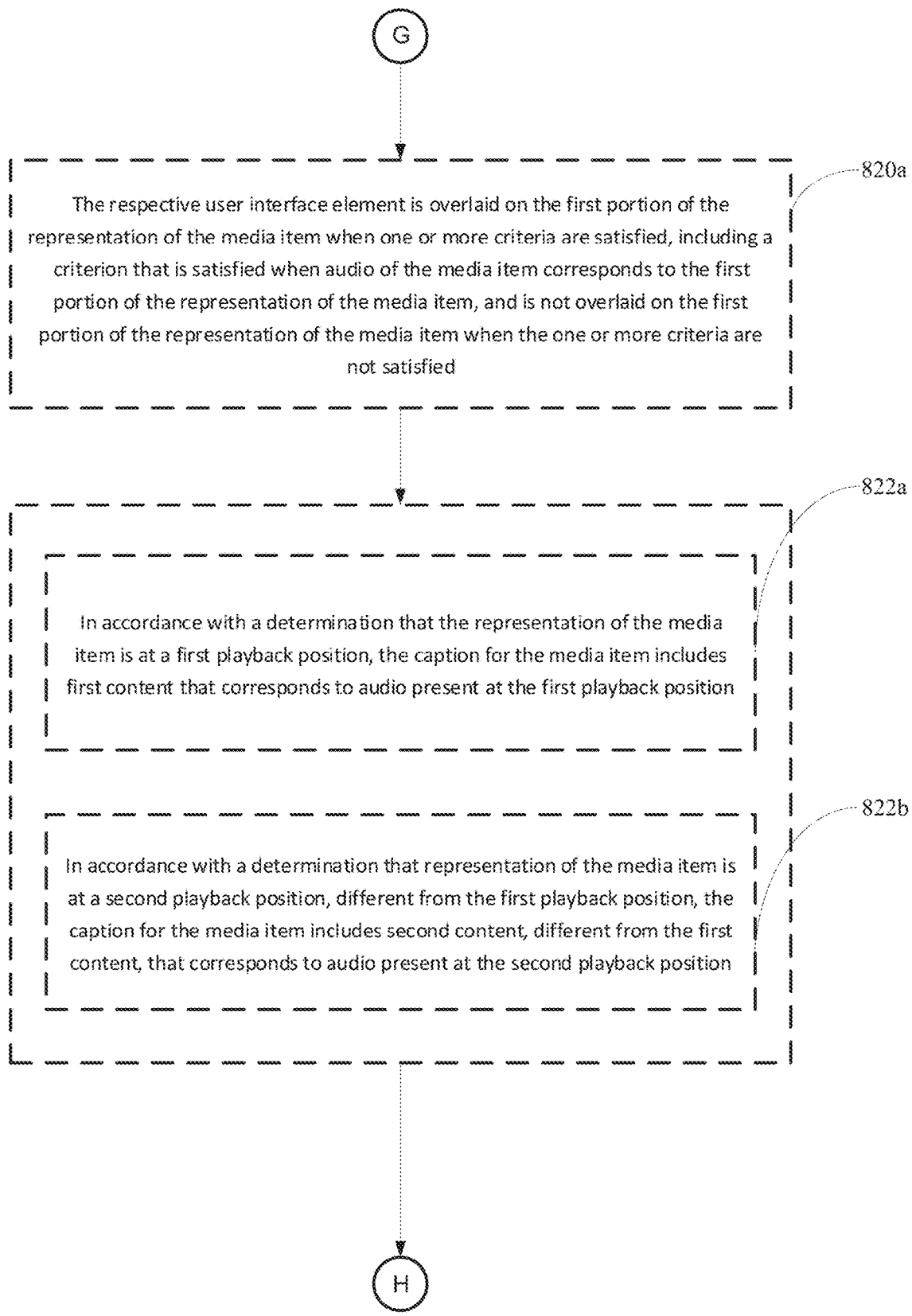
Figure 8I:
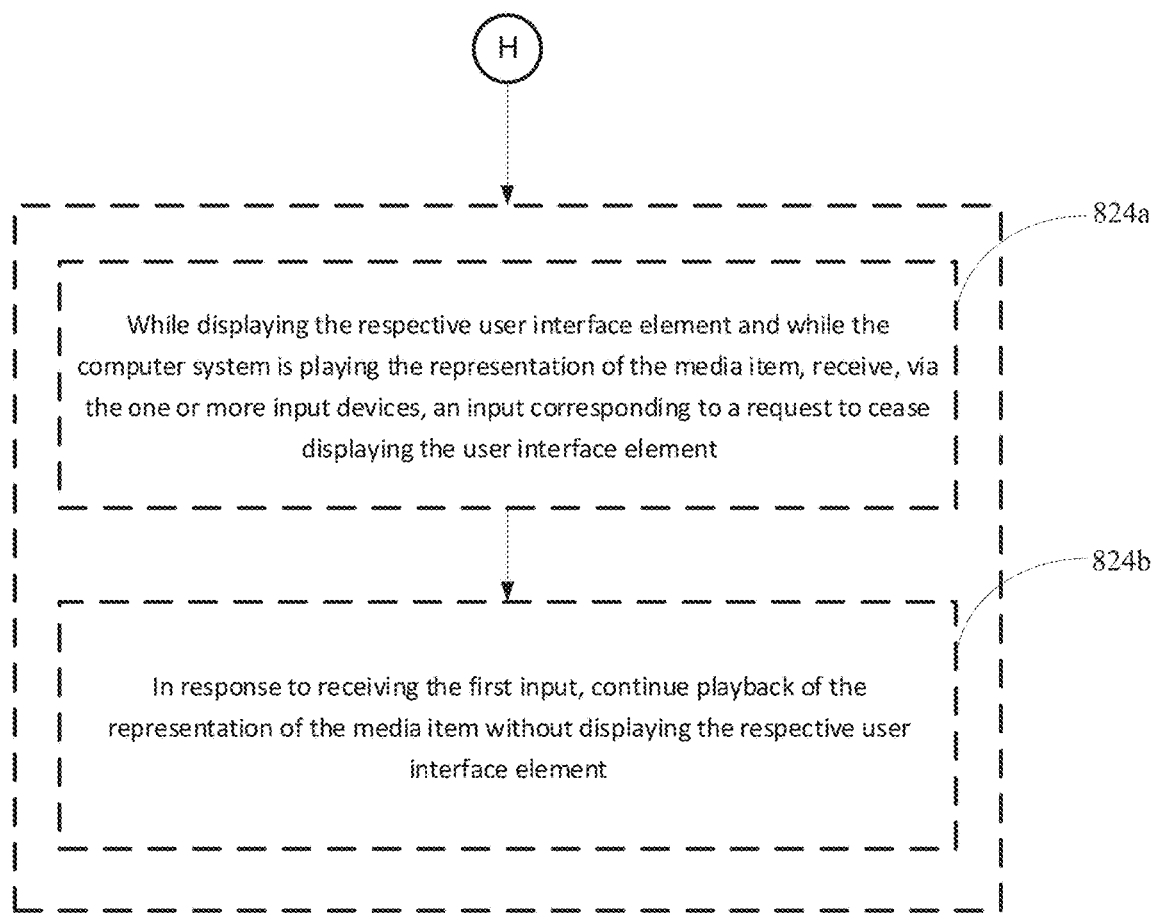

In FIG. 7E, the electronic device 101 has detected movement of the viewpoint of the user 716 from the viewpoint indicated in the overhead view 714 in FIG. 7D to the viewpoint indicated in the overhead view 714 in FIG. 7E. The viewpoint of the user 716 optionally moved from the viewpoint indicated in FIG. 7D to the viewpoint indicated in FIG. 7E because the user 716 moved to a corresponding pose and/or position in the physical environment 732. As shown in FIG. 7E, in response to the electronic device 101 detecting movement of the viewpoint of the user 716, the electronic device 101 is now displaying the three-dimensional environment 730 from the user's 716 new viewpoint of the three-dimensional environment 730 (the viewpoint indicated in the overhead view 714 in FIG. 7D). Additionally, as shown in FIG. 7E, the electronic device 101 is now presenting the representation of the media item 705 at a fifth playback position 734 in response to the playback position in the representation of the media item 705 changing from the fourth playback position 733 to a fifth playback position 734.

In some embodiments, as the electronic device 101 is detecting movement of the user's 716 viewpoint of the three-dimensional environment 730, the electronic device 101 moves the video captions user interface element 712 in accordance with the change (e.g., speed, amount, and/or direction) in the viewpoint of the user 716. For example, the electronic device 101 optionally moved the video captions user interface element 712 from overlaying the middle-left portion of the representation of the media item 705 (as illustrated in FIG. 7C) to overlaying the middle-center portion of the representation (as illustrated in FIG. 7D) while the electronic device 101 was detecting that the viewpoint of the user 716 was moving to the right from FIG. 7D to FIG. 7E and/or while the viewpoint of the user is that shown in FIG. 7E. While FIG. 7E shows the electronic device 101 moving the video captions user interface element 712 to the right in response to the electronic device detecting movement of the viewpoint of the user 716 to the right, it should be understood that if the viewpoint of the user 716 instead moved in an upward, downward, or leftward direction, the electronic device 101 would have optionally moved the video captions user interface element 712 in the upward, downward, or leftward direction, respectively. In some embodiments, movement of the viewpoint of the user causes the electronic device 101 to move the video captions user interface element 712 in a corresponding direction as the movement of the viewpoint to maintain the video captions user interface element 712 within the field of view of the user. In some embodiments, the electronic device 101 moves the video captions user interface element 712 up to a boundary of the media user interface object 704, but not beyond that boundary.

FIGS. 8A-8I is a flowchart illustrating an exemplary method 800 of displaying video captions for media items that have content at different depths in accordance with some embodiments. In some embodiments, the method 800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 800 are, optionally, combined and/or the order of some operations is, optionally, changed.

In some embodiments, method 800 is performed at a computer system (e.g., electronic device 101) in communication with a display generation component (e.g., 120) and one or more input devices (e.g., 314) (e.g., a mobile device (e.g., a tablet, a smartphone, a media player, or a wearable device), or a computer). In some embodiments, the display generation component is a display integrated with the computer system (optionally a touch screen display), external display such as a monitor, projector, television, or a hardware component (optionally integrated or external) for projecting a user interface or causing a user interface to be visible to one or more users, etc. In some embodiments, the one or more input devices include a computer system or component capable of receiving a user input (e.g., capturing a user input, detecting a user input, etc.) and transmitting information associated with the user input to the computer system. Examples of input devices include a touch screen, mouse (e.g., external), trackpad (optionally integrated or external), touchpad (optionally integrated or external), remote control device (e.g., external), another mobile device (e.g., separate from the computer system), a handheld device (e.g., external), a controller (e.g., external), a camera, a depth sensor, an eye tracking device, and/or a motion sensor (e.g., a hand tracking device, a hand motion sensor), etc. In some embodiments, the computer system is in communication with a hand tracking device (e.g., one or more cameras, depth sensors, proximity sensors, touch sensors (e.g., a touch screen, trackpad). In some embodiments, the hand tracking device is a wearable device, such as a smart glove. In some embodiments, the hand tracking device is a handheld input device, such as a remote control or stylus.

In some embodiments, while displaying, via the one or more display generation components, a representation of a media item that has content at different depths, such as representation 705 (e.g., different parts/portions of the representation of the media item are displayed at different distances from a viewpoint of a user. In some embodiments, the representation of the media item is displayed in a three-dimensional environment (e.g., a computer generated reality (CGR) environment), such as a virtual reality (VR) environment, a mixed reality (MR) environment, or an augmented reality (AR) environment).), the computer system displays (802a), overlaid on a first portion of the representation of the media item, a respective user interface element (e.g., 712) that includes a caption for the media item that is being played by the computer system.

In some embodiments, the media item that is being presented by the computer system is an item of video content, such as a movie, episode in a series of episodic content, or video clip. In some embodiments, a user interface of a media application presents/displays the representation of the media item. In some embodiments, the computer system displays the respective user interface element in response to detecting, via the one or more input devices, a user input corresponding to a request to display video captions/subtitles for the representation of the media item (e.g., via selection of a selectable option or menu item). In some embodiments, if the selection of the selectable option or the menu item is received while the computer system is already displaying the respective user interface element, this selection causes the computer system to cease display of the respective user interface element (e.g., toggles off the display of the respective user interface element). Conversely, in some embodiments, if the selection of the selectable option or menu item is received while the respective user interface element is not currently being displayed in the three-dimensional environment, this selection causes the computer system to start displaying the respective user interface element (e.g., toggles on the display of the respective user interface element). In some embodiments, the computer system displays the respective user interface element with a visual appearance in accordance with method 1200. In some embodiments, the location of the respective user interface element is based on the attention of the user, as described in method 1000. In some embodiments, the respective user interface element is overlaid on the first portion of the representation of the media item because an attention of the user of the computer system is currently directed to the first portion of the representation of the media item. In some embodiments, the respective user interface element is display offset from the portion of the representation of the media item to which the attention of the user is directed. Thus, in some embodiments, the portion of the representation of the media item on which the computer system displays the respective user interface element overlaid is optionally different from the portion of the representation of the media item to which the attention of the user is directed.

In some embodiments, displaying the respective user interface element overlaid on the first portion of the representation of the media item includes, in accordance with a determination that the first portion (e.g., a first three-dimensional object) of the representation of the media item is being presented at a first depth in the representation of the media item, the respective user interface element is displayed at a first distance from the viewpoint of a user of the computer system (802b), such as with respect to actor B 708 and user interface element 712 in FIG. 7B. In some embodiments, the representation of the media item has a length, width, and/or depth (e.g., X, Y, and/or Z boundaries) within which content of the representation of the media item is presented. For example, when the computer system is presenting the representation of the media item at a first playback position, the representation of the media item optionally includes one or more actors/characters, one or more foreground/background objects, and/or a background landscape—which are optionally displayed in three-dimensions within the boundaries/dimensions of the representation of the media item. In some embodiments, as the computer system presents the representation of the media item at different playback positions, the computer system updates the representation of the media item to include new, different, or additional (e.g., three-dimensional) content within the dimensions/boundaries of the representation of the media item. In some embodiments, the depth at which content is presented in the representation of the media item is defined by the content creator of the media item. For example, the first portion of the representation of the media item optionally corresponds to a first actor/character and when the first actor/character is presented at the first depth in the representation of the media item, the first actor/character is a first distance from the viewpoint of the user (e.g., 0.3, 0.5, 0.7, 1, 1.5, 2, or 4 meters from the viewpoint of a user). In some embodiments, the respective user interface element, described above, is displayed at a distance from the viewpoint of the user based on the depth of the first portion in the representation of the media item. For example, if the above-mentioned first portion of the representation media item is displayed at a depth in the representation of the media item that is 0.3, 0.5, 0.7, 1, 1.5, 2, or 4 meters from a viewpoint of a user, the respective user interface element is optionally displayed at the same distance from the viewpoint of the user or at a slightly closer distance (e.g., 1, 5, 15, 30, 35, 40, 50, 60, or 70 centimeters closer to the user's viewpoint) to the viewpoint of the user.

In some embodiments, in accordance with a determination that the first portion (e.g., the first three-dimensional object) of the representation of the media item is being presented at a second depth in the representation of the media item, different from the first depth, the respective user interface element is displayed at a second distance, different from the first distance, from the viewpoint of the user (802*c*), such as with respect to actor B 708 and user interface element 712 in FIG. 7C. For example, the distance at which the respective user interface element is displayed from the viewpoint of the user changes based on the depth at which the first portion is presented in the representation of the media item. For example, if the computer system is presenting the first portion of the respective media item at a different depth than the first depth in the representation of the media item (e.g., is presented at a depth that is further or closer to the viewpoint of the user as compared to when the first portion is presented at the first depth), the respective user interface element is displayed at a different distance from the viewpoint of the user. Accordingly, if the first portion of the representation of the media item is further from the user's viewpoint when the computer system is displaying the first portion at the second depth (as compared to when the first portion is presented at the first depth), the respective user interface element is displayed further from the user's viewpoint (e.g., based on the distance of the first portion of the respective media item from the user's viewpoint), and if the first portion of the respective media item is closer to the user's viewpoint (as compared to when the first portion is presented at the first depth), the respective user interface element is displayed closer to the user's viewpoint (e.g., based on the distance of the first portion of the respective media item from the user's viewpoint. Changing the distance at which the respective user interface element is displayed from the viewpoint of the user based on the depth a portion of the media item is from the viewpoint of the user provides an efficient way for reducing the user's eye strain while interacting with the respective user interface element and the respective media item, thereby enabling the user to use the computer system quickly and efficiently.

In some embodiments, after presenting the first portion of the representation of the media item at the first depth in the representation of the media item, the computer system displays (804*a*) the first portion of the representation of the media item at a third depth, different from the first depth, in the representation of the media item, such as Actor B 708 changing depths from FIGS. 7B to 7C. In some embodiments, the representation of the media item is at a first playback position when the computer system is displaying the respective user interface element overlaid on the first portion of the representation of the media item. In some embodiments, the computer system changes from presenting the first portion of the representation of the media item at the first depth in the representation of the media item to presenting the representation of the media item at the second depth as a result of (e.g., in response to) the playback position changing from the first playback position to a second playback position. In some embodiments, when the computer system is displaying the first portion of the representation of the media item at the third depth, the first portion of the representation of the media item is further from the viewpoint of the user as compared to when the computer system was displaying the first portion of the representation of the media item at the first depth. In some embodiments, when the computer system is displaying the first portion of the representation of the media item at the third depth, the first portion of the representation of the media item is closer to the viewpoint of the user as compared to when the computer system was displaying the first portion of the representation of the media item at the first depth.

In some embodiments, while displaying the first portion of the representation of the media item at the third depth in the representation of the media item, the computer system displays (804*b*) the respective user interface element at a third distance, different from the first distance, from the viewpoint of the user, such as the change in distance from the viewpoint of element 712 from FIGS. 7B to 7C. For example, as the first portion of the representation of the media item is displayed at different depths in the representation of the media item (e.g., in response to a change in the playback position in the representation of the media item), the computer system also updates the distance at which the respective user interface element is displayed from the viewpoint of the user. Thus, if the third depth is further from the viewpoint of the user than the first depth, the computer system optionally displays the respective user interface element further from the viewpoint of the user as compared to when the computer system was displaying the first portion of the representation of the media item at the first depth. Conversely, if the third depth is closer to the viewpoint of the user than the first depth, the computer system optionally displays the respective user interface element closer to the viewpoint of the user as compared to when the computer system was displaying the first portion of the representation of the media item at the first depth. Displaying the respective user interface element at different distances from the viewpoint of the user as the depth of a portion of the representation of the media item changes causes the computer system to automatically display the respective user interface at an appropriate distance from the viewpoint of the user during playback of the representation of the media item, thereby reducing the user's eye strain while interacting with the respective user interface element.

In some embodiments, the respective user interface element is displayed at the first distance from the viewpoint of the user when the respective user interface element is displayed overlaid on the first portion of the representation of the media item (806a), such as element 712 displayed at its location in FIG. 7C. In some embodiments, after displaying, overlaid on the first portion of the representation of the media item, the respective user interface element at the first distance from the viewpoint of the user, the computer system displays (806b), via the one or more display generation components, the respective user interface element overlaid on a second portion, different from the first portion, of the representation of the media item, such as element 712 displayed at its new location in FIG. 7D. For example, in some embodiments, the respective user interface element is displayed overlaid on the second portion of the representation of the media item in response to the computer system detecting that the attention (e.g., gaze) of the user changed from being directed to the first portion to being directed to the second portion of the representation of the media item, as described in more detail in method 1000. In some embodiments, the respective user interface element is displayed overlaid on the second portion of the representation of the media item in response to detecting that the portion of the representation of the media item that is closest to the viewpoint of the user has changed from the first portion to the second portion (e.g., due to a change in playback position in the representation of the media item). In some embodiments, the respective user interface element is displayed overlaid on the second portion of the representation of the media item because "an area of interest" or "target focal plane" defined by the content creator of the media item changed from the first portion to the second portion (e.g., as the playback position in the representation of the media item changed).

In some embodiments, displaying the respective user interface element overlaid on the second portion of the representation of the media item includes, in accordance with a determination that the second portion of the representation of the media item is being presented at a third depth, different from the first depth, in the representation of the media item, displaying the respective user interface element at a third distance, different from the first distance, from the viewpoint of the user (806c), such as the change in the distance of element 712 from the viewpoint of the user from FIG. 7C to 7D. For example, as the computer system displays the respective user interface element overlaid on a new portion of the representation of the media item, the distance of the respective user interface element from the viewpoint of the user changes if the new portion of the representation of the media item is displayed at a different depth in the representation of the media item than the portion of the representation of the media item that the respective user interface element was previously (e.g., most recently) overlaid. Accordingly, the computer system optionally displays the respective user interface element closer to the viewpoint of the user while the respective user interface element is overlaid on the second portion of the representation of the media item if the second portion of the representation of the media item is displayed at a depth that is closer to the viewpoint of the user than the first portion of the representation of the media item (e.g., the portion of the representation of the media item that the respective user interface element was previously overlaid). Alternatively, the computer system optionally displays the respective user interface element further from the viewpoint of the user while the respective user interface element is overlaid on the second portion of the representation of the media item if the second portion of the representation of the media item is displayed at a depth that is further from the viewpoint of the user than the first portion of the representation of the media item (e.g., the portion of the representation of the media item that the respective user interface element was most previously overlaid). In some embodiments, the user of the computer system optionally repositions/moves the respective user interface element to be overlaid on a third portion of the representation of the media item via a pinch and drag gesture. In some embodiments, in accordance with a determination that the second portion of the representation of the media item is being presented at a fourth depth, different from the first, second, and/or third depth, the computer system displays the respective user interface element at a fourth distance, different from the first, second, and/or third distance, from the viewpoint of the user. In some embodiments, in accordance with a determination that the second portion of the representation of the media item is being presented at a second depth, different from the first, third, and/or fourth depth, the computer system displays the respective user interface element at a second distance, different from the first, third distance, and/or fourth distance, from the viewpoint of the user. Displaying the respective user interface element at different distances from the viewpoint of the user as the respective user interface element is overlaid on different portions of the representation of the media item causes the computer system to automatically display the respective user interface at an appropriate distance from the viewpoint of the user during playback of the representation of the media item, thereby reducing the user's eye strain while interacting with the respective user interface element.

In some embodiments, the respective user interface element is overlaid on the first portion of the representation of the media item when one or more criteria are satisfied, including a criterion that is satisfied when a target focal plane corresponds to the first portion of the representation of the media item, and is not overlaid on the first portion of the representation of the media item when the one or more criteria are not satisfied (808). For example, the target focal plane of the content 705 in FIG. 7A is optionally the plane defined by the depth of Actor A 706. In some embodiments, the target focal plane corresponds to the first portion of the representation of the media item if a gaze of the user is directed to the first portion of the representation of the media item. In some embodiments, the target focal plane corresponds to the first portion of the representation media item because a content creator defined the first portion of the representation as an area of interest (e.g., an area that the content creator is emphasizing, such as a point, plane or volume having a particular position within the media). In some embodiments, the target focal plane changes as the playback position of the representation of the media item changes. For example, when the computer system is displaying the representation of the media item at the first playback position, the target focal plane optionally corresponds to the first portion of the representation of the media item (e.g., because the first portion includes activity the content creator wishes to emphasize). However, when the computer system starts displaying the representation of the media item at the second playback position, the target focal plane optionally changes to correspond to a second portion of the representation of the media item, different from the first portion of the representation of the media item (e.g., because the second portion now includes activity the content creator wishes to emphasize). Displaying the respective user interface overlaid on the first portion of the representation of the media item when the target focal plane corresponds to the first portion of the representation of the media item causes the computer system to automatically display the respective user interface element at the portion of the representation of the media item that is designated to be the portion of interest during playback of the representation of the media item, thereby reducing the user's eye strain while interacting with the respective user interface element.

In some embodiments, displaying the representation of the media item includes concurrently displaying the first portion of the representation of the media item and a second portion, different from the first portion, of the representation of the media item (810a), such as Actor A 706 and Actor B 708 in FIG. 7A (e.g., the representation of the media item includes a first object (e.g., first actor/character) and a second object (e.g., a second actor/character)). In some embodiments, in accordance with a determination that the first portion of the representation of the media item is closer to the viewpoint of the user than the second portion of the representation of the media item, the computer system displays (810b) the respective user interface element overlaid on the first portion of the representation of the media item, such as displaying element 712 overlaid on a portion of the content 705 corresponding to Actor A 706 in FIG. 7A because Actor A 706 is closer to the viewpoint of the user than Actor B 708. For example, the respective user interface element is overlaid on the portion of the representation of the media item that is closest to the viewpoint of the user. For example, the respective user interface element is overlaid on the first portion of the representation of the media item when the second portion of the representation of the media item is displayed at a depth in the representation of the media item that is further from the viewpoint of the user as compared to the first portion of the representation of the media item.

In some embodiments, in accordance with a determination that the second portion of the representation of the media item is closer to the viewpoint of the user than the first portion of the representation of the media item, the computer system displays (810c) the respective user interface element overlaid on the second portion of the representation of the media item, such as displaying element 712 overlaid on a portion of the content 705 corresponding to Actor B 708 in FIG. 7B because Actor B 708 is closer to the viewpoint of the user than Actor A 706. Conversely, if the second portion of the representation of the media item is displayed at a depth in the representation of the media item that is closer to the viewpoint of the user than the first portion of the representation of the media item, the respective user interface element is optionally overlaid on the second portion of the representation of the media item (and not the first portion of the representation of the media item). In some embodiments, as the computer system plays the representation of the media item, the respective user interface element is overlaid on different portions of the representation of the media item because the portion of the representation of the media item that is closest to the viewpoint of the user changes over time. Displaying the respective user interface element overlaid on the portion of the representation of the media item that is closest to the viewpoint of the user causes the computer system to automatically display the respective user interface at an appropriate distance from the viewpoint of the user during playback of the representation of the media item, thereby reducing the user's eye strain while interacting with the respective user interface element.

In some embodiments, while displaying the representation of the media item with the respective user interface element overlaid on the first portion of the representation of the media item, the computer system receives (812a), via the one or more input devices, a first input directed to the representation of the media item, such detecting hand 728 in the ready state in FIG. 7C (e.g., corresponding to a request to display a playback controls user interface). In some embodiments, the first input includes movement of a hand of the user. In some embodiments, the first input includes the hand of the user performing or having performed an air gesture. In some embodiments, the first input includes the hand of the user performing a tap gesture at a location on the display generation component (if the computer system is a touch-sensitive device). In some embodiments, the first input includes a user of the computer system directing attention (e.g., gaze) towards the representation of the media item.

In some embodiments, in response to receiving the first input (812b), the computer system displays (812c), via the one or more display generation components, a playback controls user interface that includes one or more selectable user interface elements for modifying playback of the representation of the media item, such as playback controls element 726 in FIG. 7C. In some embodiments, the computer system displays the playback controls user interface after (e.g., in response to) determining the first input satisfies one or more criteria, and does not display the playback controls user interface after (e.g., in response to) determining the first input does not satisfy the one or more criteria. In some embodiments, the one or more criteria is the same as or similar to the one or more criteria that will be described below. In some embodiments, the one or more selectable options for modifying playback of the representation of the media item includes a selectable option that, when selected, causes the computer system to display the media item in an immersive presentation mode as described in more detail in method 1000. In some embodiments, the one or more selectable options for modifying playback of the representation of the media item includes a selectable option that, when selected, causes the computer system to display the media item in a picture-in-picture presentation mode. In some embodiments, the one or more selectable options for modifying playback of the representation of the media item includes a selectable option that, when selected, causes the computer system to present a content playback queue. In some embodiments, the one or more selectable options for modifying playback of the representation of the media item includes a selectable option that, when selected, causes the computer system to rewind the representation of the media item by a predetermined amount (e.g., 5, 10, 15, 30, or 60 seconds). In some embodiments, the one or more selectable options for modifying playback of the representation of the media item includes a selectable option that, when selected, causes the computer system to pause/play the representation of the media item. In some embodiments, the one or more selectable options for modifying playback of the representation of the media item includes a selectable option that, when selected, causes the computer system to fast forward the representation of the media item ahead by a predetermined amount (e.g., 5, 10, 15, 30, or 60 seconds). In some embodiments, the one or more selectable options for modifying playback of the representation of the media item includes a selectable option that, when selected, causes the computer system to present captions/subtitle options associated with the representation of the media item.

In some embodiments, the computer system ceases (812*d*) display of the respective user interface element overlaid on the first portion of the representation of the media item, such as playback controls element 726 being displayed overlaid on the portion of the content 705 in FIG. 7C over which element 712 was overlaid in FIG. 7B. For example, in response to the computer system receiving a request to display playback controls for the representation of the media item, the computer system stops displaying the respective user interface element. In some embodiments, as will be described in more detail below, when the computer system stops displaying the playback controls user interface, the respective user interface element is redisplayed. In some embodiments, the playback controls user interface is overlaid on at least a portion of the representation of the media item on which the respective user interface element was overlaid before the computer system ceased display of the respective user interface element. Ceasing display of the respective user interface element in response to the computer system detecting a request to display playback controls for the representation of the media item causes the computer system to automatically reduce clutter/obstruction of the representation of the media item.

In some embodiments, the playback controls user interface is displayed when one or more criteria are satisfied and is not displayed when the one or more criteria are not satisfied (814*a*), such as being displayed when hand 728 in FIG. 7C is in the ready state. In some embodiments, after ceasing display of the respective user interface element and while displaying the playback controls user interface (e.g., in response to detecting the first input satisfies the one or more criteria), such as if element 712 were not displayed in FIG. 7C, the computer system determines (814*b*) that the one or more criteria are not satisfied, such as hand 728 no longer being in the ready state. In some embodiments, determining that the one or more criteria are satisfied includes determining that the first input includes movement of a predefined portion (e.g., hand) of the user from a location proximate to the user's body to a raised position. In some embodiments, determining that the one or more criteria are satisfied includes determining that the first input includes a hand of the user in a predefined handshape/pose (e.g., the ready state pose). In some embodiments, determining that the one or more criteria are satisfied includes determining that the attention (e.g., determined based on gaze) of the user is directed to the representation of the media item. In some embodiments, the one or more criteria are not satisfied when the one or more input devices of the computer system are no longer detecting the hand of the user that caused (or is associated with) the first input (e.g., because the hand of the user is out of range of one or more hand tracking sensors of the computer system). In some embodiments, the one or more criteria are not satisfied when the hand of the user that caused (or is associated with) the first input is no longer in a pose that satisfies the one or more criteria. In some embodiments, the one or more criteria are no longer satisfied when the attention (e.g., determined based on gaze) of the user is no longer directed to the representation of the media item.

In some embodiments, in response to determining that the one or more criteria are not satisfied (814*c*), the computer system ceases (814*d*) display, via the one or more display generation components, of the playback controls user interface, such as ceasing display of playback controls element 726 in FIG. 7C. For example, the computer system continues to display the playback controls user interface while the one or more criteria remain satisfied, and stops displaying the playback controls user interface when the one or more criteria are not satisfied. In some embodiments, the computer system displays (814*e*), via the one or more display generation components, the respective user interface element, such as redisplaying element 712 in FIG. 7C in response to detecting the hand 728 no longer being in the ready state. For example, when the computer system stops displaying the playback controls, the computer system resumes display of the respective user interface element. In some embodiments, the computer system displays the respective user interface element overlaid on the portion of the representation of the media item where the computer system was displaying the respective user interface element before/prior to when the computer system started displaying the playback controls user interface. In some embodiments, when the computer system redisplays the respective user interface element, the respective user interface element is overlaid on a different portion of the representation of the media item as compared to where the computer system was displaying the respective user interface element before displaying the playback controls user interface element (e.g., because as the computer system was playing the representation of the media item, portions of the representation of the media became displayed at different depths). Redisplaying the respective user interface element after the computer system ceases display of the playback controls user interface reduces the number of inputs needed to display the respective user interface element.

In some embodiments, in response to receiving the first input and while displaying the playback controls user interface (816*a*), the computer system displays (816*b*), via the display generation component, the respective user interface element overlaid on a second portion, different from the first portion, of the representation of the media item, such as sliding user interface element 712 up onto a different portion of content 705 when playback controls element 726 is displayed in FIG. 7C. For example, the respective user interface element is overlaid on different portions of the representation of the media item when the computer system is displaying the playback controls user interface as compared to when the computer system is not displaying the playback controls user interface. In some embodiments, the playback controls user interface is displayed closer to the viewpoint of the user and/or overlays the portion of the media item that the respective user interface was overlaid on (e.g., immediately) before/prior to the computer system displaying the playback controls user interface. Thus, in some embodiments, the respective user interface may be hidden from the viewpoint of the user if the computer system were to continue to display the respective user interface element overlaid on the first portion of the representation of the media item while the playback controls user interface is displayed (e.g., if the computer system did not reposition the respective user interface element from being overlaid on the first portion to being overlaid on the second portion of the representation of the media item when the playback controls user interface is displayed). In some embodiments, the playback controls user interface and the respective user interface element are displayed at the same distance from the viewpoint of the user or at different distances from the viewpoint of the user. In some embodiments, the respective user interface element is displayed above or below and/or to the left of or to the right of the playback controls user interface. In some embodiments, the respective user interface element and the playback controls user interface are angled towards the viewpoint of the user at the same or different angles. For example, if the playback controls user interface is displayed at a lower height than the respective user interface element, the computer system optionally angles the playback controls user interface up relative to the respective user interface element. In some embodiments, in response to the first input, the computer system animates the movement of the respective user interface element from the first portion to the second portion of the representation of the media item. In some embodiments, the orientation of the respective user interface element changes as the respective user interface element is being repositioned/moved. For example, if the respective user interface element moved vertically upwards from the bottom-center of the representation of the media item, the respective user interface element optionally has less upward tilt as compared to when the respective user interface element was displayed at the bottom-center of the representation of the media item (e.g., because the respective user interface element moved closer to the middle-center of the field of view of the user). Displaying the respective user interface element overlaid on different portions of the representation of the media based on whether the computer system is displaying the playback controls user interface enables both the respective user interface and the playback controls to be viewable from the viewpoint of the user without requiring any additional user input, thereby reducing the user's eye strain while interacting with the respective user interface element.

In some embodiments, while displaying the respective user interface element overlaid on the first portion of the representation of the media item, such as the display of element 712 in FIG. 7D, the computer system detects (818*a*) a change in a relative location of the representation of the media item relative to the viewpoint of the user, such as the change of the relative location of content 705 from FIGS. 7D to 7E due to the change in the viewpoint of the user. For example, the representation of the media item changed from occupying a first location (e.g., middle-center portion) in a field of view from the viewpoint of the user to occupying a second location (e.g., left-center portion) in the field of view from the viewpoint of the user. In some embodiments, the representation of the media item relative to the viewpoint of the user changes because of movement of the representation of the media item in a three-dimensional environment (e.g., a hand of the user selected the representation of the media item with a "pinch gesture" and before releasing the pinch gesture, the hand of the user moved in the physical environment of the computer system). In some embodiments, the representation of the media item relative to the viewpoint of the user changes because the viewpoint of the user changed in the three-dimensional environment. For example, the viewpoint of the user changed from being normal to the representation of the media item to being at a different angle/position/orientation relative to the representation of the media item. In some embodiments, as the location of the representation of the media item relative to the viewpoint of the user changes, the location of the representation of the media item in the field of view of the user also changes. In some embodiments, the viewpoint of the user changed in response to detecting that a portion of the user (e.g., the user's head, torso, hand, etc.) moved (optionally concurrently with the computer system or display generation component).

In some embodiments, while detecting the change in the relative location of the representation of the media item relative to the viewpoint of the user (818*b*), the computer system moves (818*c*) the respective user interface element from overlaying the first portion of the representation of the media item to overlaying a second portion, different from the first portion, of the representation of the media item in accordance with the change of the relative location of the representation of the media item relative to the viewpoint of the user, such as the change in position of element 712 over content 705 from FIG. 7D to FIG. 7E. For example, as the representation of the media item is moving to a new location relative to the viewpoint of the user, the computer system also moves the respective user interface element to be overlaid on a different portion of the representation of the media item (as compared to the portion of the representation of the media on which the respective user interface was displayed prior to the movement of the representation of the media item). In some embodiments, the second portion of the representation of the media item is selected based on the speed, distance, and/or direction the representation of the media item moved relative to the viewpoint of the user. In some embodiments, the second portion of the media item (e.g., the portion of the representation of the media item on which the respective user interface element is overlaid) is to the right of the first portion (e.g., from the viewpoint of the user) if the representation of the media item is moving in a leftward direction relative to the viewpoint of the user. In some embodiments, the second portion of the media item (e.g., the portion of the representation of the media item on which the respective user interface element is overlaid) is above the first portion (e.g., from the viewpoint of the user) if the representation of the media item is moving in a downward direction relative to the viewpoint of the user. In some embodiments, respective user interface element is moved from the overlaying on the first portion of the representation of the media item to overlaying on the second portion of the representation of the media item because the first portion of the representation of the media item is no longer in the field of view from the viewpoint of the user (and the second portion is optionally the closest part of the representation of the media item to the first portion). Moving the respective user interface element to be overlaid on different portions of the representation of the media item as the representation of the media item is moved relative to the viewpoint of the user causes the computer system to automatically reposition the respective user interface element such that it remains visible from the viewpoint of the user, thereby reducing the user's eye strain while interacting with the respective user interface element.

In some embodiments, the respective user interface element is overlaid on the first portion of the representation of the media item when one or more criteria are satisfied, including a criterion that is satisfied when audio of the media item corresponds to the first portion of the representation of the media item, and is not overlaid on the first portion of the representation of the media item when the one or more criteria are not satisfied (820*a*), such as element 712 being overlaid on a portion of content 705 corresponding to Actor B 708 in FIG. 7B because content 705 currently includes speech from Actor B 708. In some embodiments, the respective user interface element is overlaid on the first portion of the representation of the media item because the spoken and/or non-spoken audio of the media item corresponds to the first portion of the representation of the media item (e.g., an actor/character in the first portion of the representation of the media item is currently talking). For example, the computer system is currently playing audio (e.g., speech) that corresponds to the first portion of the representation of the media item (e.g., a first character/actor). In some embodiments, if no audio (e.g., speech) is present, the computer system does not display the respective user interface element. In some embodiments, as the playback position of the media item changes, the computer system displays the respective user interface element overlaid on a second portion of the representation of the media item because the second portion now corresponds to the spoken and/or non-spoken audio of the media item (e.g., an actor/character in the second portion of the representation of the media item is currently talking). In some embodiments, if the respective user interface element is being displayed at the first portion of the representation of the media item, the respective user interface element only includes caption text associated with the first portion (and not caption/speech text associated with the second portion of the representation of the media item). In some embodiments, if the respective user interface element is being displayed at the second portion of the representation of the media item, the respective user interface element only includes caption text associated with the second portion (and not caption/speech text associated with the first portion of the representation of the media item). Displaying the respective user interface element overlaid on the portion of the representation to which (e.g., spoken and/or non-spoken) audio of the media item corresponds causes the computer system to automatically display the respective user interface at the current area of interest in the representation of the media item, thereby reducing the user's eye strain while interacting with the respective user interface element.

In some embodiments, in accordance with a determination that the representation of the media item is at a first playback position, the caption for the media item includes first content that corresponds to audio present at the first playback position (822a), such as the text included in element 712 in FIG. 7A. For example, the caption displayed in the respective user interface element includes one or more words spoken by the actors/characters at the first playback position, one or more words spoken by a narrator at the first playback position, and/or a text description of sound events at the first playback position.

In some embodiments, in accordance with a determination that representation of the media item is at a second playback position, different from the first playback position, the caption for the media item includes second content, different from the first content, that corresponds to audio present at the second playback position (822b), such as the text included in element 712 in FIG. 7B. For example, as the playback position within the representation of the media item changes, the computer system updates the caption included in the respective user interface element. For example, while the representation of the media item is at the second playback position, the computer system optionally is no longer displaying a caption based on the spoken and/or non-spoken audio at the first playback position. Instead, the computer system is optionally displaying, in the respective user interface element, a caption corresponding to the one or more words spoken by the actors/characters at the second playback position, one or more words spoken by a narrator at the second playback position, and/or a text description of sound events at the second playback position. Changing the caption displayed in the respective user interface element as the playback position of the representation of the media item changes causes the computer system to automatically present relevant information about the media item.

In some embodiments, while displaying the respective user interface element and while the computer system is playing the representation of the media item, the computer system receives (824a), via the one or more input devices, an input corresponding to a request to cease displaying the user interface element, such as an input to cease displaying element 712 in FIG. 7A. In some embodiments, the input is received while the computer system is presenting a playback controls user interface. In some embodiments, the first input is directed to a first selectable option that, when selected (e.g., with an air gesture), causes the computer system to toggle off (e.g., stop displaying) captions for the representation of media item (or toggle on if the captions for the representation of the media item are not currently being displayed). In some embodiments, the first selectable option is displayed in a menu that includes a second selectable option to toggle on the display of captions for the representation of the media item.

In some embodiments, in response to receiving the first input, the computer system continues (824b) playback of the representation of the media item without displaying the respective user interface element, such as continuing playback of content 705 from FIG. 7A to 7B, but with element 712 not being displayed in FIG. 7B. For example, after the computer system detected user input directed to toggling off the display of captions for the representation of the media item, the computer system no longer displays the respective user interface element during playback of the representation of the media item until the computer system detects a second input corresponding to a request to start displaying captions for the representation of the media item. Ceasing display of the respective user interface element for at least a portion of the remainder of playback of the representation of the media item in response to user input provides an efficient way of managing display of information associated with the representation of the media item.

It should be understood that the particular order in which the operations in method 800 have been described is merely exemplary and is not intended to indicate that the described order is the only order in which the operations could be performed. One of ordinary skill in the art would recognize various ways to reorder the operations described herein.

FIGS. 9A-9E illustrate examples of how an electronic device displays video captions for a media item based on an attention of a user of the electronic device in accordance with some embodiments of the disclosure.

Figure 9A:
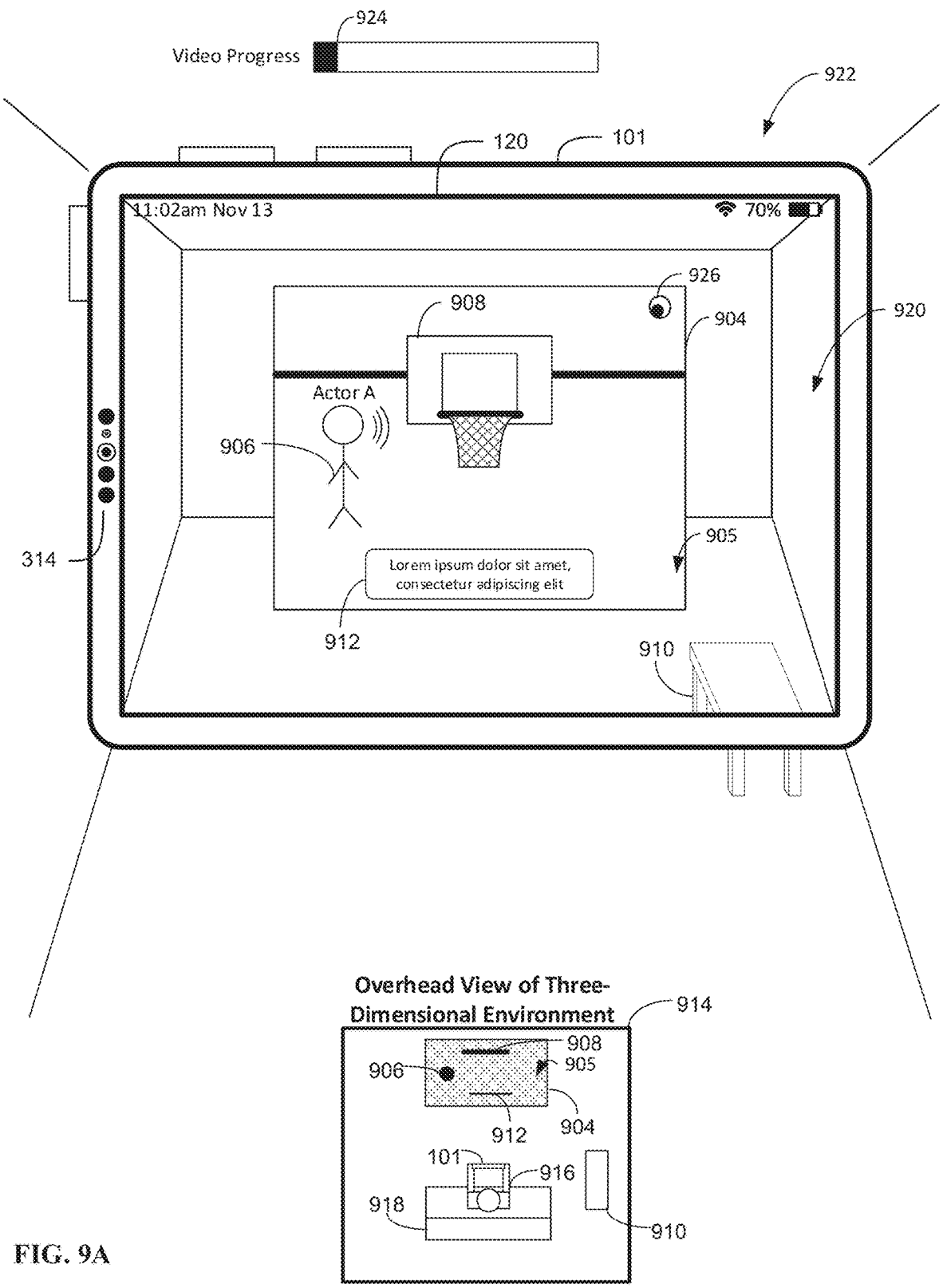
FIGS. 9A-9E illustrate examples of how an electronic device displays video captions for a media item based on an attention of a user of the electronic device in accordance with some embodiments of the disclosure.

FIG. 9A illustrates a three-dimensional environment 920 that is visible via a display generation component 120 of an electronic device 101 and an overhead view 914 of the three-dimensional environment 920. As described above with reference to FIGS. 1-6, the electronic device 101 optionally includes a display generation component 120 (e.g., a touch screen) and a plurality of image sensors (e.g., image sensors 314 of FIG. 3). The image sensors optionally include one or more of a visible light camera, an infrared camera, a depth sensor, or any other sensor that the electronic device 101 would be able to use to capture one or more images of a user or a part of the user while the user interacts with the electronic device 101. In some embodiments, the user interfaces shown and described below could also be implemented on a head-mounted display that includes a display generation component that displays the user interface to the user and sensors to detect the physical environment, movements of the user's hands (e.g., external sensors facing outwards from the user), and/or gaze of the user (e.g., internal sensors facing inwards towards the face of the user).

As described above with respect to FIGS. 7A-7E, in some embodiments, a three-dimensional environment includes one or more representations of physical objects in the physical environment of the electronic device 101 and/or one or more virtual objects (e.g., objects that are not located in the physical environment 922 of the electronic device 101 but are generated and displayed by the electronic device 101). In the example of FIG. 9A, the three-dimensional environment 920 includes a media user interface object 904 (e.g., the same as or similar to the media user interface object 704 described in FIGS. 7A-7E) and a representation 910 of a table that is in the physical environment 922 of the electronic device 101. In some embodiments, one or more portions of the physical environment 922 of the electronic device 101 are passively visible via the electronic device 101 via a transparent or translucent display of the electronic device 101. For example, the representation 910 of the table is optionally not displayed and/or generated by the electronic device 101, but is instead visible via the transparent or translucent display of the electronic device 101.

In some embodiments, the electronic device 101 displays the three-dimensional environment 920 from a viewpoint of a user 916 of the electronic device 101. For example, as shown in the overhead view in 914 in FIG. 9A, the user 916 is currently viewing the three-dimensional environment 920 from a position that corresponds the center of the three-dimensional environment 920 and with a pose that is oriented towards the top/back portions of the three-dimensional environment 920. Accordingly, in FIG. 9A, the electronic device 101 is displaying the media user interface object 904 and the representation 910 of the table because these objects are in a field of view from the user's 916 current viewpoint of the three-dimensional environment (as illustrated in the overhead view 914 in FIG. 9A). Conversely, as shown in FIG. 9A, the electronic device 101 is not displaying the representation 918 of a sofa (a physical object in the physical environment 922) because this object is not currently in the field of view from the user's 916 current viewpoint of the three-dimensional environment 920.

In some embodiments, the user's 916 viewpoint of the three-dimensional environment 920 corresponds to the location and/or pose of the user 916 in the physical environment 922 of the electronic device 101 (e.g., operating environment 100). For example, the user's 916 viewpoint of the three-dimensional environment 920 is optionally the viewpoint illustrated in the overhead view 914 in FIG. 9A because the user 916 is currently oriented towards a back wall in the physical environment 922 and is located in the center of physical environment 922 while holding the electronic device 101 (e.g., or wearing device 101 if device 101 were a head-mounted device). As will be described in more detail below, the user's 916 viewpoint of the three-dimensional environment 920 optionally changes as the pose of the user 916 in the physical environment 922 changes and/or as the user 916 moves in the physical environment 922.

In some embodiments, the electronic device 101 is configured to present a media item in different modes of presentation including an immersive presentation mode and/or a non-immersive presentation mode. For example, in FIG. 9A, the electronic device 101 is currently presenting a representation of a media item 905 in the non-immersive presentation mode. In some embodiments, content of a media item during the non-immersive presentation mode is presented within the length, width, and/or depth of the media user interface object 904. For example, as shown in the overhead view 914 in FIG. 9A, while the representation of the media item 905 corresponds to the non-immersive presentation mode, the electronic device 101 is presenting the representation of the media item 905 within the length, width, and/or depth (e.g., X, Y, and/or Z boundaries) of the media user interface object 904.

In some embodiments, while the representation of the media item 905 corresponds to the non-immersive presentation mode, portions of the three-dimensional environment 920 and/or portions of the physical environment 922 that are visible via the translucent or transparent display of the electronic device 101 are not occluded/obscured by the representation of the media item 905. For example, as shown in FIG. 9A, the representation of the media item 905 during the non-immersive presentation mode is occupying less than a threshold amount of space in the user's field of view (e.g., less than 75%, 60%, 50%, 40%, 30%, 20%, 10%, or 5% of space in the user's field of view), and as a result, the representation of the media item 905 is not occluding/obscuring one or more other portions of the three-dimensional environment 920 and/or physical environment 922 from the viewpoint of the user 916.

As described previously with reference to FIGS. 7A-7E and method 800, in some embodiments, the representation of the media item 905 includes content (e.g., one or more portions) that is at different depths within the representation of the media item 905. For example, as shown in the overhead view 914 in FIG. 9A, the representation of the media item 905 is currently presenting content corresponding to a first playback position 924 which includes an Actor A 906 that is at a first location and a first depth in the representation of the media item 905 and a second object 908 (a basketball net) that is at a second location (e.g., different from the first location) and a second depth (e.g., different from the first depth) in the representation of the media item 905.

Additionally, in FIG. 9A, the electronic device 101 is also presenting a user interface element 912. In some embodiments, the user interface element 912 has one or more characteristics similar to the video captions user interface element 712 described in FIGS. 7A-7E. In some embodiments, the user interface element 912 is a user interface element different than the video captions user interface element 712 described in FIGS. 7A-7E and/or includes additional or alternative information compared to the video captions user interface element 712. For example, if the media item 905 in FIG. 9A corresponds to a (e.g., live) sporting event, the user interface element 912 in FIG. 9A would optionally include information about the sporting event, such as the current score of the sporting event, the teams playing in the sporting event, and/or the remaining time in the sporting event. Similarly, if the media item 905 in FIG. 9A is a movie or TV show, the user interface element 912 would optionally include information relevant to the current playback position in the media item 905 such as the names and/or biographies of the actors/characters at the current playback position in the media item 905; information about the song playing at the current playback position in the media item 905; and/or commentary from a director of the media item 905 about the current playback position in the media item 905.

In some embodiments, while the representation of the media item 905 corresponds to the non-immersive presentation, the electronic device 101 displays the user interface element 912 at an X-location (e.g., horizontal location relative to the viewpoint of the user 916), Y-location (e.g., vertical location relative to the viewpoint of the user 916), and/or a Z-location (e.g., distance from the viewpoint of the user 916) that corresponds to the X, Y, and/or Z location of the portion of the representation of the media item 905 to which the attention of the user 916 is currently directed (e.g., during the non-immersive presentation mode, the user interface element 912 is displayed in similar ways described in FIGS. 7A-7E and/or in similar ways described below with reference to the immersive presentation mode of the representation of the media item 905). In some embodiments, the attention of the user 916 is determined based on a gaze 926 of the user 916 and/or based on a head position of the user 916. For example, the electronic device 101 optionally detected/determined that the attention of the user 916 in FIG. 9A is directed to the top-right portion of the representation of the media item 905 in response to detecting, via the one or more sensors 314, that a gaze 926 of the user 916 is directed to the top-right portion of the representation of the media item 905 and/or in response to detecting, via the one or more sensors 314, that a head of the user 916 is oriented towards the top-right portion of the representation of the media item 905.

Alternatively, in some embodiments, while the representation of the media item 905 corresponds to the non-immersive presentation mode, the electronic device 101 optionally displays the user interface element 912 at a predetermined X-location (e.g., horizontal location relative to the viewpoint of the user 916), Y-location (e.g., vertical location relative to the viewpoint of the user 916), and/or Z-location (e.g., distance from the viewpoint of the user 916) that is not based on the attention of the user 916. For example, as shown in FIG. 9A, even though the electronic device 101 has detected that the attention of the user 916 is directed at the top-right portion of the representation of the media item 905, the electronic device 101 is not displaying the user interface element 912 at a location corresponding to the top-right portion of the representation of the media item 905, but is instead displaying the user interface element 912 overlaid on the bottom-center portion of the representation of the media item 905 (e.g., because the electronic device 101 displays the user interface element 912 overlaid on the predetermined bottom-center portion of the representation of the media item 905 even when the attention of the user 916 is directed elsewhere).

Figure 9B:
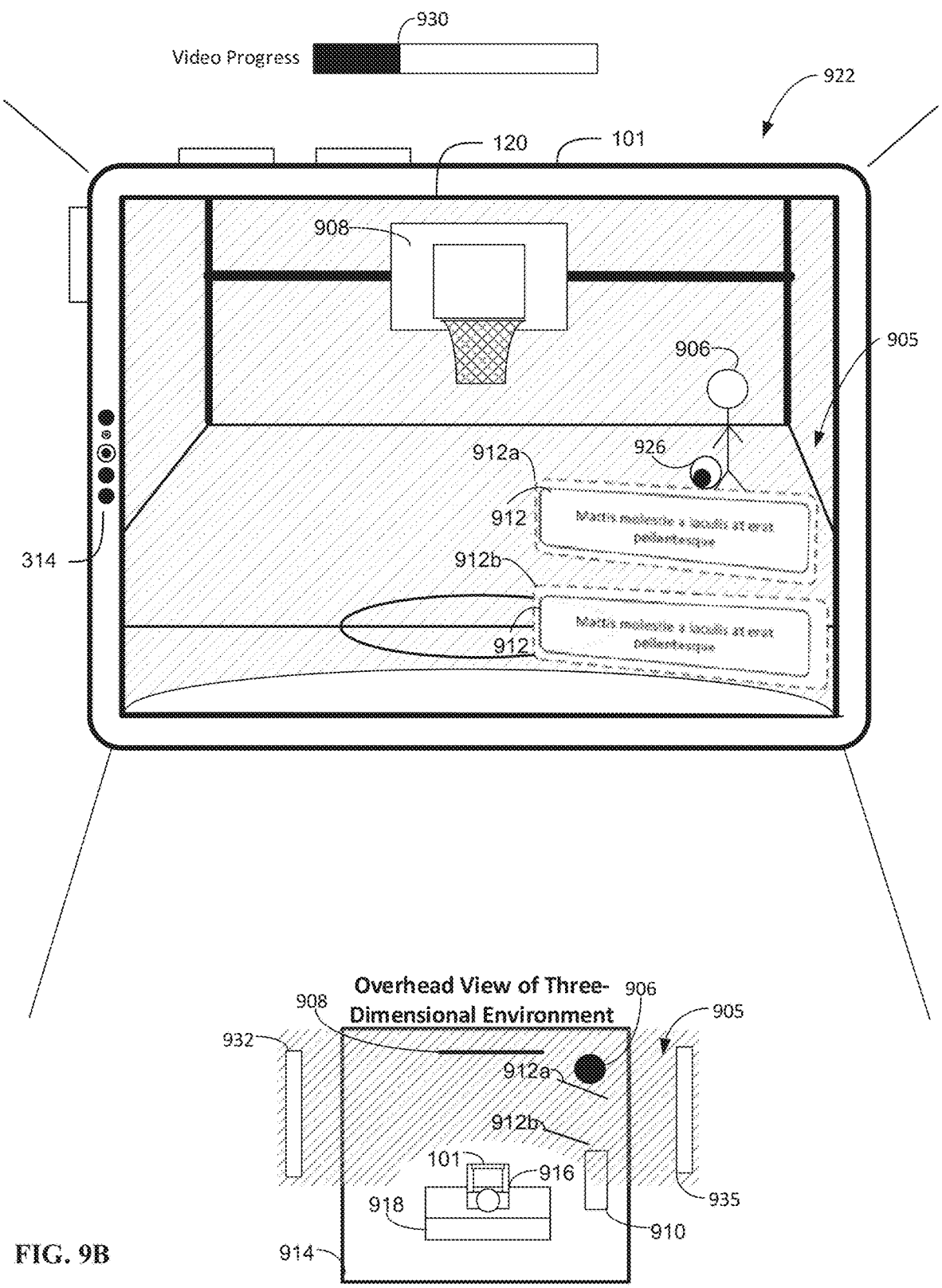

In FIG. 9B, the electronic device 101 is now presenting the representation of the media item 905 in the immersive presentation mode and at a second playback position 930 (e.g., a playback position different than the first playback position 924 illustrated in FIG. 9A). In some embodiments, the electronic device 101 started presenting the representation of the media item 905 in the immersive presentation mode in response to the electronic device 101 detecting a selection of a selectable option similar to the selectable option 726*a* described in FIG. 7C. In some embodiments, the representation of the media item 905 during the immersive presentation mode occupies a larger amount of space in the field of view of the user 916 as compared to when the representation of the media item 905 is presented in the non-immersive presentation mode (as described in FIG. 9A). For example, as shown in the overhead view 914 in FIG. 9B, the representation of the media item 905 has expanded in size from FIG. 9A to span 180 degrees of area around the viewpoint of the user 916. While the representation of the media item 905 in FIG. 9B is shown as occupying 180 degrees of area around the viewpoint of the user 916, it should be understood by one of ordinary skill in the art that the representation of the media item 905 during the immersive presentation mode could also surround 45, 90, 125, 250, or 360 degrees of area around the user's 916 viewpoint without departing from the scope of the disclosure.

In some embodiments, during the immersive presentation mode, the electronic device 101 displays the user interface element 912 at an X position (horizontal position) relative to the viewpoint of the user 916 that is based on the portion of the representation of the media item 905 to which the attention of the user is directed and at a fixed Y position (vertical position) relative to the viewpoint of the user 916 and/or Z position (distance) relative to the viewpoint of the user 916. For example, in the embodiments where the electronic device 101 is displaying the user interface element 912 at a fixed Y position and/or Z position relative to the viewpoint of the user 916, the electronic device 101 optionally displays the user interface element 912 at position 912*b* (illustrated in FIG. 9B) in response to detecting that the attention of the user 916 is directed to Actor A 906 because the Y and Z position of the user interface element 912 at position 912*b* corresponds to the vertical position and distance relative to the viewpoint of the user 916 that was predetermined by the electronic device 101, and because the X position of the user interface element 912 at position 912*b* corresponds to the X position of Actor A 906, to which gaze 926 is directed (e.g., the user interface element 912 has the same (or similar) X position as Actor A 906—the portion of the representation of the media item 905 to which the attention of the user 916 is directed).

The above example described an embodiment where the Y-position of the user interface element 912 has been fixed to cause the user interface element 912 to be displayed overlaid on the bottom portion of the representation of the media item 905. However, it should be noted that the Y-position of the user interface element 912 could also be fixed to cause the user interface element 912 to be displayed in a middle or top portion of the representation of the media item 905. It should also be noted that, in some embodiments, the Z-position of the user interface element 912 is not predetermined (fixed) as described above. Rather, the Z-position of the user interface element 912 could also correspond to the Z-position of the portion of the representation of the media item 905 to which the attention of the user is directed (e.g., Actor A 906). Further, while the above embodiment describes an example where the electronic device 101 displays the user interface element 912 at a predetermined (fixed) Y-position and at an X-position that is based on the attention of the user 916, embodiments are also contemplated where the X-position of the user interface element 912 is predetermined/fixed and the Y-position of the user interface element 912 is based on the attention of the user 916.

Figure 9C:
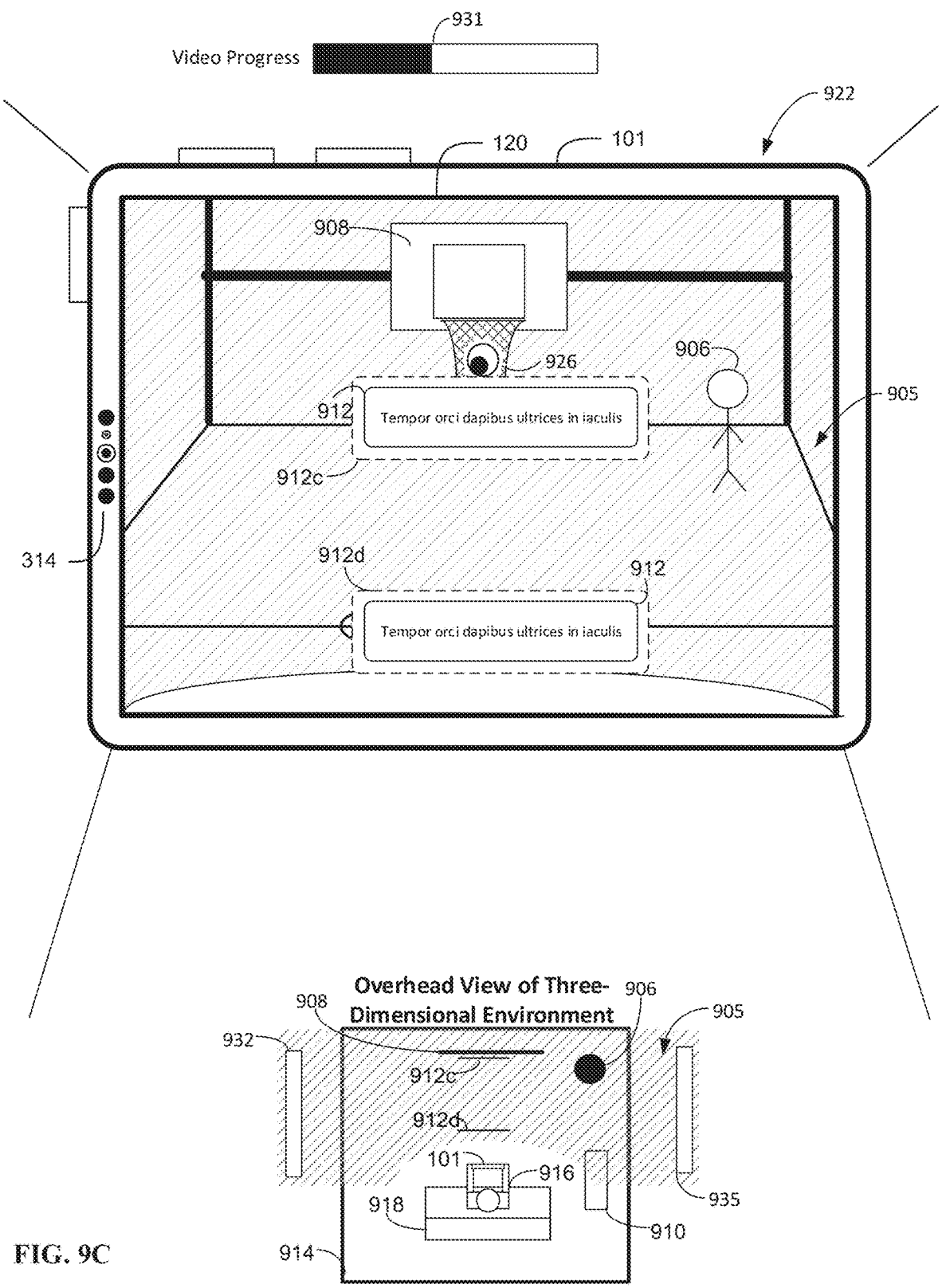

In embodiments where the X-position of the user interface element 912 is based on the attention of the user 916 and the Y-position and/or Z-position of the user interface element 912 has been predetermined by the electronic device 101, the X-position of the user interface element 912 optionally changes as the attention of the user 916 changes. For example, in FIG. 9C, the electronic device 101 has detected that the attention of the user 916 has changed from being directed to Actor A 906 as illustrated in FIG. 9B to being directed to the second object 908 as illustrated in FIG. 9C, and the playback position is now playback position 931. In response to detecting the change in the attention of the user 916, the electronic device 101 optionally ceases display of the user interface element 912 at position 912*b* (illustrated in FIG. 9B) and starts displaying the user interface element 912 at position 912*d* illustrated in FIG. 9C, which is to the left of position 912*b* from the viewpoint of the user 916. In some embodiments, the electronic device 101 moves/slides the user interface element 912 from position 912*b* to position 912*d* without ceasing display of user interface element 912—in some embodiments, the electronic device 101 ceases displaying user interface element 912 (e.g., while at position 912*b*), and then redisplays user interface element 912 at position 912*d*. The electronic device 101 optionally started displaying the user interface element 912 at position 912*d* in response to detecting that the attention of the user 916 is directed to the second object 908 because the electronic device 101 updated the X-position of the user interface element 912 to correspond to the second object 908 (e.g., to have the same X-position as the second object 908 in the representation of the media item 905). Additionally, as shown in FIGS. 9B and 9C, the Y-position and Z-position of the user interface element 912 did not change as the electronic device 101 stopped displaying the user interface element 912 at position 912*b* and starting displaying the user interface element 912 at position 912*d* because, as described above, in some embodiments, the Y-position and Z-position of the user interface element 912 is predetermined/fixed and thus does not change even as the attention of the user 916 changes.

As an alternative to the embodiments described above where the user interface element 912 is displayed at a fixed position along at least one respective axis (e.g., X, Y, and/or Z axis), in some embodiments, the user interface element 912 is not displayed at a fixed position along two or more axes (e.g., any axis) relative to the viewpoint of the user 916. For example, in the embodiments where the electronic device 101 is not displaying the user interface element 912 at a fixed position along any respective axis, the electronic device 101 optionally displays the user interface element 912 at position 912*a* illustrated in FIG. 9B (instead of displaying the user interface element 912 at position 912*b* as described previously) in response to the electronic device 101 detecting that the attention of the user 916 is directed to Actor A 906. The electronic device 101 optionally displays the user interface element 912 at position 912*a* in response to detecting that the attention of the user 916 is directed to Actor A 906 because the X-position, Y-position, and Z-position of the user interface element 912 at position 912*a* corresponds to Actor A 906 (e.g., the user interface element 912 is displayed at the same X-location as Actor A 906, at a Y-location that is offset (below) from Actor A 906, and at a Z-location that is 0.0, 0.1, 0.2, 0.3, 0.7, 1, or 2 millimeters or 0.5, 1, 3, 5, 10, 30 or 50 cm in front of Actor A 906). While the above embodiment describes an example where the user interface element 912 is displayed below Actor A 906—the portion of the representation of the media item 905 to which the attention of the user is directed—it should be understood that when the user interface element 912 is not being displayed at a fixed position along a respective axis, the user interface element 912 could be displayed offset in any direction from Actor A 906 or overlaid on Actor A 906 (e.g., in response to detecting that the attention of the user 916 is directed to Actor A 906).

In embodiments where the electronic device 101 is not displaying the user interface element 912 at a fixed position along two or more axes (e.g., any axis), the X, Y, and/or Z position of the user interface optionally changes as the attention of the user 916 changes. For example, in FIG. 9C, the electronic device 101 has detected that the attention of the user 916 has changed from being directed to Actor A 906 to being directed to the second object 908 (as described previously). In response, the electronic device 101 optionally ceases display of the user interface element 912 at position 912*a* illustrated in FIG. 9B and starts displaying the user interface element 912 at position 912*c* illustrated in FIG. 9C (e.g., whether sliding/moving over user interface element 912, or ceasing display of and then redisplaying user interface element 912). The electronic device 101 optionally starts displaying the user interface element 912 at position 912*c* in response to detecting that the attention of the user 916 changed to the second object 908 because the electronic device 101 updated the X, Y, and Z position of the user interface element 912 to correspond to the second object 908 (e.g., updated the user interface element 912 to be displayed at a same X-position as the second object 908, at a Y-position that is offset (e.g., below) from the second object 908, and at a Z-position that is 0.0, 0.1, 0.2, 0.3, 0.7, 1, or 2 millimeters or 0.5, 1, 3, 5, 10, 30 or 50 cm in front of the second object 908). Position 912*c* of user interface element 912 optionally differs in two or more axes from position 912*a* in FIG. 9B. While the above embodiment describes an example where the user interface element 912 is displayed below the second object 908—the portion of the representation of the media item 905 to which the attention of the user 916 is directed—it should be understood that when the user interface element 912 is not being displayed at a fixed position along a respective axis, the user interface element 912 could be displayed offset in any direction from the second object 908 or overlaid on the second object 908 (e.g., in response to detecting that the attention of the user 916 is directed to Actor A 906).

In some embodiments, the electronic device 101 optionally displays different portions of the representation of the media item 905 as the user's viewpoint of the three-dimensional environment 920 changes. For example, in FIGS. 9C and 9D, the user's viewpoint of the three-dimensional environment 920 has moved from the viewpoint illustrated in the overhead view 914 in FIG. 9C to the viewpoint illustrated in the overhead view 914 in FIG. 9D. In some embodiments, the user's 916 viewpoint of the three-dimensional environment 920 moved to the viewpoint indicated in FIG. 9D because the user 916 rotated (e.g., optionally concurrently with the electronic device 101) in the physical environment 922 from the pose indicated in the overhead view 914 in FIG. 9C to the pose indicated in the overhead view 914 in FIG. 9D.

Figure 9D:
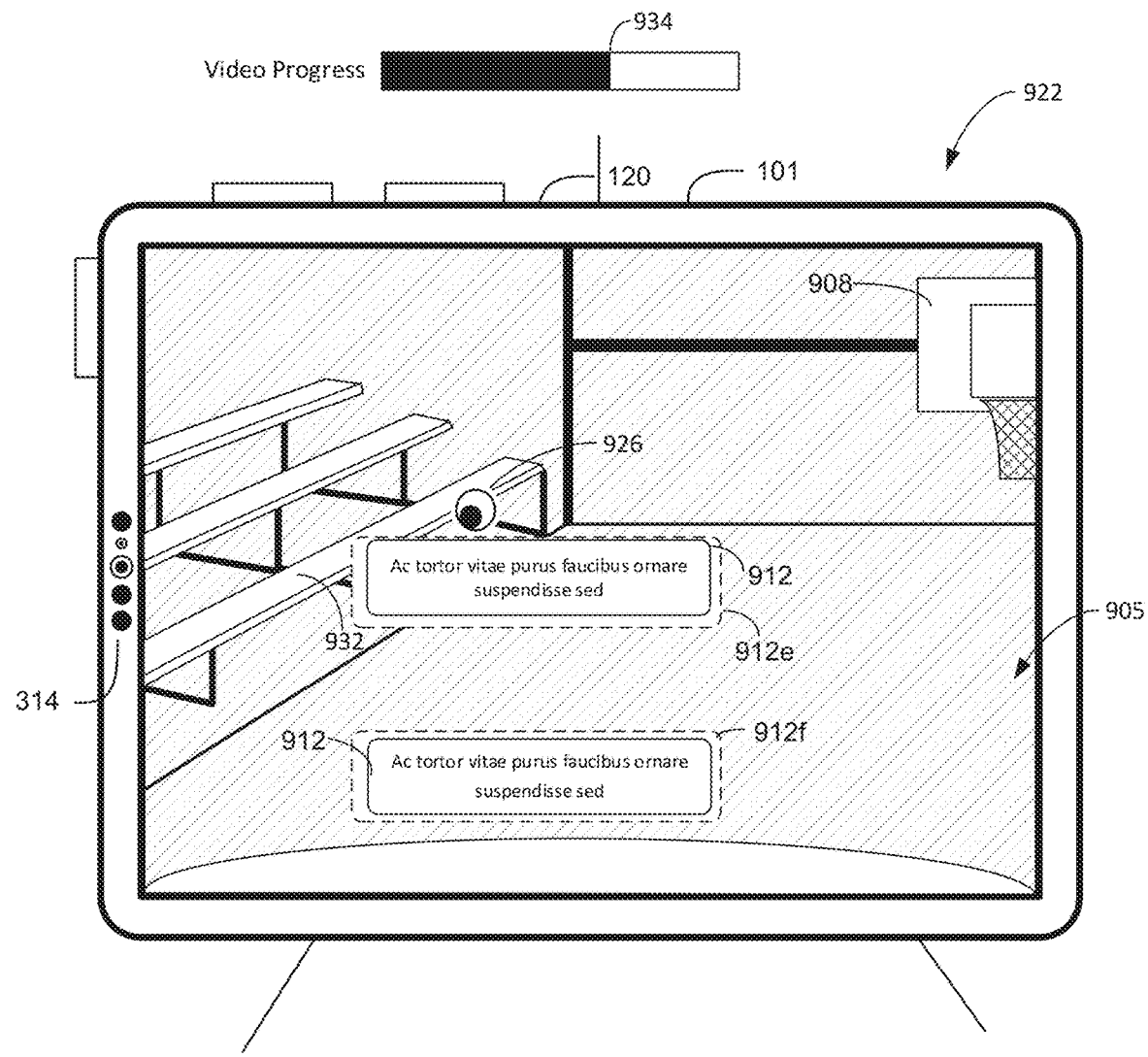
Figure 9D:
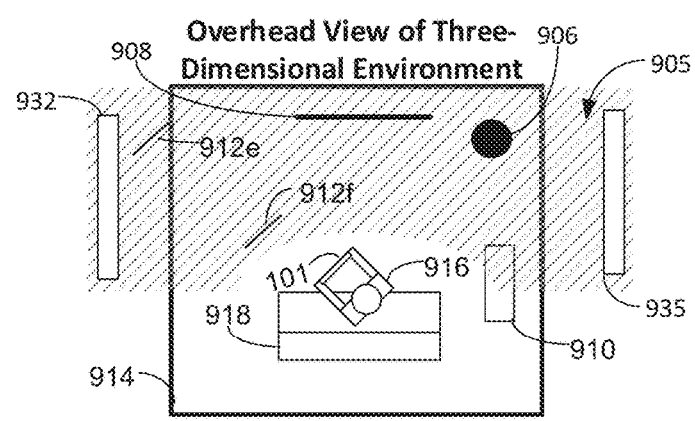

As shown in FIG. 9D, in response to the electronic device 101 detecting movement of the viewpoint of the user 916, the electronic device 101 is now displaying portions of the representation of the media item 905 that are in the field of view from the current viewpoint of the user 916, and the playback position is playback position 934. Specifically, in FIG. 9D, the electronic device 101 is now presenting a portion of the representation of the media item corresponding to a third object 932 because this object is now in the field of view from the viewpoint of the user 916 (as indicated in the overhead view 914 in FIG. 9D) and is no longer presenting the portion of the representation of the media item 905 corresponding to Actor A 906 because this object is no longer in the field of view from the viewpoint of the user 916.

Additionally, as shown in FIG. 9D, the electronic device 101 is displaying the user interface element 912 at either position 912*e* (e.g., two or more non-fixed axes) or 912*f* (e.g., two fixed axes) for similar reasons as described above. In some embodiments, the user interface element 912 exhibits lazy follow behavior, as also described previously. For example, in FIG. 9D, the electronic device 101 optionally does not immediately display the user interface element 912 at position 912*e* or 912*f* in response to detecting that the attention of the user is directed to the third object 932. Instead, the electronic device 101 optionally delays displaying the user interface element 912 at the position 912*e* or 912*f* until the attention of the user 916 has been directed to the third object 932 for at least a threshold amount of time (e.g., 0.5, 1, 3, 7, or 10 seconds) and/or until the other criteria described in method 1000 is satisfied. In some embodiments, the electronic device 101 begins sliding/moving the user interface element 912 to position 912*e* or 912*f* as soon as the attention of the user is directed to the third object 932, but the sliding/moving takes a certain amount of time (e.g., 0.5, 1, 3, 7, or 10 seconds) to complete.

Figure 9E:
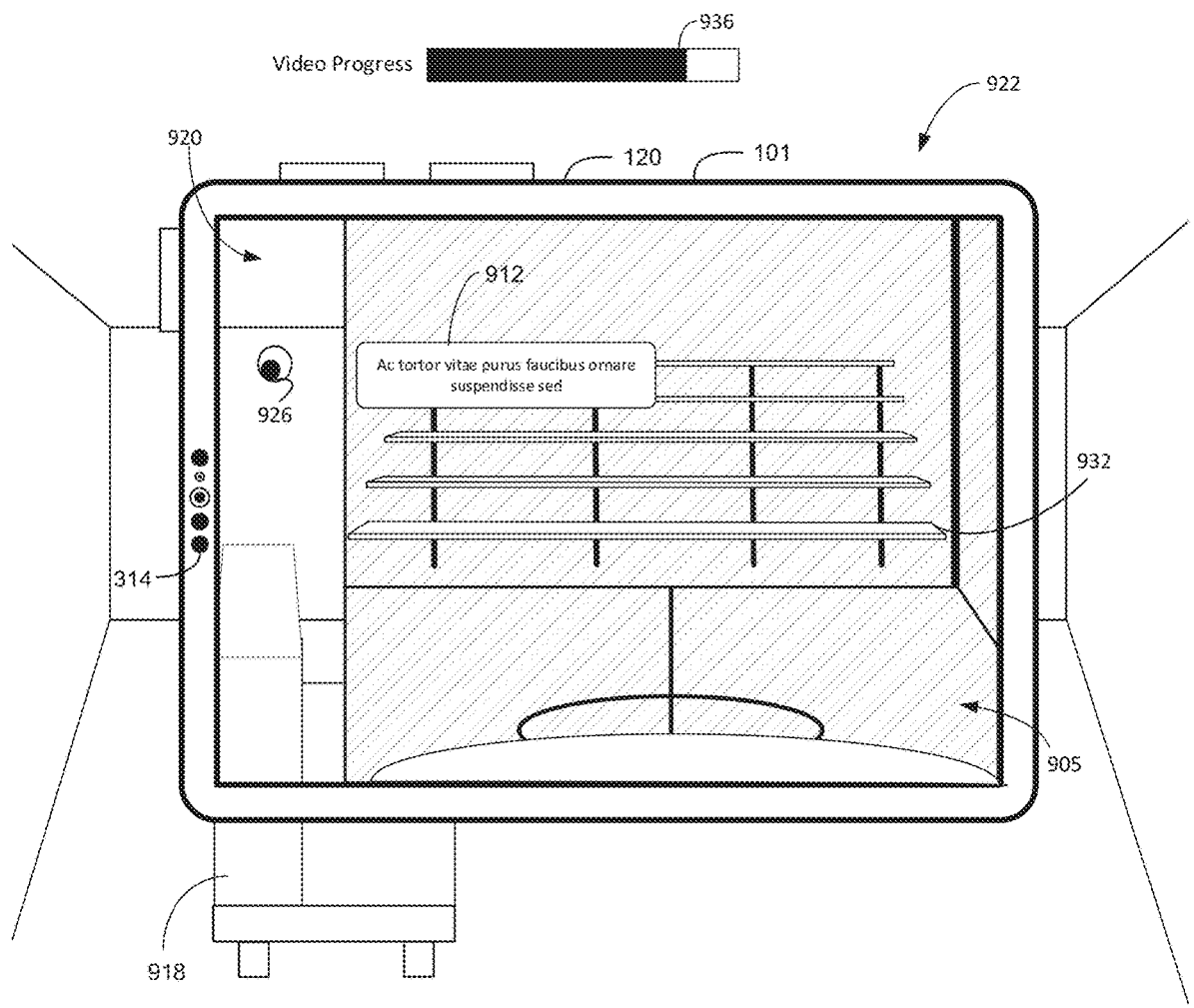
Figure 9E:
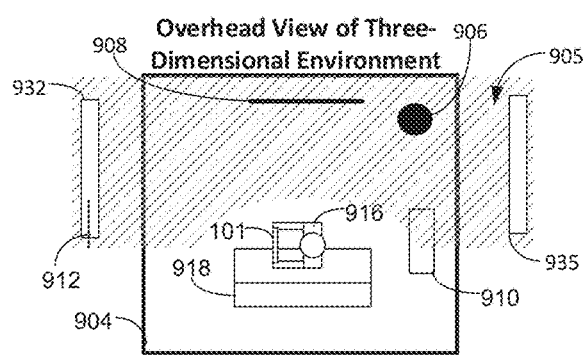
Figure 10A:
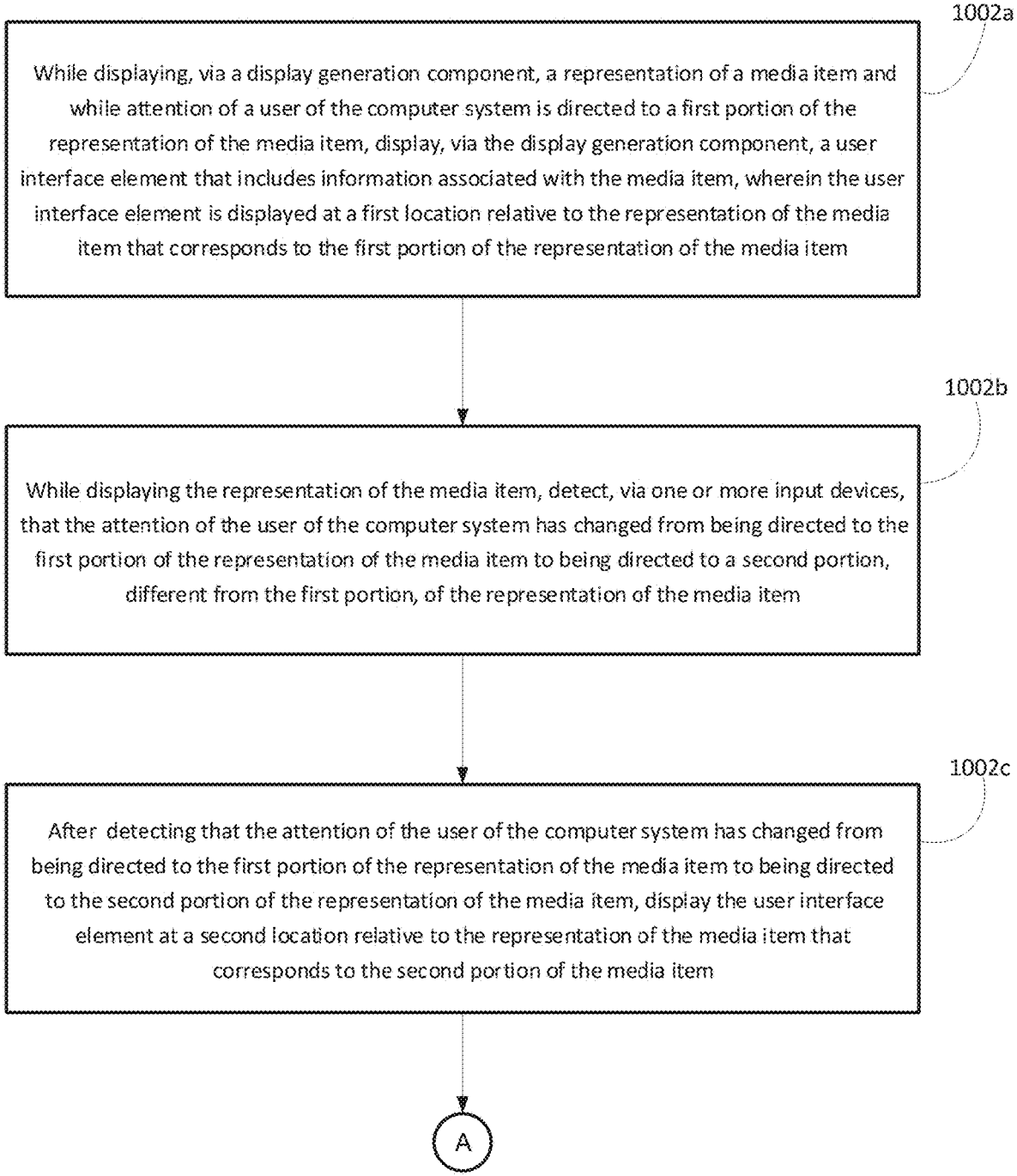
FIGS. 10A-10G is a flowchart illustrating a method of displaying video captions for a media item based on an attention of a user of an electronic device in accordance with some embodiments.
Figure 10B:
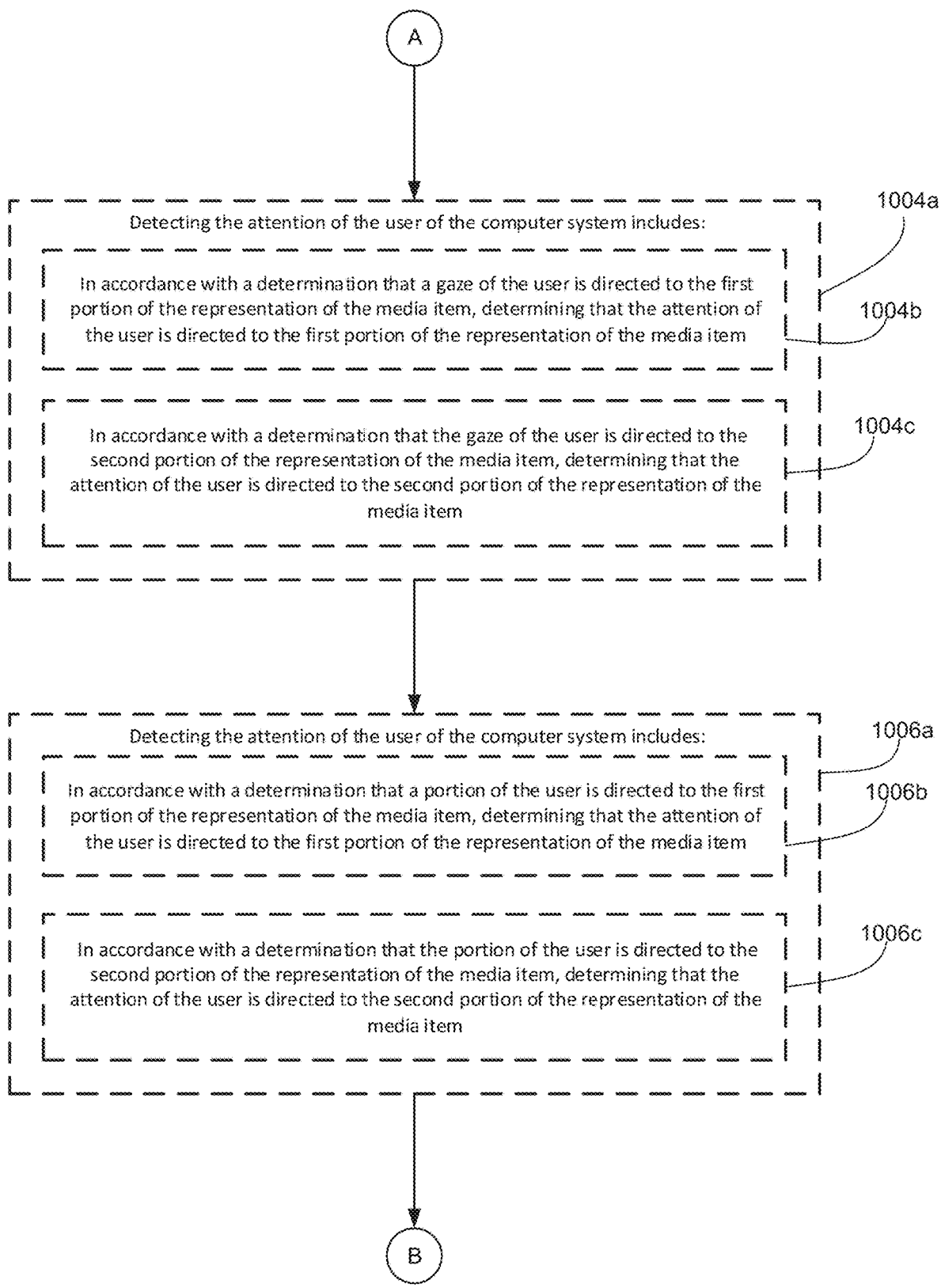
Figure 10C:
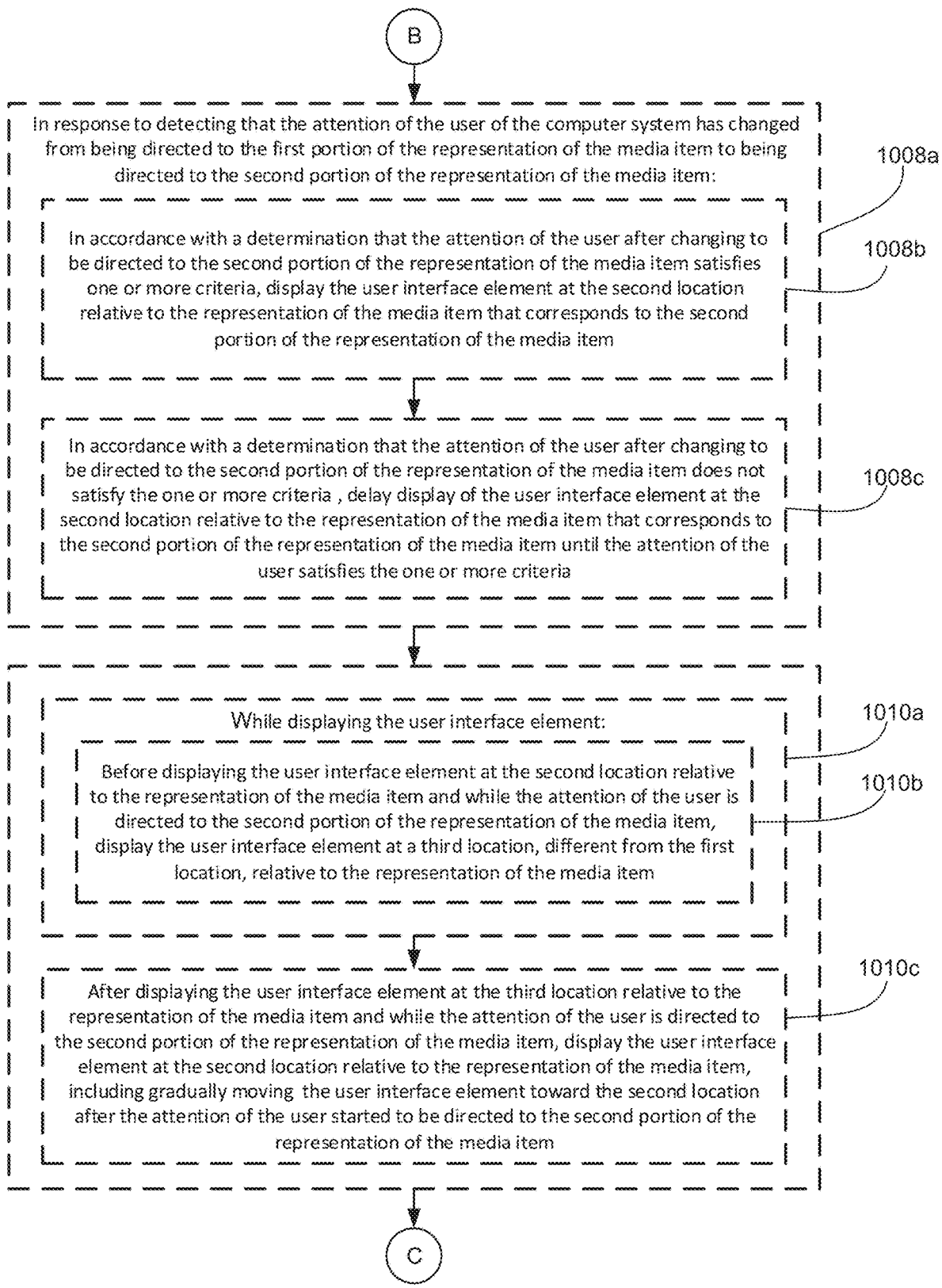
Figure 10D:
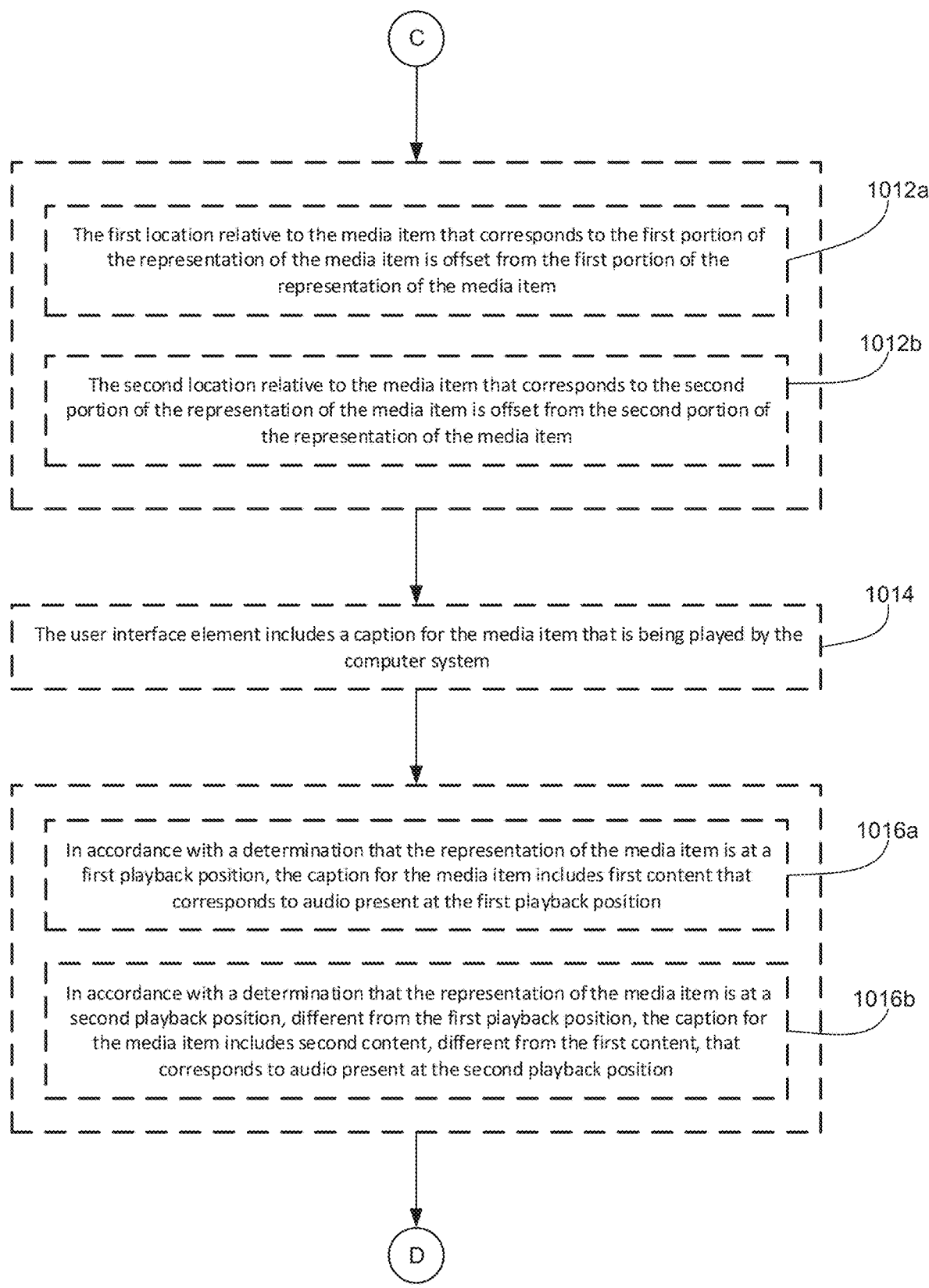
Figure 10E:
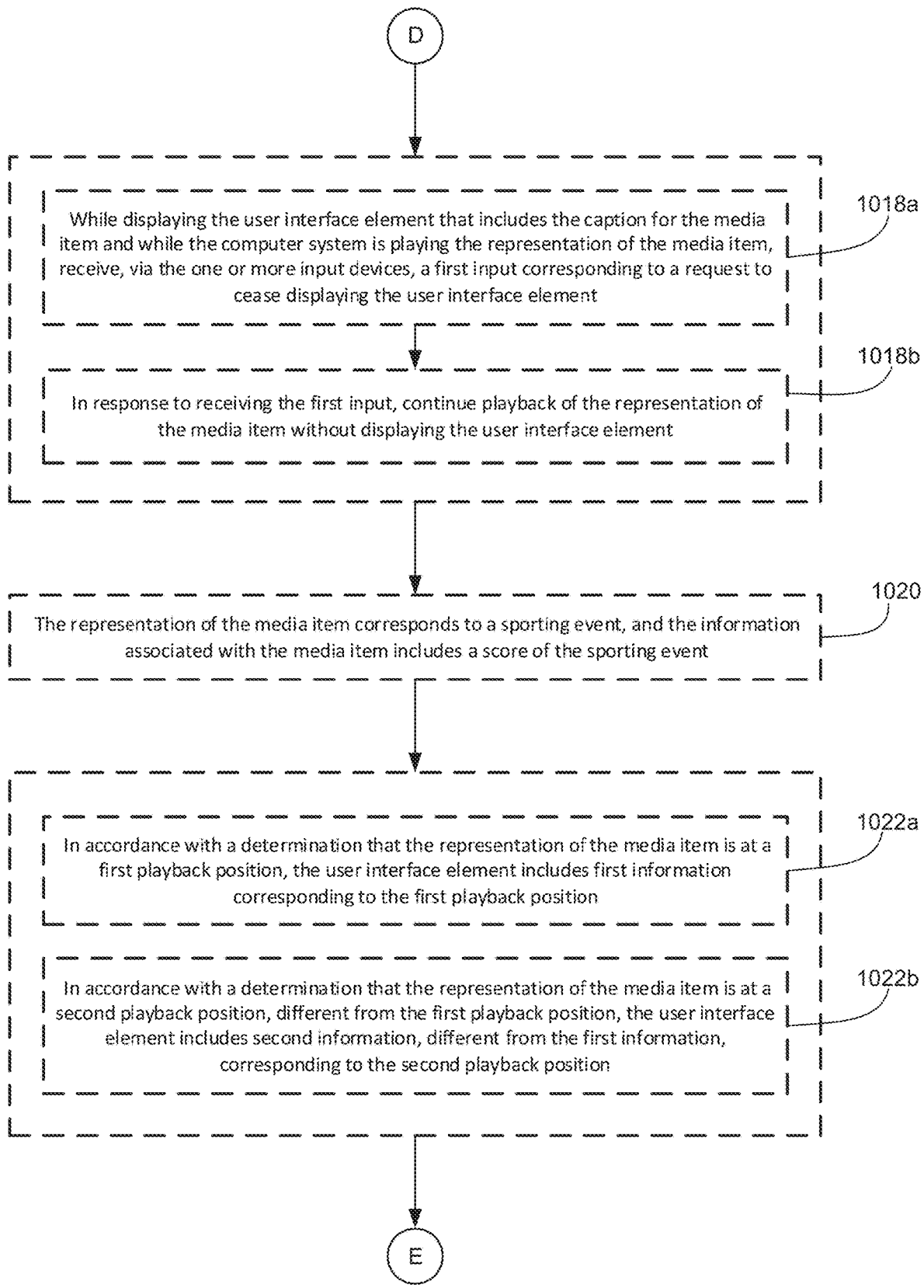
Figure 10F:
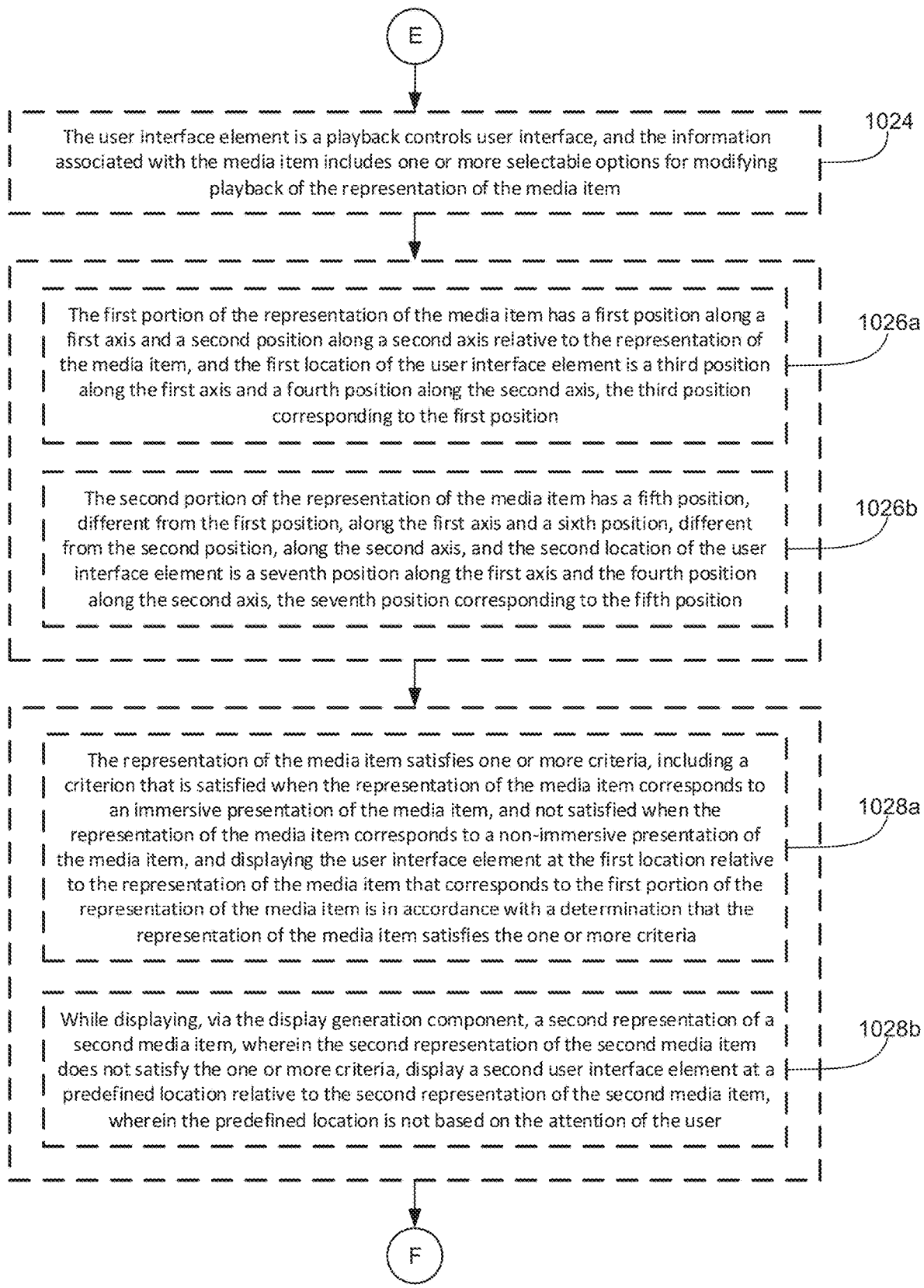
Figure 10G:
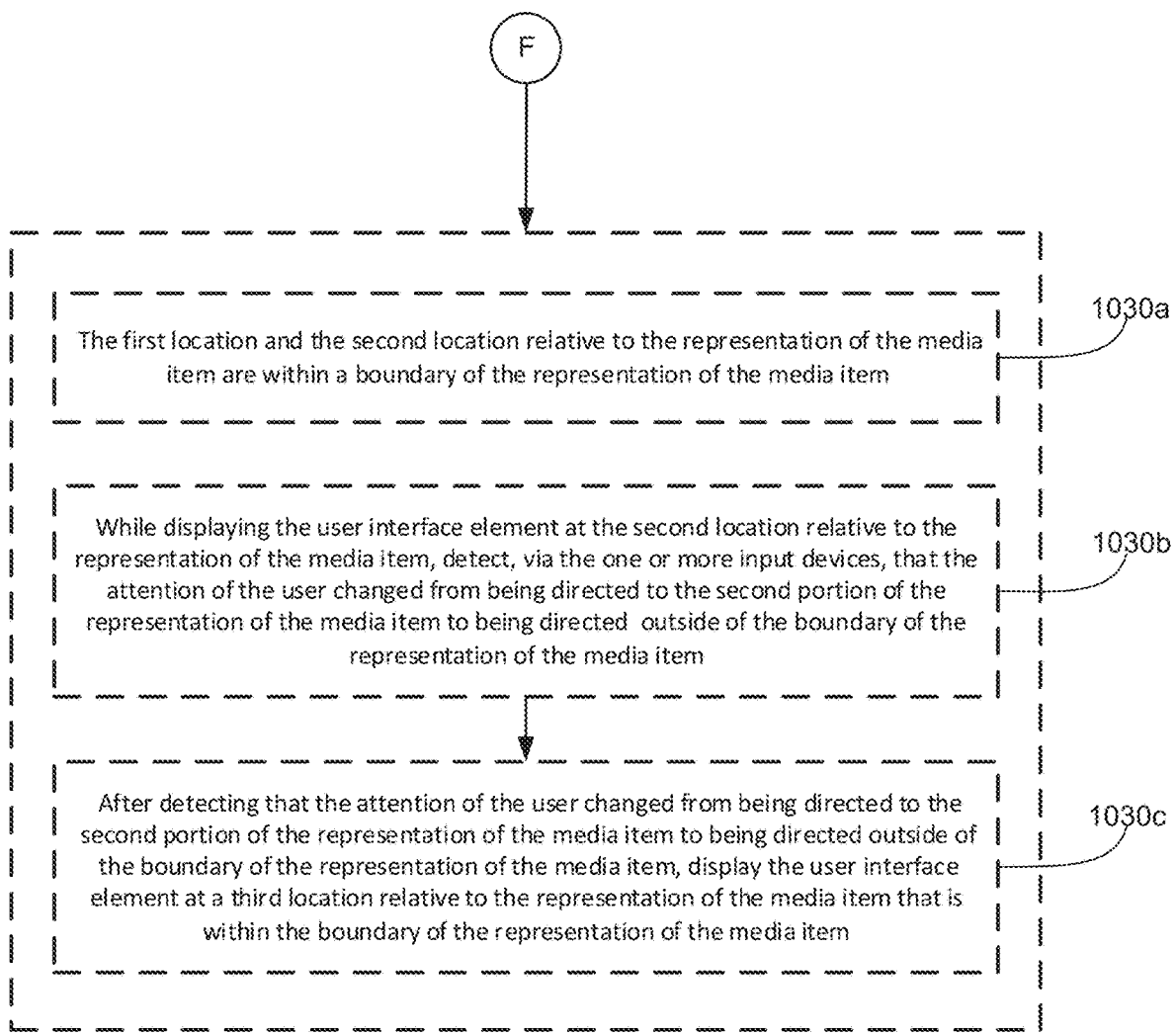

In FIG. 9E, the electronic device 101 has again detected movement of the viewpoint of the user 916 from the viewpoint indicated in the overhead view in FIG. 9D to the viewpoint indicated in the overhead view in FIG. 9E, and the playback position is playback position 936. The viewpoint of the user 916 optionally moved from the viewpoint illustrated in FIG. 9D to the viewpoint illustrated in FIG. 9E for similar reasons described in FIGS. 9C and 9D. As a result, the electronic device 101 is now presenting portions of the three-dimensional environment 920 (e.g., outside of the representation of the media item 905) and portions of the representation of the media item 905 that are in the field of view from the user's 916 current viewpoint of the three-dimensional environment 920 (illustrated in the overhead view in FIG. 9E). It should be understood that if the representation of the media item 905 occupied 360 degrees of area around the user's viewpoint of the three-dimensional environment 920 instead of 180 degrees of area as illustrated in FIG. 9E, portions of the three-dimensional environment 920 outside of the representation of the media item 905 would optionally not be displayed when the user's viewpoint moved to the viewpoint indicated in FIG. 9E (e.g., because the representation of the media item 905 would be obscuring those portions).

In some embodiments, representations of the physical environment 922 in the three-dimensional environment 920 are visually deemphasized while the electronic device 101 is presenting the representation of the media item 905 in the immersive presentation mode. For example, in FIG. 9E, because the electronic device 101 is presenting the representation of the media item 905 in the immersive presentation mode (as described previously), the representation 918 of the sofa and of the walls in the physical environment 922 are optionally less opaque, more transparent, displayed with less contrast, and/or displayed with less color during the immersive presentation mode than if these representations were being displayed while the representation of the media item 905 was in the non-immersive presentation mode.

In some embodiments, when the attention of the user 916 becomes directed to an area outside of the representation of the media item 905, the electronic device 101 continues to display the user interface element 912 within the X, Y, and/or Z boundaries of the representation of the media item 905. For example, in FIG. 9E, the electronic device 101 is currently detecting that the attention of the user 916 is directed to a back wall of the three-dimensional environment 920 (e.g., an area of the three-dimensional environment 920 that does not correspond to the representation of the media item 905 and is outside of the representation of the media item 905). As shown in FIG. 9E, in response to the electronic device 101 detecting that the attention of the user 916 is directed to an area outside of the representation of the media item 905, the electronic device 101 is still displaying the user interface element 912 within the boundaries of the representation of the media item 905. In some embodiments, the position of user interface element 912 is close (or as close as possible) to the position of the attention of the user outside of the representation of the media item 905, without user interface element 912 extending outside of the representation of the media item 905 and/or while remaining further than a threshold distance (e.g., 0.1, 0.3, 0.5, 1, 3, 5 or 10 cm) from the outer boundary of the representation of the media item 905.

FIGS. 10A-10G is a flowchart illustrating a method 1000 of displaying video captions for a media item based on an attention of a user of an electronic device in accordance with some embodiments. In some embodiments, the method 1000 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1000 are, optionally, combined and/or the order of some operations is, optionally, changed.

In some embodiments, method 1000 is performed at a computer system (e.g., electronic device 101) in communication with a display generation (e.g., 120) and one or more input devices (e.g., 314). In some embodiments, the computer system is the same as or similar to the computer system described above with reference to method 800. In some embodiments, the one or more input devices are the same as or similar to the one or more input devices described above with reference to method 800. In some embodiments, the display generation component is the same as or similar to the display generation component described above with reference to method 800.

In some embodiments, while displaying, via the display generation component, a representation of a media item (e.g., similar to the representation of the media item described in methods 800 and/or 1200) and while attention of a user of the computer system is directed to a first portion of the representation of the media item, the computer system displays (1002*a*), via the display generation component, a user interface element (e.g., such as the user interface element described in methods 800 and/or 1200) that includes information associated with the media item, such as element 912, wherein the user interface element is displayed at a first location relative to the representation of the media item that corresponds to the first portion of the representation of the media item, such as the location of element 912 in FIG. 9B when the gaze 926 of the user is directed to Actor A 906. In some embodiments, the representation of the media item is displayed in a three-dimensional environment. In some embodiments, the attention of the user of the computer system is determined to be directed at the first portion of the representation of the media item when a gaze of the user of the computer system is directed at the first portion of the respective media item. In some embodiments, an eye tracking device of the one or more input devices detects that the gaze of the user is directed at the first portion of the representation of the media item. In some embodiments, a head tracking device of the one or more input devices detects that the head of the user is directed at the first portion of the representation of the media item. In some embodiments, the attention of the user of the computer system corresponds to the location of the user interface element relative to the representation of the media item. For example, if the attention of the user of the computer system (e.g., gaze of the user of the computer system) is directed at a lower-right portion of the representation of the media item, the computer system optionally displays the user interface element at a location that corresponds to the lower-right portion of the representation of the media item. In some embodiments, when the attention of the user is directed at the first portion of the representation of the media item, the attention of the user is directed at an X, Y, and/or Z location that corresponds to the first portion of the representation of the media item. In some embodiments, when the attention of the user is directed to the first portion of the representation of the media item, the user interface element is displayed at an X, Y, and/or Z location that is offset (e.g., 1, 3, 5, 7, 10, 20, or 30 centimeters) from the X location of the first portion of the representation of the media item, offset (e.g., 1, 3, 5, 7, 10, 20, or 30 centimeters) from the Y location of the first portion of the representation of the media item, and/or offset (e.g., 1, 3, 5, 7, 10, 20, or 30 centimeters) from the Z location of the first portion of the representation of the media item. In some embodiments, the Z location of the user interface element is based on the distance that the first portion of the respective media is from the viewpoint of the user, as described in method 800. In some embodiments, the attention of the user defines the X location of the user interface element (e.g., horizontal location relative to the viewpoint of the user) but does not define the Y (e.g., vertical location relative to the viewpoint of the user) and/or Z (e.g., distance relative to the viewpoint of the user) locations of the user interface element, as will be described in more detail later. Thus, in some embodiments, the Y and/or Z locations of the user interface element are optionally fixed by the computer system (e.g., remain constant), but the X location of the user interface element changes based on where the user's attention is directed. In some embodiments, the user interface element is displayed with a pose/orientation that is normal to the user's viewpoint of the three-dimensional environment.

In some embodiments, while displaying the representation of the media item, the computer system detects (1002b), via the one or more input devices, that the attention of the user of the computer system has changed from being directed to the first portion of the representation of the media item to being directed to a second portion, different from the first portion, of the representation of the media item, such as the gaze 926 being directed to object 908 in FIG. 9C. For example, the computer system has detected that the gaze of the user has changed from being directed at a lower-right portion of the representation of the media item to being directed at an upper-left portion of the representation of the media item. In some embodiments, when the attention of the user (e.g., gaze of the user) changes from being directed to the first portion of the representation of the media item to being directed to the second portion of the representation of the media item, the X, Y, and/or Z position of the user's attention changes as compared to when the user's attention was directed at the first portion of the respective media item.

In some embodiments, after (e.g., in response to) detecting that the attention of the user of the computer system has changed from being directed to the first portion of the representation of the media item to being directed to the second portion of the representation of the media item, the computer system displays (1002c) the user interface element at a second location relative to the representation of the media item that corresponds to the second portion of the media item, such as the updated location(s) of element 912 in FIG. 9C. For example, if the attention of the user has changed from being directed at the lower-right portion of the representation of the media item to being directed at the upper-left portion of the representation of the media item, the user interface element is displayed at a location relative to the upper-left portion of the representation of the media item (and not at a location relative to the lower-right portion of the representation of the media item). Thus, in some embodiments, if the second portion of the representation of the media item is to the right of the first portion of the representation of the media item, the user interface element is optionally displayed at a location that is further to the right than when the user's attention was directed at the first portion of the representation of the media item. Similarly, in some embodiments, if the second portion of the representation of the media item is above the first portion of the representation of the media item, the user interface element is displayed at a location that is higher (e.g., in the Y-direction) than when the user's attention was directed to the first portion of the representation of the media item. Similarly, in some embodiments, if the second portion of the representation of the media item is further from a user's viewpoint (e.g., in the Z direction) than the first portion of the representation of the media item, the user interface element is displayed further from the user's viewpoint than when the user's attention was directed at the first portion of the representation of the media item. In some embodiments, when the attention of the user is directed at the second portion of the representation of the media item, the user interface element is displayed at an X, Y, and/or Z location that is offset (e.g., 1, 3, 5, 7, 10, 20, or 30 centimeters) from the X location of the second portion of the representation of the media item, offset (e.g., 1, 3, 5, 7, 10, 20, or 30 centimeters) from the Y location of the second portion of the representation of the media item, and/or offset (e.g., 1, 3, 5, 7, 10, 20, or 30 centimeters) from the Z location of the second portion of the representation of the media item. In some embodiments, when the location of the user interface element changes from the location corresponding to the first portion of the representation of the media item to the location corresponding to the second portion of the representation of the media item, the Y and/or Z locations of the user interface element do not change, but rather only the X location of the user interface element changes. In some embodiments, the updated X location of the user interface element is based on the X-location of where the attention of the user is directed. In some embodiments, the attention of the user designates an "active object" in the respective media item, and the computer system displays the user interface element based on a location of that "active object". Accordingly, in some embodiments, if the attention of the user becomes directed at different portions of the "active object," the computer system optionally does not update the location of the user interface element until the attention of the user becomes directed to a different object in the representation of the media item.

Changing the location of the user interface element as the user's attention becomes directed at different portions of the representation of the media item reduces the user's eye strain while interacting with the respective user interface element and the representation of the media item and makes it easier for a user to view the user interface element without missing occurrences in the representation of the media item, thereby enabling the user to use the computer system quickly and efficiently.

In some embodiments, detecting the attention of the user of the computer system includes (1004a), in accordance with a determination that a gaze (e.g., 926) of the user is directed to the first portion of the representation of the media item, determining (1004b) that the attention of the user is directed to the first portion of the representation of the media item. In some embodiments, the attention of the user is directed to the first portion of the representation of the media item when the gaze of the user has been directed to the first portion of the representation of the media item for more than a predetermined threshold amount of time (e.g., 1, 2, 3, 5, 10, 15, 30, or 60 seconds). In some embodiments, the attention of the user is not directed to the first portion of the representation of the media item if the gaze of the user has not been directed to the first portion of the representation of the media item for more than the above-described predetermined threshold amount of time. In some embodiments, the attention of the user is directed to the first portion of the representation of the media item when the user is looking at the first portion of the representation of the media item (e.g., in response to detecting the location of the user's gaze via an eye tracking device of the one or more input devices corresponds to the first portion of the representation of the media item). For example, if the first portion of the representation of the media item corresponds to the lower-right portion of the representation of the media item, the attention of the user is optionally directed to the lower-right portion of the representation of the media item when the gaze of the user is directed at the lower-right portion of the representation of the media item (e.g., for more than the above-described predetermined threshold amount of time).

In some embodiments, detecting the attention of the user of the computer system includes (1004a), in accordance with a determination that the gaze (e.g., 926) of the user is directed to the second portion of the representation of the media item, determining (1004c) that the attention of the user is directed to the second portion of the representation of the media item. In some embodiments, the attention of the user is directed to the second portion of the representation of the media item when the gaze of the user has been directed to the second portion of the representation of the media item for more than a predetermined threshold amount of time (e.g., 1, 2, 3, 5, 10, 15, 30, or 60). In some embodiments, the attention of the user is not directed to the second portion of the representation of the media item if the gaze of the user has not been directed to the second portion of the representation of the media item for more than the above described predetermined threshold amount of time. In some embodiments, the attention of the user is directed to the second portion of the representation of the media item when the user is looking at the second portion of the representation of the media item (e.g., in response to detecting the location of the user's gaze via an eye tracking device of the one or more input devices corresponds to the second portion of the representation of the media item). For example, if the second portion of the representation of the media item corresponds to the upper-left portion of the representation of the media item, the attention of the user is optionally directed to the upper-left portion of the representation of the media item when the gaze of the user is directed at the upper-left portion of the representation of the media item (e.g., for more than the above-described predetermined threshold amount of time).

Using gaze to determine the portion of the representation of the media item to which the attention of the user is directed is an efficient way of determining user attention.

In some embodiments, detecting the attention of the user of the computer system includes (1006a), in accordance with a determination that a (e.g., pre-defined) portion of the user is directed to the first portion of the representation of the media item, determining (1006b) that the attention of the user is directed to the first portion of the representation of the media item. In some embodiments, the attention of the user is determined to be directed to the first portion of the representation of the media item when a pre-defined portion (e.g., head, torso, etc.) of the user becomes oriented towards the first portion of the representation of the media item. In some embodiments, the attention of the user is not directed to the first portion of the representation of the media item when the pre-defined portion (e.g., head) of the user is not oriented towards the first portion of the representation of the media item. In some embodiments, the one or more input devices include a head tracking device, and the head tracking device detects the current orientation of the user's head. In some embodiments, the attention of the user is directed to the first portion of the representation of the media item when the head of the user has been oriented towards the first portion of the representation of the media item for more than a predetermined threshold amount of time (e.g., 1, 2, 3, 5, 10, 15, 30, or 60 seconds). For example, if the first portion of the representation of the media item corresponds to the lower-right portion of the representation of the media item, the attention of the user is optionally directed to the lower-right portion of the representation of the media item when the head of the user has been oriented towards the lower-right portion of the representation of the media item for more than the above-described predetermined threshold amount of time.

In some embodiments, detecting the attention of the user of the computer system includes (1006a), in accordance with a determination that the portion of the user is directed to the second portion of the representation of the media item, determining (1006c) that the attention of the user is directed to the second portion of the representation of the media item. In some embodiments, the attention of the user is determined to be directed to the second portion of the representation of the media item when a pre-defined portion (e.g., head) of the user becomes oriented towards the second portion of the representation of the media item. In some embodiments, the attention of the user is not directed to the second portion of the representation of the media item if the pre-defined portion (e.g., head) of the user is not oriented towards the second portion of the representation of the media item. In some embodiments, the attention of the user is directed to the second portion of the representation of the media item when the head of the user has been oriented towards the second portion of the representation of the media item for more than a predetermined threshold amount of time (e.g., 1, 2, 3, 5, 10, 15, 30, or 60 seconds). For example, if the second portion of the representation of the media item corresponds to the upper-left portion of the representation of the media item, the attention of the user is optionally directed to the upper-left portion of the representation of the media item when the head of the user has been oriented towards the upper-left portion of the representation of the media item for more than the above-described predetermined threshold amount of time.

Using a pre-defined portion (e.g., head) of the user to determine the portion of the representation of the media item to which the attention of the user is directed is an efficient way of determining user attention.

In some embodiments, in response to detecting that the attention of the user of the computer system has changed from being directed to the first portion of the representation of the media item to being directed to the second portion of the representation of the media item (1008a), in accordance with a determination that the attention of the user after changing to be directed to the second portion of the representation of the media item satisfies one or more criteria (e.g., in some embodiments, the one or more criteria are satisfied if the attention of the user has been directed to the second portion of the representation of the media item for at least a threshold amount of time (e.g., 0.5, 1, 3, 7, 10, 20, or 30 seconds) after the attention of the user changed to be directed to the second portion of the representation of the media item. In some embodiments, the one or more criteria are satisfied if the attention (e.g., gaze) of the user has moved less than a threshold amount (e.g., less than 1 cm, 2 cm, 5 cm, 10 cm, 50 cm, 100 cm, 300 cm, or 1000 cm) after the attention of the user changed to be directed to the second portion of the representation of the media item), the computer system displays (1008*b*) the user interface element at the second location relative to the representation of the media item that corresponds to the second portion of the representation of the media item, such as displaying element 912 at locations 912*c* or 912*d* in FIG. 9C. For example, the user interface element is displayed at the second location relative to the representation of the media item if the attention of the user has corresponded to the second portion of the representation of the media item for at least the threshold amount of time (e.g., 0.5, 1, 3, 7, 10, 20, or 30 seconds) and/or has moved less than a movement threshold (e.g., less than 1 cm, 2 cm, 5 cm, 10 cm, 50 cm, 100 cm, 300 cm, or 1000 cm of movement) after the attention of the user changed to be directed to the second portion of the representation of the media item. In some embodiments, the computer system has detected that the gaze of the user has changed from being directed to the lower-right portion of the representation of the media item to being directed to the upper-left portion of the representation of the media item and/or has detected that the head of the user has changed from being oriented towards the lower-right portion of the representation of the media item to being oriented towards the upper-left portion of the representation of the media item.

In some embodiments, in response to detecting that the attention of the user of the computer system has changed from being directed to the first portion of the representation of the media item to being directed to the second portion of the representation of the media item (1008*a*), in accordance with a determination that the attention of the user after changing to be directed to the second portion of the representation of the media item does not satisfy the one or more criteria (e.g., in some embodiments, the one or more criteria are not satisfied if after the attention of the user changed to be directed to the second portion of the representation of the media item, the attention (e.g., gaze) of the user moved by more than a threshold amount (e.g., moved more than 1 cm, 2 cm, 5 cm, 10 cm, 50 cm, 100 cm, 300 cm, or 1000 cm) and/or the attention of the user was not directed to the second portion of the representation of the media item for at least a threshold amount (e.g., 0.1, 1, 3, 7, 10, 20, or 30 seconds), the computer system delays (1008*c*) display of the user interface element at the second location relative to the representation of the media item that corresponds to the second portion of the representation of the media item until the attention of the user satisfies the one or more criteria, such as delaying until the one or more criteria are satisfied before displaying element 912 at locations 912*c* or 912*d* in FIG. 9C. For example, following the change in attention of the user from being directed to the first portion of the representation of the media item to being directed to the second portion of the representation of the media item, the computer system delays displaying the user interface element at the second location relative to the representation of the media item until the attention of the user is directed to the second portion of the representation of the media item for at least the above described threshold amount of time (e.g., at a time after the computer system determined that the one or more criteria were satisfied, the computer system determines that the one or more criteria have been satisfied, and as a result, displays the user interface element at the second location relative to the representation of the media item). In some embodiments, if the one or more criteria are not satisfied, the user interface element continues to be displayed at the first location relative to the representation of the media item. In some embodiments, when the attention of the user moves away from the first portion of the representation of the media item, the user interface element fades out and does not fade back in (e.g., at the second location relative to the representation of the media item) until the one or more criteria are satisfied. Displaying or delaying the display of the user interface element after the attention of the user changes causes the computer system to automatically display the user interface element when the attention of the user has settled down (e.g., stopped moving) and avoids abrupt changes in the location of the user interface element in response to attention changes, thereby making it easier for the user to view the user interface element.

In some embodiments, while displaying the user interface element (1010*a*), before displaying the user interface element at the second location relative to the representation of the media item and while the attention of the user is directed to the second portion of the representation of the media item, the computer system displays (1010*b*) the user interface element at a third location, different from the first location, relative to the representation of the media item, such as at a location between the location of element 912 in FIG. 9B and the location of element 912 in FIG. 9C. For example, if the attention of the user changed from being directed to the first portion of the representation of the media item to being directed to the second portion of the representation of the media item at a first speed, the computer system updates the location at which the user interface element is displayed in accordance with the change in the attention of the user but moves the user interface element at a second speed that is slower than the first speed. Thus, in some embodiments, the computer system intentionally delays/reduces movement of the user interface element such that the user interface element is not immediately displayed at the second location relative to the representation of the media item. For example, if the computer system is displaying the user interface element in the lower-right portion of the representation of the media item before the attention of the user changed to being directed to the second portion of the representation the media item, the computer system gradually moves the user interface element from the lower-right portion of the representation to the media item to a location corresponding to the second portion of the representation of the media item (e.g., the lower-left portion of the representation of the media item) over a period of time (e.g., 0.1, 0.3, 0.5, 1, 3, 5, 10 or 20 seconds). In some embodiments, the computer system displays the user interface element at the third location because the computer system is moving the user interface to the final location of the user interface element—the second location relative to the representation of the media item.

In some embodiments, while displaying the user interface element (1010*a*), after displaying the user interface element at the third location relative to the representation of the media item and while the attention of the user is directed to the second portion of the representation of the media item, the computer system displays (1010*c*) the user interface element at the second location relative to the representation of the media item, including gradually moving (e.g., over a respective period of time that is greater than zero such as 0.05, 0.1, 0.25, 0.5, 1, or 2 seconds) the user interface element toward the second location after the attention of the user started to be directed to the second portion of the representation of the media item, such as gradually moving element 912 from the locations 912*a* or 912*b* in FIG. 9B to the locations 912*c* or 912*d* in FIG. 9C. For example, after displaying the user interface at the third location relative to the representation of the media item, the computer system continues to move the user interface element towards the second portion of the representation of the media item at the second speed. Thus, when the attention of the user stops changing/moving (e.g., such that the one or more criteria described previously are satisfied), the user interface element "catches up" with the attention of the user.

Gradually moving the user interface element towards the second location relative to the representation of the media item avoids abrupt changes in the location of the user interface element in response to attention changes, thereby making it easier for the user to view the user interface element.

In some embodiments, the first location relative to the media item that corresponds to the first portion of the representation of the media item is offset from the first portion of the representation of the media item (1012*a*), such as locations 912*a* and/or 912*b* being offset from Actor A 906 in FIG. 9B. For example, when the attention of the user is directed to the first portion of the representation of the media item, the user interface element is displayed at an X location (e.g., horizontal location relative to the viewpoint of the user), Y direction (e.g., vertical location relative to the viewpoint of the user), and/or Z location (e.g., distance relative to the viewpoint of the user) that is offset (e.g., 1, 3, 5, 7, 10, 20, or 30 centimeters) from the X location of the first portion of the representation of the media item, offset (e.g., 1, 3, 5, 7, 10, 20, or 30 centimeters) from the Y location of the first portion of the representation of the media item, and/or offset (e.g., 1, 3, 5, 7, 10, 20, or 30 centimeters) from the Z location of the first portion of the representation of the media item, respectively. In some embodiments, the Z location of the user interface element is based on the distance that the first portion of the respective media is from the viewpoint of the user as described in method 800.

In some embodiments, the second location relative to the media item that corresponds to the second portion of the representation of the media item is offset from the second portion of the representation of the media item (1012*b*), such as locations 912*c* and/or 912*d* being offset from object 908 in FIG. 9C. For example, when the attention of the user is directed to the second portion of the representation of the media item, the user interface element is displayed at an X location (e.g., horizontal location relative to the viewpoint of the user), Y direction (e.g., vertical location relative to the viewpoint of the user), and/or Z location (e.g., distance relative to the viewpoint of the user) that is offset (e.g., 1, 3, 5, 7, 10, 20, or 30 centimeters) from the X location of the second portion of the representation of the media item, offset (e.g., 1, 3, 5, 7, 10, 20, or 30 centimeters) from the Y location of the second portion of the representation of the media item, and/or offset (e.g., 1, 3, 5, 7, 10, 20, or 30 centimeters) from the Z location of the second portion of the representation of the media item, respectively. In some embodiments, the x and/or y offset distances described above correspond to a portion of a peripheral vision of the user when the user's gaze is directed to the first/second portions.

Displaying the user interface element offset from the portion of the representation of the media item to which the user's attention is currently directed causes the computer system to automatically display the user interface element without obscuring the portion of the representation of the media item the user is currently watching.

In some embodiments, the user interface element includes a caption for the media item that is being played by the computer system (1014), such as shown in element 912 in FIGS. 9A-9E. In some embodiments, the respective user interface element includes video captions that visually show (e.g., in text) the words that are spoken (e.g., by one or more characters and/or a narrator) at a current playback position in the representation of the media item. In some embodiments, the caption included in the user interface element is similar to the caption described in methods 800 and/or 1200.

Displaying a caption at the user interface element causes the computer system to automatically present the media item in a manner that easily allows deaf or hard of hearing users or users who are watching without volume to watch/interact with the media item.

In some embodiments, in accordance with a determination that the representation of the media item is at a first playback position, the caption for the media item includes first content that corresponds to audio present at the first playback position (1016*a*), such as the content of element 912 in FIG. 9C. For example, the caption displayed in the user interface element includes one or more words spoken by the actors/characters at the first playback position, one or more words spoken by a narrator at the first playback position, and/or a text description of sound events at the first playback position.

In some embodiments, in accordance with a determination that the representation of the media item is at a second playback position, different from the first playback position, the caption for the media item includes second content, different from the first content, that corresponds to audio present at the second playback position, such as the content of element 912 in FIG. 9D. For example, as the playback position within the representation of the media item changes, the computer system updates the caption included in the user interface element. For example, while the representation of the media item is at the second playback position, the computer system optionally is no longer displaying a caption based on the spoken and/or non-spoken audio at the first playback position. Instead, the computer system is optionally displaying, in the user interface element, a caption corresponding to the one or more words spoken by the actors/characters at the second playback position, one or more words spoken by a narrator at the second playback position, and/or a text description of sound events at the second playback position. In some embodiments, the text color (e.g., font) of the captions do not change as the computer system plays the representation of the media item.

Changing the caption displayed in the user interface element as the playback position of the representation of the media item changes causes the computer system to automatically present relevant information about the media item.

In some embodiments, while displaying the user interface element that includes the caption for the media item and while the computer system is playing the representation of the media item, the computer system receives (1018*a*), via the one or more input devices, a first input corresponding to a request to cease displaying the user interface element, such as if device 101 were to receive an input in FIG. 9C to cease displaying element 912. In some embodiments, the first input is received while the computer system is presenting a playback controls user interface (e.g., similar to the playback controls user interface described in method 800). In some embodiments, the first input is directed to a first selectable option in the playback controls user interface that, when selected (e.g., with an air gesture), causes the computer system to toggle off (e.g., stop displaying) captions for the representation of media item (or toggle on if the captions for the representation of the media item are not currently being displayed).

In some embodiments, in response to receiving the first input, the computer system continues (1018*b*) playback of the representation of the media item without displaying the user interface element, such as if device 101 were to not display element 912 in FIG. 9D while having continued playing content 905. For example, after the computer system detected user input directed to toggling off the display of captions for the representation of the media item, the computer system no longer displays the user interface element during playback of the representation of the media item until the computer system detects a second input corresponding to a request to start displaying captions for the representation of the media item.

Ceasing display of the user interface element for at least a portion of the remainder of playback of the representation of the media item in response to user input provides an efficient way of managing display of information associated with the representation of the media item.

In some embodiments, (e.g., in accordance with a determination that) the representation of the media item corresponds to a sporting event, and the information associated with the media item includes a (e.g., current) score of the sporting event (1020), such as if element 912 were to include score information. For example, if the computer system is displaying a sports game, the user interface element includes information about the sports game that is being played by the computer system, such as the score of the sports game, the teams playing in the sports game, and/or the remaining time in the sports game.

Displaying information about a sporting event when the representation of the media item corresponds to a sporting event causes the computer system to automatically display relevant information to a user of the computer system.

In some embodiments, in accordance with a determination that the representation of the media item is at a first playback position, the user interface element includes first information corresponding to the first playback position (1022*a*), such as the content of element 912 in FIG. 9C. For example, while the computer system is presenting the representation of the media item at the first playback position, the user interface element includes information (e.g., names, biographies, facts, or the like) about the cast/characters that are in the first playback position (e.g., that are being displayed at the first playback position), about the music played at the first playback position, and/or bonus content (e.g., commentary from a director of the media item about the first playback position).

In some embodiments, in accordance with a determination that the representation of the media item is at a second playback position, different from the first playback position, the user interface element includes second information, different from the first information, corresponding to the second playback position (1022*b*), such as the content of element 912 in FIG. 9D. For example, as the playback position within the representation of the media item changes, the computer system updates the information included in the user interface element. For example, while the representation of the media item is at the second playback position, the computer system optionally is no longer displaying information based on the first playback position. Instead, the computer system is optionally displaying, in the user interface element, information (e.g., names, biographies, facts, or the like) about the cast/characters that are in the second playback position (e.g., that are being displayed at the second playback position), about the music played at the second playback position, and/or bonus content (e.g., commentary from the director of the media item about the second playback position).

Displaying information associated with a current playback position in the representation of the media item causes the computer system to automatically display relevant information to a user of the computer system.

In some embodiments, the user interface element is a playback controls user interface (e.g., similar to the playback controls user interface described in method 800), and the information associated with the media item includes one or more selectable options for modifying playback of the representation of the media item (1024), such as element 726 in FIG. 7C. For example, the location at which the computer system displays the playback controls user interface changes as the attention of the user changes in one or more ways as described above. In some embodiments, the one or more selectable options are similar to the one or more selectable options of the playback controls user interface described previously in method 800. In some embodiments, the one or more selectable options for modifying playback of the representation of the media item includes a selectable option that, when selected, causes the computer system to display the media item in a picture-in-picture presentation mode. In some embodiments, the one or more selectable options for modifying playback of the representation of the media item includes a selectable option that, when selected, causes the computer system to present a content playback queue. In some embodiments, the one or more selectable options for modifying playback of the representation of the media item includes a selectable option that, when selected, causes the computer system to rewind the representation of the media item by a predetermined amount (e.g., 5, 10, 15, 30, or 60 seconds). In some embodiments, the one or more selectable options for modifying playback of the representation of the media item includes a selectable option that, when selected, causes the computer system to pause/play the representation of the media item. In some embodiments, the one or more selectable options for modifying playback of the representation of the media item includes a selectable option that, when selected, causes the computer system to fast forward the representation of the media item ahead by a predetermined amount (e.g., 5, 10, 15, 30, or 60 seconds). In some embodiments, the one or more selectable options for modifying playback of the representation of the media item includes a selectable option that, when selected, causes the computer system to present captions/subtitle options associated with the representation of the media item. In some embodiments, a selectable option describe above is selected when the computer system receives an input that includes a gaze of the user directed to the selectable option while a predefined portion (e.g., hand) of the user performs a respective gesture. In some embodiments, the respective gesture is a pinch gesture in which the user touches the thumb of the hand to another finger of the hand. In some embodiments, the respective gesture is a tap gesture in which the user touches a finger of the hand to a location corresponding to a respective user interface element (e.g., the selectable option or an input user interface element other than the selectable option). In some embodiments, the selection input is an air gesture input.

Changing the location of the playback controls user interface as the user's attention changes enables the user interface element to remain in the field of view of the user without requiring additional user input.

In some embodiments, the first portion of the representation of the media item has a first position (e.g., first X-value) along a first axis (e.g., X-axis) and a second position (e.g., first Y-value) along a second axis (e.g., Y-axis) relative to the representation of the media item, and the first location of the user interface element is a third position (e.g., second X-value) along the first axis (e.g., X-axis) and a fourth position (e.g., second Y-value) along the second axis (e.g., Y-axis), the third position corresponding to the first position (1026a), such as with respect to position 912b for element 912 in FIG. 9B (e.g., and the fourth position is not based on and/or does not correspond to the second position). In some embodiments, the user interface element is displayed at an X-location (e.g., horizontal location relative to the viewpoint of the user) based on the X-location of the portion of the representation of the media item to which the attention of the user is directed and at a predetermined Y-location (e.g., vertical location relative to the viewpoint of the user). Thus, in some embodiments, the X-location of the user interface element is variable (based on the attention of the user) while the Y-location of the user interface element is pre-selected/pre-determined by the computer system (e.g., not based on the attention of the user). For example, if the first portion of the representation of the media item is displayed at an X-location that causes the first portion to be located in the right portion of the representation of the media item and at a Y-location that causes the first portion to be located in the center of the representation of the media item (e.g., the first portion is in a right-center portion of the representation of the media item), the user interface element is optionally displayed at an X-location that is in the right portion of the representation of the media item (e.g., because the first portion is located in the right portion of the representation of the media item) and at a Y-location that is directly above or below the first portion of the representation of the media item based on the pre-determined/pre-selected Y-location. In some embodiments, the Y-location of the user interface element is variable (based on the attention of the user) while the X-location of the user interface element is pre-selected/pre-determined (e.g., not based on the attention of the user). For example, if the first portion of the representation of the media item is displayed at an X-location that causes the first portion to be located in the right portion of the representation of the media item and at a Y-location that causes the first portion to be located in the center of the representation of the media item (e.g., the first portion is in a right-center portion of the representation of the media item), the user interface element is optionally displayed at a Y-location that is in the center portion of the representation of the media item (e.g., because the first portion is located in the center portion of the representation of the media item) and at a X-location that is directly to the right or left of the first portion of the representation of the media item based on the pre-determined/pre-selected X-location.

In some embodiments, the second portion of the representation of the media item has a fifth position, different from the first position, along the first axis and a sixth position, different from the second position, along the second axis, and the second location of the user interface element is a seventh position along the first axis and the fourth position along the second axis, the seventh position corresponding to the fifth position (1026b), such as with respect to position 912d for element 912 in FIG. 9D (e.g., and the fourth position is not based on and/or does not correspond to the sixth position). For example, when the attention of the user changes to be directed to the second portion of the representation of the media item (which is at a different X and/or Y location than the first portion of the representation of the media item), the computer system displays the user interface element at an X-location that is based on the X-location of the second portion of the representation of the media item and at a predetermined Y-location (e.g., the same Y-location as described above). For example, if second portion of the representation of the media item is at an X-location that causes the second portion of the representation of the media item to be located in a center portion of the representation of the media item (e.g., left of the first portion of the representation of the media item) and at a Y-location that causes the second portion of the representation of the media item to be located in an upper portion of the representation of the media item (e.g., the second portion of the representation of the media item is located in an upper-center portion of the representation of the media item), the computer system displays the user interface element at an X-location that is in the center portion of the representation of the media item (e.g., because the second portion is located in the center portion of the representation of the media item) and at a Y-location that is above or below the second portion of the representation of the media item based on the previously pre-determined/pre-selected Y-location (e.g., at the same Y-location as compared to when the user interface element was displayed at the first location relative to the representation of the media item).

Displaying the user interface element at a variable location on a first axis and a fixed location on a second axis based on the position of representation of the media item to which the attention of the user is directed causes the computer system to display the user interface element at predictable locations.

In some embodiments, the representation of the media item satisfies one or more criteria, including a criterion that is satisfied when the representation of the media item corresponds to an immersive presentation of the media item, such as presentation of content 905 in FIGS. 9B-9E (e.g., in some embodiments, when the representation of the media item corresponds to the immersive presentation mode, the representation of the media item spans 90, 120, 180, 270, or 360 degrees of space around a viewpoint of the user. In some embodiments, when the representation of the media item corresponds to the immersive presentation mode, the representation of the media item has a length, width, and/or depth within which content of the media item is displayed. In some embodiments, during the immersive presentation of the media item, portions of the representation of the media item are optionally displayed closer to or further from the viewpoint of the user, as compared to the non-immersive presentation mode (described below).), and not satisfied when the representation of the media item corresponds to a non-immersive presentation of the media item, such as presentation of content 905 in FIG. 9A (e.g., in some embodiments, when the representation of the media item corresponds to a non-immersive presentation mode, the representation of the media item occupies less than a threshold amount of the field of view of the user (e.g., less than 75%, 60%, 50%, 40%, 30%, 20%, 10%, or 5% of the user's field of view).), and displaying the user interface element at the first location relative to the representation of the media item that corresponds to the first portion of the representation of the media item is in accordance with a determination that the representation of the media item satisfies the one or more criteria (1028*a*), such as displaying element 912 at positions 912*a* or 912*b* in FIG. 9B. For example, when the representation of the media item is being presented in an immersive presentation, the user interface element is displayed at a location based on the attention of the user as described previously. In some embodiments, while the attention of the user is directed to the first portion of the representation of the media item and before the attention of the user changed to second portion of the representation of the media item, the second portion of the representation of the media item was not in the field of view from the viewpoint of the user (e.g., was not being presented via the display generation component).

In some embodiments, while displaying, via the display generation component, a second representation of a second media item (e.g., the same as the media item, just in a non-immersive presentation mode, or different from the media item and in the non-immersive presentation mode), wherein the second representation of the second media item does not satisfy the one or more criteria, the computer system displays (1028*b*) a second user interface element at a predefined location relative to the second representation of the second media item, wherein the predefined location is not based on the attention of the user, such as the location of element 912 in FIG. 9A. For example, while the second media item is being presented in the non-immersive presentation mode, the user interface element is displayed in the bottom-center portion of the second representation of the second media item irrespective of which portion of the second representation the attention of the user is directed. In some embodiments, the second representation of the second media item transitions from corresponding to the non-immersive presentation of the second media item to corresponding to the immersive presentation of the second media item in response to detecting a selection of a selection option in the playback controls user interface (as previously described in method 800).

Displaying the user interface based the attention of the user during the immersive presentation mode and at a predefined location during the non-immersive presentation mode causes the computer system to automatically display the user interface element at an appropriate location while viewing content in different modes of presentation.

In some embodiments, the first location and the second location relative to the representation of the media item are within a boundary of the representation of the media item (1030*a*), such as shown in FIG. 9D (e.g., the user interface element is not displayed outside of the X, Y, and/or Z boundaries of the representation of the media item and/or the user interface element is overlaid on at least a portion of the representation of the media item.).

In some embodiments, while displaying the user interface element at the second location relative to the representation of the media item, the computer system detects (1030*b*), via the one or more input devices, that the attention of the user changed from being directed to the second portion of the representation of the media item to being directed outside of the boundary of the representation of the media item, such as shown with gaze 926 in FIG. 9E. For example, the computer system has detected that the attention (e.g., gaze) of the user is no longer directed to any portion of the representation of the media item, but rather directed to a region of the displayed content outside of the representation of the media item.

In some embodiments, after (e.g., in response to) detecting that the attention of the user changed from being directed to the second portion of the representation of the media item to being directed outside of the boundary of the representation of the media item, the computer system displays (1030*c*) the user interface element at a third location relative to the representation of the media item that is within the boundary of the representation of the media item, such as shown with element 912 in FIG. 9E remaining within the boundary of content 905. In some embodiments, the third location relative to the representation of the media item is the portion of the representation of the media item that is closest to where the attention of the user is currently directed outside of the representation of the media item. For example, if the attention of the user is currently directed outside a top-right boundary of the representation of the media item, the user interface element is optionally displayed at a location relative to the representation of the media item that is near the top-right boundary of the representation of the media item. Thus, in some embodiments, the user interface element cannot be displayed at a location that is outside of an X, Y, and or Z boundary defined by the representation of the media item. In some embodiments, the user interface element is optionally displayed at a location outside of the boundary of the representation of the media item when the computer system receives an explicit request from a user to move the user interface element outside the boundary of the representation of the media item (e.g., a user selects the user interface element and moves the user interface element outside of the boundary of the representation of the media item via a pinch and drag gesture), but not in response to attention of the user being directed outside of the representation of the media item.

Displaying the user interface element within the boundary of the representation of the media item even when the attention of the user moves away from the representation of the media item provides an efficient way of forgoing display of the user interface element based on the attention of the user when a user has stopped watching the representation of the media item or has started interacting with other content.

It should be understood that the particular order in which the operations in method 1000 have been described is merely exemplary and is not intended to indicate that the described order is the only order in which the operations could be performed. One of ordinary skill in the art would recognize various ways to reorder the operations described herein.

FIGS. 11A-11C illustrate examples of how an electronic device displays video captions with different visual appearances in accordance with some embodiments of the disclosure.

FIG. 11A illustrates a three-dimensional environment 1130 that is visible via a display generation component 120 of the electronic device 101 and an overhead view 1114 of the three-dimensional environment 1130. As described above with reference to FIGS. 1-6, the electronic device 101 optionally includes a display generation component 120 (e.g., a touch screen) and a plurality of image sensors (e.g., image sensors 314 of FIG. 3). The image sensors optionally include one or more of a visible light camera, an infrared camera, a depth sensor, or any other sensor that the electronic device 101 would be able to use to capture one or more images of a user or a part of the user while the user interacts with the electronic device 101. In some embodiments, the user interfaces shown and described below could also be implemented on a head-mounted display that includes a display generation component that displays the user interface to the user and sensors to detect the physical environment, movements of the user's hands (e.g., external sensors facing outwards from the user), and/or gaze of the user (e.g., internal sensors facing inwards towards the face of the user).

In some embodiments, the three-dimensional environment 1130 includes one or more representations of physical objects in the physical environment 1132 of the electronic device 101 and/or one or more virtual objects (e.g., objects that are not located in the physical environment 1132 but are generated and displayed by the electronic device 101). In the example of FIG. 11A, the three-dimensional environment 1130 includes a representation 1110 of a table in the physical environment 1132 of the electronic device 101. The representation 1110 of the table is optionally a photorealistic, simplified, or cartoon representation of the table in the physical environment of the electronic device 101 and is displayed in the three-dimensional environment 1130 in response to the electronic device 101 capturing one or more images of the table in the physical environment 1132. Alternatively, the representation 1110 of the table may be visible via a transparent or translucent display of the electronic device 101 (e.g., the representation 1110 of the table is not displayed in the three-dimensional environment 1130).

Additionally, as shown in FIG. 11A, the three-dimensional environment 1130 includes a media user interface object 1104 that is currently presenting a representation of a media item 1105 at a first playback position 1120 (e.g., having one or more of the characteristics of media user interface objects 704 and/or 904). As indicated in the overhead view 1114 in FIG. 11A, at the first playback position 1120, the representation of the media item 1105 includes an Actor A 1106 at a first location and a first depth in the representation of the media item 1105 and an Actor B 1108 at a second location (e.g., different than the first location) and a second depth (e.g., different from the first depth) in the representation of the media item 1105.

In some embodiments, the electronic device 101 displays a caption for the representation of the media item 1105, such as the video captions user interface element 1112 illustrated in FIG. 11A (e.g., the same as or similar to the video captions user interface element 712 described in FIGS. 7A-7E). In some embodiments, the electronic device 101 started displaying the video captions user interface element 1112 in FIG. 11A in response to the electronic device 101 detecting/determining that spoken and/or non-spoken audio is present at the first playback position 1120. For example, in FIG. 11A, the electronic device 101 started displaying the video captions user interface element 1112 in response to the electronic device 101 determining that Actor A 1106 is speaking at the first playback position 1120 (e.g., the speech audio of the representation of the media item 1105 corresponds to Actor A 1106 at the first playback position 1120).

As shown in FIG. 11A, the video captions user interface element 1112 includes text 1131 that corresponds to the spoken and/or non-spoken audio at the first playback position 1120 (e.g., corresponds to words spoken by Actor A 1106 at the first playback position 1120) and a backplane element 1133 that is displayed behind the text 1131. In some embodiments, the electronic device 101 does not display the video captions user interface element 1112 when audio (e.g., speech) is not present at the first playback position 1120 in the representation of the media item 1105.

As also shown in FIG. 11A, the electronic device 101 has detected that the attention of the user 1116 is currently directed to Actor A 1106. In some embodiments, the electronic device 101 detected that the attention of the user 1116 is directed to Actor A 1106 in response to detecting, via the one or more image sensors 314, that the gaze 1134 of the user 1116 was directed to Actor A 1106 and/or in response to detecting, via the one or more image sensors 314, that a head of the user 1116 was oriented towards Actor A 1106.

In some embodiments, the electronic device 101 displays the video captions user interface element 1112 at an X location (e.g., horizontal location relative to the viewpoint of the user 1116), Y location (e.g., vertical location relative to the viewpoint of the user 1116), and/or Z location (e.g., distance relative to the viewpoint of the user 1116) that corresponds to the X, Y, and/or Z location of the portion of the representation of the media item 1105 to which the attention of the user 1116 is directed, such as described in more detail with reference to methods 800 and/or 1000. For example, in FIG. 11A, the electronic device 101 is displaying the video captions user interface element 1112 at the X, Y, and Z location indicated in FIG. 11A in response to the electronic device 101 detecting that the attention of the user 1116 is directed to Actor A 1106 because the X, Y, and Z location of video captions user interface element 1112 in FIG. 11A corresponds to the Actor A 1106 (e.g., the video captions user interface element 1112 has an X position that is offset from (to the right of) Actor A 1106, a Y position that is offset (below) Actor A 1106, and a Z position that is 0.0, 0.1, 0.2, 0.3, 0.7, 1, or 2 millimeters or 0.5, 1, 3, 5, 10, 30 or 50 cm in front of Actor A 1106).

It should be noted that while the above example illustrates a scenario where the video captions user interface element 1112 is displayed below and to the right of (e.g., offset from) Actor A 1106 in response to the electronic device 101 detecting that the attention (e.g., gaze 1134) of the user 1116 is directed to Actor A 1106, it should be understood by one of ordinary skill in the art that the electronic device 101 could also display the video captions user interface element 1112 offset in any direction from Actor A 1106 or overlaid on Actor A 1106 in response to the electronic device 101 detecting that the attention of the user 1116 is directed to Actor A 1106. The electronic device 101 may also be displaying the video captions user interface element 1112 at the location indicated in FIG. 11A for one or more reasons described in FIGS. 7A-9E and/or methods 800 and/or 1000. It should be understood that the electronic device 101 optionally displays the video captions user interface element 1112 at the locations illustrated in FIGS. 11B and 11C for similar reasons described above (e.g., because attention of the user is directed to a portion of the content and/or because that portion of the content has a certain depth).

In some embodiments, the transparency of the backplane element 1133 is determined based on the luminance of the media item 1105 (and/or based on the portion of the representation of the media item 1105 over which the electronic device 101 is displaying the video captions user interface element 1112), as described in detail in method 1200. For example, in FIG. 11A, the electronic device 101 is displaying the backplane element 1133 with no transparency (e.g., completely opaque) because the electronic device 101 has determined that the video captions user interface element 1112 is being overlaid on a very bright portion of the representation of the media item 1105 (e.g., the bottom portion of the representation of the media item 1105 which corresponds to a maximum amount of brightness). In some embodiments, displaying a black backplane element 1133 with a low amount of transparency or with no transparency while the video captions user interface element 1112 is being overlaid on a light color (e.g., bright) portion of the representation of the media item 1105 is desirable because this causes the electronic device 101 to display the video captions user interface element 1112 with enough contrast such that the text 1131 remains readable to the user 1116 of the electronic device 101 with a minimal or reduced amount of eye strain (e.g., the video captions user interface element 1112 in FIG. 11A and the bottom portion of the representation of the media item 1105 have a contrast ratio of at least 100:1, 200:1, 500:1, or 700:1).

In some embodiments, the electronic device 101 displays the text 1131 included in the video captions user interface element 1112 with a font color that reduces the visual contrast between the text 1131 and the portion of the representation of the media item 1105 on which the video captions user interface element 1112 is being overlaid (or more generally the representation of the media item 1105). For example, in FIG. 11A, the electronic device 101 is displaying the text 1131 with a white font color because the electronic device 101 determined that the white text color complements the white hue of the bottom-center portion of the representation of the media item 1105—the portion of the representation of the media item 1105 on which the video captions user interface element 1112 is overlaid—(e.g., the white font color causes the text 1131 and the bottom-center portion of the representation of the media item 1105 to have a contrast ratio less than 100:1, 200:1, 500:1, or 700:1) and/or because the white font color still allows the user 1116 of the electronic device 101 to be able to read the text 1131 with a minimal or reduced amount of eye strain (e.g., the white font color causes the backplane element 1133 and the text 1131 to have a contrast ratio of at least 100:1, 200:1, 500:1, or 700:1).

In FIG. 11B, the electronic device 101 is no longer presenting the representation of the media item 1105 at the first playback position 1120 and is now presenting the representation of the media item 1105 at a second playback position 1124. As shown in FIG. 11B, at the second playback position 1124, the electronic device 101 is now displaying the video captions user interface element 1112 at a larger size and with more text than in FIG. 11A. In some embodiments, the electronic device 101 started displaying the video captions user interface element 1112 at a larger size and with more text as compared to FIG. 11A because the amount of spoken and/or non-spoken audio at the second playback position 1124 is higher than at the first playback position 1120. For example, at the second playback position 1124, Actor B 1108 is optionally speaking more words compared to Actor A 1106 at the first playback position 1120, thus requiring more text 1131 to represent the words spoken by Actor B than in FIG. 11A and a larger size of the video captions user interface element 1112 to display the increased amount of text 1131. In some embodiments, before the electronic device 101 resized the video captions user interface element 1112 to the size indicated in FIG. 11B, the electronic device 101 ceased display of the text 1131 that was being presented in the video captions user interface element 1112 at the first playback position 1120.

Additionally, as shown in FIG. 11B, the electronic device 101 is now displaying the backplane element 1133 with a higher amount of transparency as compared to FIG. 11A. In some embodiments, the electronic device 101 started displaying the backplane element 1133 with the higher amount of transparency because the electronic device 101 determined that the brightness and/or hue (e.g., color) of the representation of the media item 1105 between the first playback position 1120 and the second playback position 1124 darkened by an amount such that the video captions user interface element 1112 can now obscure less of the bottom-center portion of the representation of the media item 1105 (e.g., the portion of the representation of the media item 1105 that the video captions user interface element 1112 is overlaying) while also still displaying the video captions user interface element 1112 with sufficient visual contrast to allow the user 1116 of the electronic device 101 to read the text 1131 with a minimal or reduced amount of eye strain (e.g., even with the increase in the transparency of the backplane element 1133 in FIG. 11B, the video captions user interface element 1112 in FIG. 11B and the bottom-portion of the representation of the media item 1105 still have a contrast ratio of at least 100:1, 200:1, 500:1, or 700:1).

Additionally, as shown in FIG. 11B, the electronic device 101 has updated the font color of the text 1131 in the video captions user interface element 1112. In some embodiments, the electronic device 101 updated the font color of the text 1131 from the white font color (as illustrated in FIG. 11A) to the dark gray font color (as illustrated in FIG. 11B) because the electronic device 101 determined that the gray front color would have less visual contrast with the gray background of the representation of the media item 1105 at the second playback position 1124 than the white font color (illustrated in FIG. 11A) and/or because the gray front color would still allow the user 1116 to read the text 1131 with a minimal or reduced amount of eye strain (e.g., even with the gray font color, the backplane element 1133 and the text 1131 have a contrast ratio of at least 100:1, 200:1, 500:1, or 700:1).

In FIG. 11C, the electronic device 101 is now presenting the representation of the media item 1105 at a third playback position 1126, and the brightness and/or hue (e.g., color) of the bottom-center portion of the representation of the media item 1105 has further darkened from FIG. 11B. In some embodiments, the electronic device 101 does not present the backplane element 1133 (illustrated in FIG. 11B) when the electronic device 101 is displaying the video captions user interface element 1112 overlaid on a portion of the representation of the media item 1105 that has less than a threshold amount of brightness (e.g., a brightness level less than 0%, 1%, 2%, 3%, or 5%). For example, as shown in FIG. 11C, the electronic device 101 is no longer displaying the backplane element 1133—even though the electronic device 101 continues to display the text of the user interface element 1112—while the electronic device 101 is displaying the representation of the media item 1105 at the third playback position 1126 because the video captions user interface element 1112 is being overlaid on the bottom-center portion of the representation of the media item 1105, which has an amount of brightness less than the above-described threshold amount of brightness. In some embodiments, the font color of text 1131 changed between FIGS. 11B and 11C for similar reasons previously described above.

FIGS. 12A-12F is a flowchart illustrating a method 1200 of displaying video captions with different visual appearances in accordance with some embodiments. In some embodiments, the method 1200 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1200 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1200 are, optionally, combined and/or the order of some operations is, optionally, changed.

In some embodiments, method 1200 is performed at a computer system (e.g., electronic device 101) in communication with a display generation component (e.g., 120), one or more input devices (e.g., 314). In some embodiments, the computer system is the same as or similar to the computer system described above with reference to method(s) 800 and/or 1000. In some embodiments, the one or more input devices are the same as or similar to the one or more input devices described above with reference to method(s) 800 and/or 1000. In some embodiments, the display generation component is the same as or similar to the display generation component described above with reference to method(s) 800 and/or 1000.

In some embodiments, while displaying, via the one or more display generation components, a representation of a media item at a first playback position, such as content 1105 in FIG. 11A (e.g., in some embodiments, the representation of the media item is the same as or similar to the representation of the media item described in methods 800 and/or 1000), the computer system displays (1202a) a user interface element (e.g., 1112) (e.g., such as the user interface element described in methods 800 and/or 1000) that includes information associated with the representation of the media item, such as text 1131. In some embodiments, the user interface element includes video captions that visually show (e.g., in text) the words that are spoken (e.g., by one or more actors/characters) at the first playback position in the representation of the media item. In some embodiments, the user interface is not displayed via the display generation component if no speech audio is present in the respective media item (e.g., no actors in the respective media item are speaking) at the first playback position in the respective media item. In some embodiments, the respective user interface element includes two components: a backplane/platter and text (e.g., video captions) that is displayed on or in front of the backplane/platter.

In some embodiments, the user interface element is displayed over a first portion of the representation of the media item (1202b), such as shown with respect to the position of element 1112 in FIG. 11A. In some embodiments, the user interface element has a first visual appearance (e.g., as described in more detail later) that is based on one or more visual characteristics (e.g., brightness, transparency, opacity, luminance, and/or average hue or dominant hue) of the first portion of the representation of the media item (1202c), such as shown and described with respect to text 1131 and/or backplane element 1133 in FIG. 11A. In some embodiments, the first visual appearance corresponds to the visual appearance of the video caption text displayed in the user interface element, corresponds to the visual appearance of the backplane/platter of the user interface element, and/or corresponds to the opacity or transparency of the user interface element, as will be described in more detail below. In some embodiments, the user interface element is displayed with the first visual appearance because the first visual appearance reduces or minimizes the contrast between the first content and the backplane/platter of the user interface element. In some embodiments, the user interface element is displayed with the first visual appearance because the first visual appearance causes the user interface element to be displayed with enough contrast (e.g., a contrast ration of at least 100:1, 200:1, 500:1, or 700:1) between the user interface element and the first portion of the representation of the media item and/or a color corresponding to the color of the content such that the text included in the user interface element complements the content color of the first portion of the representation of the media item (as will be described in more detail below) while remaining readable by a user with a minimal or reduced amount of eye strain.

In some embodiments, after displaying, via the one or more display generation components, the representation of the media item at the first playback position with the user interface element displayed over the first portion of the representation of the media item (1202d), the computer system displays (1202e), via the one or more display generation components, the representation of the media item at a second playback position, different from the first playback position, such as playback position 1124 in FIG. 11B. In some embodiments, the playback position of the respective media changed from the first playback position to the second playback position because the respective media item is currently playing at the computer system.

In some embodiments, while displaying the representation of the media item at the second playback position, the computer system displays (1202f), via the one or more display generation components, the user interface element over a second portion of the representation of the media item at the second playback position, wherein the user interface element is displayed with a second visual appearance, different from the first visual appearance, wherein the second visual appearance is based on one or more visual characteristics (e.g., brightness, transparency, opacity, luminance, and/or average hue or dominant hue) of the second portion of the representation of the media item at the second playback position, such as the visual appearance of text 1131 and/or backplane element 1133 changing in FIG. 11B as compared to FIG. 11A. For example, as the computer system displays the representation of the media item at different playback positions, the visual appearance of the respective user interface element changes based on the visual characteristics of the content being currently displayed at the media user interface object. In some embodiments, as will be described in greater detail below, if the second content is darker than the first content, the backplane/platter of the respective user interface element is optionally more transparent than when the backplane/platter of the respective user interface element is displayed with the first visual appearance. In some embodiments, as will be described in greater detail below, if the second content is darker than the first content, the color of the text in the respective user interface element is optionally darker than the color of the text when the respective user interface element is being displayed with the first visual appearance. Conversely, in some embodiments, if the second content is brighter than the first content, the color of the text in the respective user interface element is optionally brighter than the color of the text when the respective user interface element is being displayed with the first visual appearance. In some embodiments, if the second content is brighter than the first content, the backplane/platter of the respective user interface element is optionally less transparent as compared to when the backplane/platter of the respective user interface element is displayed with the first visual appearance. In some embodiments, the respective user interface element increases or decreases in size as the media user interface object transitions from displaying the first content to displaying the second content, as will be described in more detail below. In some embodiments, the respective user interface element is displayed at a location that is closer to the user's viewpoint than the second content such that the respective user interface element appears to be at least partially overlaid on the second content from the viewpoint of the user. Modifying the visual appearance of the user interface element as the playback position within the representation of the media item changes provides an efficient way for reducing the visual contrast between the user interface element and the representation of the media item, and for reducing the possibility that the user interface element becomes visually distracting to the user of the computer system while watching the representation of the media item, thereby enabling the user to use the computer system quickly and efficiently.

In some embodiments, displaying the user interface element with the first visual appearance includes displaying the user interface element with a first amount of opacity, and displaying the user interface element with the second visual appearance includes displaying the user interface element with a second amount of opacity, different from the first amount of opacity (1204), such as displaying backplane element 1133 with different levels of opacity. In some embodiments, the opacity of the user interface element is determined based on the visual characteristics (e.g., brightness, transparency, opacity, luminance, and/or average hue or dominant hue) of the portion of the representation of the media item on which the user interface is overlaid. For example, the user interface element is optionally more opaque while the computer system displays the user interface element overlaid on the second portion in the representation of the media item at the second playback position than when the computer system displays the user interface overlaid on the first portion in the representation of the media item at the first playback position because the second portion of the representation of the media item at the second playback position is brighter than the first portion of the representation of the media item at the first playback position. Conversely, the user interface element is optionally less opaque while the computer system displays the user interface element overlaid on the second portion in the representation of the media item at the second playback position than when the computer system displays the user interface overlaid on the first portion in the representation of the media item at the first playback position because the second portion of the representation of the media item at the second playback position is darker than the first portion of the representation of the media item at the first playback position. In some embodiments, the first portion and the second portion correspond to the same portion of the representation of the media item (e.g., the same actor/character) or correspond to different portions of the representation of the media item (e.g., different actors/characters). In some embodiments, the opacity of the back plane element (referenced below) changes as the computer system displays the user interface element with different visual appearances. In some embodiments, the opacity of the text (referenced below) included in the user interface element changes as the computer system displays the user interface element with different visual appearances. In some embodiments, both the opacity of the back plane element and the text included in the user interface element changes as the computer system displays the user interface element with different visual appearances. Modifying the opacity of the user interface element based on visual characteristics of the portion of the representation of the media item on which the user interface element is overlaid causes the computer system to automatically present the user interface element with the appropriate visual appearance during playback of the representation of the media item, thereby reducing the user's eye strain while interacting with the user interface element or the media item.

In some embodiments, the user interface element includes a back plane element (e.g., 1133) behind a text portion (e.g., 1131) of the user interface element, the text portion of the user interface element corresponding to a current caption for the media item (1206a), such as text 1131 in FIG. 11A corresponding to a current caption for content 1105. For example, the user interface element includes a caption that indicates (e.g., in text) the spoken and/or non-spoken audio present at a current playback position in the representation of the media item. In some embodiments, the caption of the user interface element is displayed on, in front of, or overlaying the back plane element of the user interface element. In some embodiments, the back plane provides contrast between the representation of the media item and the caption such that the caption is readable to a user of the computer system with a minimal or reduced amount of eyestrain during playback of the representation of the media item.

In some embodiments, displaying the user interface element with the first visual appearance includes displaying the back plane element (e.g., 1133) with a first amount of transparency based on a luminance (e.g., apparent brightness to the user of the computer system) of the first portion of the representation of the media item at the first playback position (1206b), such as shown with respect to backplane element 1133 in FIG. 11A. For example, the transparency of the back plane element is a function of how bright or dark the portion of the representation of the media item on which the user interface element is overlaid. Thus, in some embodiments, as the first portion of the representation increases in brightness, the back plane element is displayed with less transparency. Conversely, in some embodiments, as the first portion of the representation decreases in brightness, the back plane element is displayed with more transparency. In some embodiments, the color of the back plane element is black. In some embodiments, the transparency of the back plane element is determined based on the average luminance of some or all (or a majority of) the content (e.g., portions) displayed in the representation of the media item at a respective playback position. In some embodiments, the transparency of the back plane element is determined based on the luminance of the portion of the representation on which the user interface element is overlaid and not based on the luminance of other portions of the representation on which the user interface element is not overlaid. In some embodiments, the transparency of the back plane element is determined based on the luminance of the portion of the representation on which the user interface element is overlaid and one or more portions that are (e.g., immediately) adjacent to the portion of the representation of the media item on which the user interface element is overlaid but not one or more portions outside of those adjacent portions.

In some embodiments, displaying the user interface element with the second visual appearance includes displaying the back plane element with a second amount of transparency, different from the first amount of transparency, based on a luminance (e.g., apparent brightness to the user of the computer system) of the second portion of the representation of the media item at the second playback position (1206c), such as shown with respect to backplane element 1133 in FIG. 11B. For example, the transparency of the back plane element changes as the portion of the representation on which the user interface element is overlaid increases or decreases in brightness (e.g., due to a change in the playback position of the representation of the media item). For example, if the second portion of the representation of the media item at the second playback position is darker than the first portion of the representation of the media item, the computer system optionally displays the back plane element with more transparency during the second playback position as compared to during the first playback position. Conversely, if the second portion of the representation of the media item at the second playback position is brighter than the first portion of the representation of the media item, the computer system optionally displays the back plane element with less transparency during the second playback position as compared to during the first playback position. Displaying the user interface element with more transparency increases the visibility of the representation of the media item, and displaying the user interface element with less transparency improves the legibility of the text displayed in the user interface element, thus automatically reducing unnecessary user input such as repeatedly turning on/off the user interface element during playback of the media item.

In some embodiments, the user interface element includes text corresponding to a current caption for the media item (1208a), such as text 1131 in FIG. 11A corresponding to a current caption for content 1105. For example, the user interface element indicates (e.g., in text) the spoken and/or non-spoken audio present at a current playback position in the representation of the media item. In some embodiments, the spoken and/or non-spoken audio includes one or more words spoken by actors/characters at a respective playback position in the representation of the media item, one or more words spoken by a narrator at a respective playback position in the representation of the media item, and/or a text description of sound events at a respective playback position in the representation of the media item.

In some embodiments, displaying the user interface element with the first visual appearance includes displaying the text with a first color based on a hue of the first portion of the representation of the media item at the first playback position (1208b), such as shown with respect to text 1131 in FIG. 11A. For example, the font color of the text (e.g., caption) included in the user interface element is determined based on the hue/color of the first portion of the representation of the media item. In some embodiments, the font color for text included in the user interface element is determined based on one or more portions of the representation of the media item in addition or as an alternative to the first portion of the representation of the media item. For example, the dominant hue/color (e.g., the color of the content that corresponds to the focal point in the representation of the media item) or the average hue/color of one or more portions of the representation of the media item in addition or as an alternative to the first portion of the representation of the media item. In some embodiments, if the first portion of the representation of the media item is light gray, the computer system optionally selects a text color that complements the light gray content color of the first portion of the representation of the media item and that provides sufficient contrast (e.g., a threshold amount of contrast such as having a contrast ratio of at least 100:1, 200:1, 500:1, 700:1, 1,000:1, or 4,000:1) with the black back plane element such that the user can easily read the caption with a minimal or reduced amount of eye strain, such as a dark gray text color (e.g., because the dark gray text color is complementary to the light gray content while providing enough contrast between the black back plane element such that a user can easily read the caption when presented in such a text color). In some embodiments, if the first portion of the representation of the media item is black, the computer system optionally selects a text color that complements the black content color and that provides sufficient contrast with the black back plane element (e.g., a threshold amount of contrast such as having a contrast ratio of at least 100:1, 200:1, 500:1, 700:1, 1,000:1, or 4,000:1) such that the user can easily read the caption, such as a white text color (e.g., because other text colors such as blue, gray, or purple would not provide enough contrast between the black back plane to allow the user to easily read the caption with a minimal amount of eye strain).

In some embodiments, displaying the user interface element with the second visual appearance includes displaying the text with a second color, different from the first color, based on a hue of the second portion of the representation of the media item at the second playback position (1208c), such as shown with respect to text 1131 in FIG. 11B. In some embodiments, the color of the text (e.g., caption) at the second playback position in the representation is selected in similar ways as previously described above with respect to when the text is displayed at the first playback position. In some embodiments, the color of the text in the user interface element changed between the first playback position and the second playback position because the hue/color of the portion of the media item on which the user interface element is overlaid changed (and/or because the average or dominate color between the first playback position and the second playback position changed). Modifying the color of text in the user interface element based on the hue of the portion of the representation of the media item on which the user interface element is overlaid causes the computer system to automatically present the user interface element with an appropriate visual appearance during playback of the representation of the media item, thereby reducing the user's eye strain while interacting with the user interface element or the media item.

In some embodiments, the user interface element includes a first amount of text while the representation of the media item is at the first playback position, and the user interface element includes a second amount of text, different from the first amount of text, while the representation of the media item is at the second playback position (1210a), such as the amount of text 1131 in element 1112 changing from FIG. 11A to FIG. 11B. For example, while the representation of the media item is being displayed at the first playback position, the user interface element includes more text as compared to when the representation of the media item is displayed at the second playback position if the spoken and/or non-spoken audio present at the first playback position is more than the spoken and/or non-spoken audio present at the second playback position. Conversely, while the representation of the media item is being displayed at the first playback position, the user interface element includes less text as compared to when the representation of the media item is displayed at the second playback position if the spoken and/or non-spoken audio present at the first playback position is less than the spoken and/or non-spoken audio present at the second playback position.

In some embodiments, while displaying the representation of the media item at the first playback position, the computer system displays (1210b) the user interface element with a first size, such as shown with respect to element 1112 in FIG. 11A. In some embodiments, while displaying the representation of the media item at the second playback position, the computer system displays (1210c) the user interface element with a second size, different from the first size, such as shown with respect to element 1112 in FIG. 11B. For example, the size of the user interface element changes as more or less text is displayed in the user interface element. In some embodiments, the size of the back plane element (as previously described) increases or decreases in size as more or less text is displayed in the user interface element. For example, the size of the user interface element is larger (e.g., occupies more space in the field of view of the user) at the first playback position than at the second playback position in the representation of the media item if the user interface element includes more text at the first playback position than at the second playback position. Conversely, the size of the user interface element is smaller (e.g., occupies less space in the field of view of the user) at the first playback position than at the second playback position in the representation of the media item if the user interface element includes less text at the first playback position than at the second playback position. Modifying the size of the user interface element based on the amount of text that is displayed in the user interface element causes the computer system to automatically present the user interface element with an appropriate amount of space for the caption included in the user interface element during playback of the representation of the media item.

In some embodiments, after displaying the user interface element with the first amount of text and before displaying the representation of the media item at the second playback position, the computer system ceases (1212a) display of the first amount of text (e.g., ceasing display of the currently displayed text) in the user interface element, such as ceasing display of text 1131 in FIG. 11A. In some embodiments, the computer system continues to display the back plane element of the user interface element after ceasing display of the first amount of text in the user interface element. In some embodiments, the computer system ceases display of the first amount of text in the user interface element because the first amount of text no longer corresponds to a current playback in the representation of the media item.

In some embodiments, after ceasing display of the first amount of text (e.g., after ceasing display of the currently displayed text) in the user interface element and in response to the representation of the media item reaching a playback position corresponding to the second playback position (e.g., after presenting the representation of the media item at the first playback position and while the representation of the media item is at a second playback position), the computer system displays (1212b) the user interface element with the second size and less than the first amount of text, such as displaying text 1131 in element 1112 in FIG. 11B (e.g., with the second amount of text or with no text). For example, as the playback position in the representation of the media item moves to the second playback position, the computer system replaces the text in the user interface element corresponding to the first playback position with text that corresponds to the spoken and/or non-spoken audio at the second playback position. In some embodiments, as the computer system replaces the text corresponding to the first playback position with the text that corresponds to the second playback position, the backplane element of the user interface element continues to be displayed by the computer system. In some embodiments, as the computer system is transitioning playback of the representation of the media item from the first playback position to the second playback position, the computer system increases or decreases the size of the backplane element of the user interface element based on the amount of text that will be displayed in the user interface element at the second playback position. In some embodiments, the size of the user interface element does not change between the first playback and the second playback position if the amount of text that will be displayed in the user interface element at the second playback position is less than the amount of text displayed at the first playback position. In some embodiments, the size of the user interface element decreases in size between the first playback and the second playback position if the text that will be displayed at the second playback position is less than the amount of text displayed at the first playback position. Ceasing display of text included in the user interface element before resizing the user interface element provides an efficient way of presenting new text (e.g., captions) in the user interface as the playback position in the representation of the media item changes.

In some embodiments, displaying the user interface element with first visual appearance includes (1214a), in accordance with a determination that one or more criteria are satisfied, displaying text corresponding to the representation of the media item at the first playback position over a back plane element of the user interface element (1214b), such as text 1131 displayed over backplane element 1133 in FIG. 11B. For example, when the one or more criteria are satisfied, the user interface element includes two portions: a back plane element (as described above) and text that is displayed over/in front of the back plane element. In some embodiments, the back plane element has a black color and/or provides a threshold amount of contrast. In some embodiments, if the one or more criteria were satisfied and the computer system did not display the text over the backplane element of the user interface element, but rather displayed the text without the back plane element, the representation of the media item (or the portion of the representation of the media on which the user interface element is overlaid) would optionally not have a contrast ratio of at least 100:1, 200:1, 500:1, 700:1, 1,000:1, or 4,000:1 with the text, causing the text included in the user interface element to be unreadable or hard to read.

In some embodiments, in accordance with a determination that the one or more are not satisfied, the text corresponding to the representation of the media item is displayed at the first playback position without displaying the backplane element (1214c), such as text 1131 not displayed over a backplane element in FIG. 11C. For example, when the one or more criteria are not satisfied, the user interface element displays the text without displaying a (e.g., black) back plane element. In some embodiments, the back plane element is not displayed when the text included in the user interface element and the representation of the media item (or the portion of the representation of the media on which the user interface element is overlaid) have at least a threshold amount of contrast between them even without the backplane element (e.g., a contrast ratio of at least 100:1, 200:1, 500:1, 700:1, 1,000:1, or 4,000:1)—such that, even without the backplane element, the text included in the user interface element is readable by a user with a minimal or reduced amount of eye strain. Thus, in some embodiments, when the user interface element does not include the backplane, the text included in the user interface element is displayed over the first portion of the representation of the media item (and not over the backplane element when the one or more criteria are satisfied). Displaying the user interface element with or without a back plane element based on whether one or more criteria are satisfied provides an efficient way of ensuring text in the user interface element remains readable by a user during playback of the representation of the media item and also allows for less obscuring of the content when possible.

In some embodiments, the one or more criteria include a criterion that is satisfied when a brightness of the representation of the media item at the first playback position is greater than a threshold brightness (e.g., threshold luminance), such as the brightness of content 1105 in FIG. 11B, and is not satisfied when the brightness of the representation of the media item at the first playback position is not greater than a threshold brightness (e.g., threshold luminance) (1216), such as the brightness of the portion of content 1105 behind element 1112 in FIG. 11C. For example, the user interface element includes a (e.g., black) back plane element when the representation of the media item at the first playback position is very bright, and does not include the back plane element when the representation of the media item at the first playback position is very dark. In some embodiments, the user interface element includes a back plane element when content is very bright because the back plane element provides enough contrast (e.g., a contrast ration of at least 100:1, 200:1, 500:1, or 700:1) between the text and the representation of the media item (or the portion of the representation of the media on which the user interface element is overlaid) such that the text included in the user interface element is readable by a user with a minimal or reduced amount of eye strain. Conversely, in some embodiments, the user interface element does not include a back plane element when content is very dark because the text included in the user interface element and the representation of the media item (or the portion of the representation of the media on which the user interface element is overlaid) already provides at least a threshold amount of contrast between the two (e.g., a contrast ratio of at least 100:1, 200:1, 500:1, 700:1, 1,000:1, or 4,000:1), such that, even without the backplane element, the text included in the user interface element is readable by a user with a minimal or reduced amount of eye strain. Displaying the user interface element with or without a back plane element based on a brightness of the representation of the media item provides an efficient way of ensuring text in the user interface element remains readable by a user during playback of the representation of the media item.

In some embodiments, after displaying the representation of the media item at the first playback position, the computer system determines (1218*a*) that one or more criteria are satisfied, including a criterion that is satisfied when audio that satisfies one or more second criteria (e.g., actor speech, music, or other types of audio that would result in a display of a caption in the user interface element) has not been present in the representation of the media item for a threshold amount of time (e.g., 1, 2, 3, 5, 10, 15, 30, or 60 seconds), such as audio corresponding to Actor A 1106 or Actor B 1108 not being present in content 1105 for the threshold amount of time. In some embodiments, the one or more second criteria include a criterion that is satisfied when one or more characters/actors in the representation of the media item have not spoken for at least the above threshold amount of time. In some embodiments, the one or more second criteria include a criterion that is satisfied when a narrator of the representation of the media item has not spoken for at least the above threshold amount of time. In some embodiments, the one or more second criteria include a criterion that is satisfied when music/sound events in the representation of the media item have not been present for at least the above threshold amount of time. In some embodiments, audio present in the representation of the media item does not satisfy the one or more second criteria if that type of audio has not been selected for captioning (e.g., is not represented in text in the user interface element during playback of the representation of the media item).

In some embodiments, in response to determining that the one or more criteria are satisfied, the computer system ceases (1218*b*) display of the user interface element, such as ceasing display of element 1112. For example, if audio that would result in a caption being displayed in the user interface element has not been presented for at least the threshold amount of time, the computer system stops displaying the user interface element. In some embodiments, the computer system does not redisplay the user interface element until audio that results in a caption being displayed in the user interface element is present (e.g., playing) in the representation of the media item. In some embodiments, the user interface element is displayed for at least a threshold amount of time (e.g., 1, 2, 3, or 5 seconds) before the computer system ceases display of the user interface element. Ceasing display of the user interface element in response to determining one or more criteria are satisfied causes the computer system to automatically stop presenting the user interface element in scenarios where audio that would result in a caption being displayed in the user interface element has not been detected for a threshold amount of time, thus removing unnecessary obstruction of the content.

In some embodiments, the user interface element includes a caption for the media item that is being played by the computer system (1220), such as shown in element 1112 in FIGS. 11A-11C. In some embodiments, the respective user interface element includes video captions that visually show (e.g., in text) the words that are spoken (e.g., by one or more characters and/or a narrator) at a current playback position in the representation of the media item. In some embodiments, the caption included in the user interface element is similar to the caption described in method 800. Displaying a caption at the user interface element causes the computer system to automatically present the media item in a manner that easily allows deaf or hard of hearing users or users who are watching without volume to watch/interact with the media item.

In some embodiments, while the representation of the media item is at the first playback position, the caption for the media item includes first content that corresponds to audio present at the first playback position (1222*a*), such as the content of element 1112 in FIG. 11A. For example, the caption displayed in the user interface element includes one or more words spoken by the actors/characters at the first playback position, one or more words spoken by a narrator at the first playback position, and/or a text description of sound events at the first playback position.

In some embodiments, while the representation of the media item is at the second playback position, the caption for the media item includes second content, different from the first content, that corresponds to audio present at the second playback position (1222*b*), such as the content of element 1112 in FIG. 11B. For example, as the playback position within the representation of the media item changes, the computer system updates the caption included in the user interface element. For example, while the representation of the media item is at the second playback position, the computer system optionally is no longer displaying a caption based on the spoken and/or non-spoken audio at the first playback position. Instead, the computer system is optionally displaying, in the respective user interface element, a caption corresponding to the one or more words spoken by the actors/characters at the second playback position, one or more words spoken by a narrator at the second playback position, and/or a text description of sound events at the second playback position. Changing the caption displayed in the respective user interface element as the playback position of the representation of the media item changes causes the computer system to automatically present relevant information about the media item.

In some embodiments, while displaying the user interface element and while the computer system is playing the representation of the media item, the computer system receives (1224*a*), via the one or more input devices, an input corresponding to a request to cease displaying the user interface element, such as if device 101 were to receive an input in FIG. 11A to cease displaying element 1112. In some embodiments, the input is received while the computer system is presenting a playback controls user interface (e.g., similar to the playback controls user interface described in method 800). In some embodiments, the first input is directed to a first selectable option that, when selected (e.g., with an air gesture), causes the computer system to toggle off (e.g., stop displaying) captions for the representation of media item.

In some embodiments, in response to receiving the first input, the computer system continues (1224*b*) playback of the representation of the media item without displaying the user interface element, such as displaying content 1105 in FIG. 11B, but without displaying element 1112. For example, after the computer system detected user input directed to toggling off the display of captions for the representation of the media item, the computer system no longer displays the user interface element during playback of the representation of the media item until the computer system detects a second input corresponding to a request to start displaying captions for the representation of the media item. In some embodiments, the computer system resumes display of the captions for the representation of the media item in response to the computer system detecting a selection of a selectable option (e.g., with an air gesture) in the playback controls user interface that, when selected, causes the computer system to toggle on the display of captions for the representation of the media item, as described previously. A selection input such as this one options has one or more of the characteristics of similar selection inputs described with reference to method 1000. Ceasing display of the user interface element for at least a portion of the remainder of playback of the representation of the media item in response to user input ensures that obstructions of the content due to display of captions only occurs when input for doing so is provided.

It should be understood that the particular order in which the operations in method 1200 have been described is merely exemplary and is not intended to indicate that the described order is the only order in which the operations could be performed. One of ordinary skill in the art would recognize various ways to reorder the operations described herein.

In some embodiments, aspects/operations of methods 800, 1000 and/or 1200 may be interchanged, substituted, and/or added between these methods. For example, the media of methods 800, 1000 and/or 1200, the information user interface elements of methods 800, 1000 and/or 1200, and/or inputs of methods 800, 1000 and/or 1200 are optionally interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can be generated by inferring preferences based on non-personal information data or a bare minimum amount of personal information, such as the content being requested by the device associated with a user, other non-personal information available to the service, or publicly available information.

The invention claimed is:

1. A method comprising:

at a computer system that is in communication with one or more display generation components and one or more input devices:

while displaying, via the one or more display generation components, a representation of a media item that has content at different depths, displaying, overlaid on a first portion or a second portion, different from the first portion, of the representation of the media item, a respective user interface element that includes a caption for the media item that is being played by the computer system, wherein displaying the respective user interface element overlaid on the first portion or the second portion of the representation of the media item includes:

in accordance with a determination that the first portion of the representation of the media item is being presented at a first depth in the representation of the media item, and that the first portion of the representation of the media item is closer to a viewpoint of a user than the second portion of the representation of the media item, the respective user interface element is displayed at a first distance from the viewpoint of the user of the computer system, wherein the respective user interface element is overlaid on the first portion of the representation of the media item; and in accordance with a determination that the second portion of the representation of the media item is being presented at a second depth in the representation of the media item, and that the second portion of the representation of the media item is closer to the viewpoint of the user than the first portion of the representation of the media item, the respective user interface element is displayed at a second distance, different from the first distance, from the viewpoint of the user, wherein the respective user interface element is overlaid on the second portion of the representation of the media item.

2. The method of claim 1, further comprising:

after presenting the first portion of the representation of the media item at the first depth in the representation of the media item, wherein the respective user interface element was overlaid on the first portion of the representation of the media item, displaying the first portion of the representation of the media item at a third depth, different from the first depth, in the representation of the media item, and while displaying the first portion of the representation of the media item at the third depth in the representation of the media item, displaying the respective user interface element at a third distance, different from the first distance, from the viewpoint of the user.

3. The method of claim 1, wherein the respective user interface element is displayed at the first distance from the viewpoint of the user when the respective user interface element is displayed overlaid on the first portion of the representation of the media item, the method further comprising:

after displaying, overlaid on the first portion of the representation of the media item, the respective user interface element at the first distance from the viewpoint of the user, displaying, via the one or more display generation components, the respective user interface element overlaid on the second portion, different from the first portion, of the representation of the media item, wherein displaying the respective user interface element overlaid on the second portion of the representation of the media item includes:

in accordance with a determination that the second portion of the representation of the media item is being presented at a third depth, different from the first depth, in the representation of the media item, displaying the respective user interface element at a third distance, different from the first distance, from the viewpoint of the user, wherein the respective user interface element is overlaid on the second portion of the representation of the media item.

4. The method of claim 1, wherein the respective user interface element is overlaid on the first portion of the representation of the media item when one or more criteria are satisfied, including a criterion that is satisfied when a target focal plane corresponds to the first portion of the representation of the media item, and is not overlaid on the first portion of the representation of the media item when the one or more criteria are not satisfied.

5. The method of claim 1, further comprising:

while displaying the representation of the media item with the respective user interface element overlaid on the first or second portion of the representation of the media item, receiving, via the one or more input devices, a first input directed to the representation of the media item; and in response to receiving the first input:

displaying, via the one or more display generation components, a playback controls user interface that includes one or more selectable user interface elements for modifying playback of the representation of the media item; and ceasing display of the respective user interface element overlaid on the first portion of the representation of the media item.

6. The method of claim 5, wherein the playback controls user interface is displayed when one or more criteria are satisfied and is not displayed when the one or more criteria are not satisfied, the method further comprising:

after ceasing display of the respective user interface element and while displaying the playback controls user interface, determining that the one or more criteria are not satisfied; and in response to determining that the one or more criteria are not satisfied:

ceasing display, via the one or more display generation components, of the playback controls user interface; and displaying, via the one or more display generation components, the respective user interface element.

7. The method of claim 5, further comprising:

in response to receiving the first input and while displaying the playback controls user interface:

displaying, via the one or more display generation components, the respective user interface element overlaid on a third portion, different from the first portion, of the representation of the media item.

8. The method of claim 1, further comprising:

while displaying the respective user interface element overlaid on the first portion of the representation of the media item, detecting a change in a relative location of the representation of the media item relative to the viewpoint of the user; and while detecting the change in the relative location of the representation of the media item relative to the viewpoint of the user:

moving the respective user interface element from overlaying the first portion of the representation of the media item to overlaying a third portion, different from the first portion, of the representation of the media item in accordance with the change of the relative location of the representation of the media item relative to the viewpoint of the user.

9. The method of claim 1, wherein the respective user interface element is overlaid on the first portion of the representation of the media item when one or more criteria are satisfied, including a criterion that is satisfied when audio of the media item corresponds to the first portion of the representation of the media item, and is not overlaid on the first portion of the representation of the media item when the one or more criteria are not satisfied.

10. The method of claim 1, wherein:

in accordance with a determination that the representation of the media item is at a first playback position, the caption for the media item includes first content that corresponds to audio present at the first playback position; and in accordance with a determination that representation of the media item is at a second playback position, different from the first playback position, the caption for the media item includes second content, different from the first content, that corresponds to audio present at the second playback position.

11. The method of claim 1, further comprising:

while displaying the respective user interface element and while the computer system is playing the representation of the media item, receiving, via the one or more input devices, an input corresponding to a request to cease displaying the respective user interface element; and in response to receiving the input, continuing playback of the representation of the media item without displaying the respective user interface element.

12. A non-transitory computer-readable storage medium storing one or more programs configured to be executed by one or more processors of a computer system that is in communication with one or more display generation components and one or more input devices, the one or more programs including instructions for:

while displaying, via the one or more display generation components, a representation of a media item that has content at different depths, displaying, overlaid on a first portion or a second portion, different from the first portion, of the representation of the media item, a respective user interface element that includes a caption for the media item that is being played by the computer system, wherein displaying the respective user interface element overlaid on the first portion or the second portion of the representation of the media item includes:

in accordance with a determination that the first portion of the representation of the media item is being presented at a first depth in the representation of the media item, and that the first portion of the representation of the media item is closer to a viewpoint of a user than the second portion of the representation of the media item, the respective user interface element is displayed at a first distance from the viewpoint of the user of the computer system, wherein the respective user interface element is overlaid on the first portion of the representation of the media item; and in accordance with a determination that the second portion of the representation of the media item is being presented at a second depth in the representation of the media item, and that the second portion of the representation of the media item is closer to the viewpoint of the user than the first portion of the representation of the media item, the respective user interface element is displayed at a second distance, different from the first distance, from the viewpoint of the user, wherein the respective user interface element is overlaid on the second portion of the representation of the media item.

13. The non-transitory computer readable storage medium of claim 12, wherein the one or more programs further including instructions for:

after presenting the first portion of the representation of the media item at the first depth in the representation of the media item, wherein the respective user interface element was overlaid on the first portion of the representation of the media item, displaying the first portion of the representation of the media item at a third depth, different from the first depth, in the representation of the media item, and while displaying the first portion of the representation of the media item at the third depth in the representation of the media item, displaying the respective user interface element at a third distance, different from the first distance, from the viewpoint of the user.

14. The non-transitory computer readable storage medium of claim 12, wherein the respective user interface element is displayed at the first distance from the viewpoint of the user when the respective user interface element is displayed overlaid on the first portion of the representation of the media item, the one or more programs further including instructions for:
after displaying, overlaid on the first portion of the representation of the media item, the respective user interface element at the first distance from the viewpoint of the user, displaying, via the one or more display generation components, the respective user interface element overlaid on the second portion, different from the first portion, of the representation of the media item, wherein displaying the respective user interface element overlaid on the second portion of the representation of the media item includes:
in accordance with a determination that the second portion of the representation of the media item is being presented at a third depth, different from the first depth, in the representation of the media item, displaying the respective user interface element at a third distance, different from the first distance, from the viewpoint of the user, wherein the respective user interface element is overlaid on the second portion of the representation of the media item.

15. The non-transitory computer readable storage medium of claim 12, wherein the respective user interface element is overlaid on the first portion of the representation of the media item when one or more criteria are satisfied, including a criterion that is satisfied when a target focal plane corresponds to the first portion of the representation of the media item, and is not overlaid on the first portion of the representation of the media item when the one or more criteria are not satisfied.

16. The non-transitory computer readable storage medium of claim 12, the one or more programs further including instructions for:
while displaying the representation of the media item with the respective user interface element overlaid on the first or second portion of the representation of the media item, receiving, via the one or more input devices, a first input directed to the representation of the media item; and
in response to receiving the first input:
displaying, via the one or more display generation components, a playback controls user interface that includes one or more selectable user interface elements for modifying playback of the representation of the media item; and
ceasing display of the respective user interface element overlaid on the first portion of the representation of the media item.

17. The non-transitory computer readable storage medium of claim 16, wherein the playback controls user interface is displayed when one or more criteria are satisfied and is not displayed when the one or more criteria are not satisfied, the one or more programs further including instructions for:
after ceasing display of the respective user interface element and while displaying the playback controls user interface, determining that the one or more criteria are not satisfied; and
in response to determining that the one or more criteria are not satisfied:
ceasing display, via the one or more display generation components, of the playback controls user interface; and
displaying, via the one or more display generation components, the respective user interface element.

18. The non-transitory computer readable storage medium of claim 16, the one or more programs further including instructions for:
in response to receiving the first input and while displaying the playback controls user interface:
displaying, via the one or more display generation components, the respective user interface element overlaid on a third portion, different from the first portion, of the representation of the media item.

19. The non-transitory computer readable storage medium of claim 12, the one or more programs further including instructions for:
while displaying the respective user interface element overlaid on the first portion of the representation of the media item, detecting a change in a relative location of the representation of the media item relative to the viewpoint of the user; and
while detecting the change in the relative location of the representation of the media item relative to the viewpoint of the user:
moving the respective user interface element from overlaying the first portion of the representation of the media item to overlaying a third portion, different from the first portion, of the representation of the media item in accordance with the change of the relative location of the representation of the media item relative to the viewpoint of the user.

20. The non-transitory computer readable storage medium of claim 12, wherein the respective user interface element is overlaid on the first portion of the representation of the media item when one or more criteria are satisfied, including a criterion that is satisfied when audio of the media item corresponds to the first portion of the representation of the media item, and is not overlaid on the first portion of the representation of the media item when the one or more criteria are not satisfied.

21. The non-transitory computer readable storage medium of claim 12, wherein:
in accordance with a determination that the representation of the media item is at a first playback position, the caption for the media item includes first content that corresponds to audio present at the first playback position; and
in accordance with a determination that representation of the media item is at a second playback position, different from the first playback position, the caption for the media item includes second content, different from the first content, that corresponds to audio present at the second playback position.

22. The non-transitory computer readable storage medium of claim 12, the one or more programs further including instructions for:
while displaying the respective user interface element and while the computer system is playing the representation of the media item, receiving, via the one or more input devices, an input corresponding to a request to cease displaying the user interface element; and
in response to receiving the input, continuing playback of the representation of the media item without displaying the respective user interface element.

23. A computer system that is in communication with one or more display generation components and one or more input devices, the computer system comprising:
  one or more processors; and
  memory storing one or more programs configured to be executed by the one or more processors, the one or more programs including instructions for:
  while displaying, via the one or more display generation components, a representation of a media item that has content at different depths, displaying, overlaid on a first portion or a second portion, different from the first portion, of the representation of the media item, a respective user interface element that includes a caption for the media item that is being played by the computer system, wherein displaying the respective user interface element overlaid on the first portion or the second portion of the representation of the media item includes:
    in accordance with a determination that the first portion of the representation of the media item is being presented at a first depth in the representation of the media item, and that the first portion of the representation of the media item is closer to a viewpoint of a user than the second portion of the representation of the media item, the respective user interface element is displayed at a first distance from the viewpoint of the user of the computer system, wherein the respective user interface element is overlaid on the first portion of the representation of the media item; and
    in accordance with a determination that the second portion of the representation of the media item is being presented at a second depth in the representation of the media item, and that the second portion of the representation of the media item is closer to the viewpoint of the user than the first portion of the representation of the media item, the respective user interface element is displayed at a second distance, different from the first distance, from the viewpoint of the user, wherein the respective user interface element is overlaid on the second portion of the representation of the media item.

24. The computer system of claim 23, the one or more programs further including instructions for:
  after presenting the first portion of the representation of the media item at the first depth in the representation of the media item, wherein the respective user interface element was overlaid on the first portion of the representation of the media item, displaying the first portion of the representation of the media item at a third depth, different from the first depth, in the representation of the media item, and
  while displaying the first portion of the representation of the media item at the third depth in the representation of the media item, displaying the respective user interface element at a third distance, different from the first distance, from the viewpoint of the user.

25. The computer system of claim 23, wherein the respective user interface element is displayed at the first distance from the viewpoint of the user when the respective user interface element is displayed overlaid on the first portion of the representation of the media item, the one or more programs further including instructions for:
  after displaying, overlaid on the first portion of the representation of the media item, the respective user interface element at the first distance from the viewpoint of the user, displaying, via the one or more display generation components, the respective user interface element overlaid on the second portion, different from the first portion, of the representation of the media item, wherein displaying the respective user interface element overlaid on the second portion of the representation of the media item includes:
    in accordance with a determination that the second portion of the representation of the media item is being presented at a third depth, different from the first depth, in the representation of the media item, displaying the respective user interface element at a third distance, different from the first distance, from the viewpoint of the user, wherein the respective user interface element is overlaid on the second portion of the representation of the media item.

26. The computer system of claim 23, wherein the one or more programs further including instructions for overlaying the respective user interface element on the first portion of the representation of the media item when one or more criteria are satisfied, including a criterion that is satisfied when a target focal plane corresponds to the first portion of the representation of the media item, and to not overlay on the first portion of the representation of the media item when the one or more criteria are not satisfied.

27. The computer system of claim 23, the one or more programs further including instructions for:
  while displaying the representation of the media item with the respective user interface element overlaid on the first or second portion of the representation of the media item, receiving, via the one or more input devices, a first input directed to the representation of the media item; and
  in response to receiving the first input:
    displaying, via the one or more display generation components, a playback controls user interface that includes one or more selectable user interface elements for modifying playback of the representation of the media item; and
    ceasing display of the respective user interface element overlaid on the first portion of the representation of the media item.

28. The computer system of claim 27, wherein the playback controls user interface is displayed when one or more criteria are satisfied and is not displayed when the one or more criteria are not satisfied, the one or more programs further including instructions for:
  after ceasing display of the respective user interface element and while displaying the playback controls user interface, determining that the one or more criteria are not satisfied; and
  in response to determining that the one or more criteria are not satisfied:
    ceasing display, via the one or more display generation components, of the playback controls user interface; and
    displaying, via the one or more display generation components, the respective user interface element.

29. The computer system of claim 27, the one or more programs further including instructions for:
  in response to receiving the first input and while displaying the playback controls user interface:
    displaying, via the one or more display generation components, the respective user interface element overlaid on a third portion, different from the first portion, of the representation of the media item.

30. The computer system of claim 23, the one or more programs further including instructions for:
  while displaying the respective user interface element overlaid on the first portion of the representation of the media item, detecting a change in a relative location of the representation of the media item relative to the viewpoint of the user; and
  while detecting the change in the relative location of the representation of the media item relative to the viewpoint of the user:
    moving the respective user interface element from overlaying the first portion of the representation of the media item to overlaying a third portion, different from the first portion, of the representation of the media item in accordance with the change of the relative location of the representation of the media item relative to the viewpoint of the user.

31. The computer system of claim 23, wherein the respective user interface element is overlaid on the first portion of the representation of the media item when one or more criteria are satisfied, including a criterion that is satisfied when audio of the media item corresponds to the first portion of the representation of the media item, and is not overlaid on the first portion of the representation of the media item when the one or more criteria are not satisfied.

32. The computer system of claim 23, wherein:
  in accordance with a determination that the representation of the media item is at a first playback position, the caption for the media item includes first content that corresponds to audio present at the first playback position; and
  in accordance with a determination that representation of the media item is at a second playback position, different from the first playback position, the caption for the media item includes second content, different from the first content, that corresponds to audio present at the second playback position.

33. The computer system of claim 23, the one or more programs further including instructions for:
  while displaying the respective user interface element and while the computer system is playing the representation of the media item, receiving, via the one or more input devices, an input corresponding to a request to cease displaying the respective user interface element; and
  in response to receiving the input, continuing playback of the representation of the media item without displaying the respective user interface element.

* * * * *